US008417865B2

(12) United States Patent
Higuchi et al.

(10) Patent No.: US 8,417,865 B2
(45) Date of Patent: Apr. 9, 2013

(54) SHARED SYSTEM OF I/O EQUIPMENT, SHARED SYSTEM OF INFORMATION PROCESSING APPARATUS, AND METHOD USED THERETO

(75) Inventors: Junichi Higuchi, Tokyo (JP); Youichi Hidaka, Tokyo (JP); Jun Suzuki, Tokyo (JP); Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/469,335

(22) Filed: May 11, 2012

(65) Prior Publication Data

US 2012/0290764 A1 Nov. 15, 2012

Related U.S. Application Data

(62) Division of application No. 11/857,846, filed on Sep. 19, 2007, now Pat. No. 8,200,880.

(30) Foreign Application Priority Data

Sep. 20, 2006 (JP) ................................. 2006-254366

(51) Int. Cl.
*H04L 12/407* (2006.01)
(52) U.S. Cl. ....................................... 710/313; 370/402
(58) Field of Classification Search .......... 710/305–315; 370/401–405, 395.53
See application file for complete search history.

(56) References Cited

U.S. PATENT DOCUMENTS

| | | | |
|---|---|---|---|
| 5,086,426 A * | 2/1992 | Tsukakoshi et al. | .......... 370/405 |
| 5,394,402 A | 2/1995 | Ross | |
| 5,684,800 A | 11/1997 | Dobbins et al. | |
| 6,198,741 B1 | 3/2001 | Yoshizawa et al. | |
| 6,798,775 B1 | 9/2004 | Bordonaro et al. | |
| 7,046,668 B2 | 5/2006 | Pettey et al. | |
| 7,058,738 B2 | 6/2006 | Stufflebeam, Jr. | |
| 7,079,544 B2 * | 7/2006 | Wakayama et al. | ........... 370/401 |
| 7,096,310 B2 | 8/2006 | Norden | |

(Continued)

FOREIGN PATENT DOCUMENTS

| | | |
|---|---|---|
| EP | 537408 A1 | 4/1993 |
| JP | 10-049482 A | 2/1998 |

(Continued)

OTHER PUBLICATIONS

Jun Suzuki et al., "ExpressEther Ethernet-Based Virualization Technology for Reconfigurable Hardware Platform", 14th IEEE Symposium on High-Performance Interconnects, Aug. 23-25, 2006, pp. 45-51, IEEE Computer Society, Stanford, CA, USA.

(Continued)

*Primary Examiner* — Paul R Myers
(74) *Attorney, Agent, or Firm* — Sughrue Mion, PLLC

(57) ABSTRACT

An I/O equipment sharing system includes CPUs, a plurality of route complexes coupled to the CPUs, upstream PCI Express-bridges coupled to the route complexes, downstream PCI Express-bridges coupled to the upstream PCI Express-bridges through a network, and I/O equipment coupled to the downstream PCI Express-bridges. In the above configuration, the I/O equipment are shared between the CPUs using the identifiers of the network (for example, Ethernet VLAN IDs), the identifiers are set so that they do not overlap between the respective CPUs and necessary I/O equipment is set to a set identifier. Further, an identifier is set to a plurality of the same I/O equipment required by the respective CPUs.

13 Claims, 42 Drawing Sheets

U.S. PATENT DOCUMENTS

| | | | |
|---|---|---|---|
| 7,380,046 | B2 | 5/2008 | Boyd et al. |
| 7,519,761 | B2 | 4/2009 | Gregg |
| 8,200,880 | B2 * | 6/2012 | Higuchi et al. ............... 710/313 |
| 2005/0053060 | A1 | 3/2005 | Pettey |
| 2005/0262269 | A1 | 11/2005 | Pike |
| 2006/0129709 | A1 | 6/2006 | Bandholz et al. |
| 2006/0206655 | A1 | 9/2006 | Chappell et al. |
| 2007/0025354 | A1 | 2/2007 | Pettey et al. |
| 2007/0067551 | A1 | 3/2007 | Ikeda et al. |
| 2007/0198763 | A1 | 8/2007 | Suzuki et al. |

FOREIGN PATENT DOCUMENTS

| | | | |
|---|---|---|---|
| JP | 10-178442 | A | 6/1998 |
| JP | 2001-045099 | A | 2/2001 |
| JP | 2002-149592 | A | 5/2002 |
| JP | 2002-351817 | A | 6/2002 |
| JP | 2004-336501 | A | 11/2004 |
| JP | 2005-332396 | A | 2/2005 |
| JP | 2005-101722 | A | 4/2005 |
| JP | 2005-317021 | A | 10/2005 |
| JP | 2007-219873 | A | 8/2007 |
| WO | 2004/088522 | A1 | 10/2004 |
| WO | 2006/014573 | A2 | 2/2006 |

OTHER PUBLICATIONS

Yoichi Hidaka et al., "Proposal for the ExpressEther System Virtualation Technology Using Ethernet (1) System Overview and Architecture", The Institute of Electronics, Information and Communication Engineers 2006 Communications Society Conference Abstracts 2, Sep. 7, 2006, p. 57, The Institute of Electronics, Informationand Communication Engineers, Japan.

Jun Suzuki et al., "Proposal for the ExpressEther System Virtualization Technology Using Ethernet (2) I/O Virtualization Technology", The Institute of Electronics, Information and Communication Engineers 2006 Communications Society Conference Abstracts 2, Sep. 7, 2006, p. 58, The Institute of Electronics, Information and Communication Engineers, Japan.

Hideyuki Shimonishi et al., "Proposal for the ExpressEther System Virtualization Technology Using Ethernet (3) Packet Retransmission Scheme", The Institute of Electronics, Information and Communication Engineers 2006 Communications Society Conference Abstracts 2, Sep. 7, 2006, p. 59, Institute of Electronics, Information and Communication Engineers , Japan.

Junichi Higuchi et al., "Proposal for the ExpressEther System Virtualization Technology Using Ethernet (4) Prototyping and Performance Evaluation", The Institute of Electronics, Information and Communication Engineers 2006 Communications Society Conference Abstracts 2, Sep. 7, 2006, p. 60, The Institute of Electronics, Information and Communication Engineers, Japan.

ASI Core Architecture Specification Rev. 1. 1, ASI—SIG, Nov. 2004, pp. 29-52.

"Protocol Interface #8 (PI-8) R1.0, ASI-SIG, Feb. 2004", pp. 17-25.

PCI Express Ethernet Networking, Sep. 2005, Intel white paper.

PCI Express Base Specification Revision 1.0 Jul. 22, 2002.

* cited by examiner

FIG. 16

(a) I/O EQUIPMENT REQUEST TABLE 203

| Vender ID | Device ID | Class Code | SECURED FLAG |
|---|---|---|---|
| ××××  | ■■■■ | □□□ | 1 |
| ○○○○ | ●●●● | ▲▲▲ | 0 |
| ... | ... | ... | ... |

(b) I/O EQUIPMENT INFORMATION TABLE 204

| Vender ID | Device ID | Class Code | AFFILIATION VLAN ID | MAC ADDRESS |
|---|---|---|---|---|
| ×××× | ■■■■ | □□□ | 1 | ○○○○ |
| ×××× | ●●●● | ▲▲▲ | 0 | △△△△ |
| ... | ... | ... | ... | ... |

(c) VLAN ID INFORMATION TABLE 206

| AFFILIATION VLAN ID | MAC ADDRESS | DECISION FLAG |
|---|---|---|
| 1 | ×××× | 0 |
| 2 | ■■■■ | 1 |
| ... | ... | ... |
| 4094 | ●●●● | 0 |

(d) ENCAPSULATION TABLE 214

| AFFILIATION VLAN ID | MAC ADDRESS | BUS NO. | DEVICE NO. | I/O ADDRESS | MEMORY ADDRESS |
|---|---|---|---|---|---|
| 1 | ■■■■ | □□□ | ○○○ | △△△△ | ×××× |
| 1 | ●●●● | ▲▲▲ | □□□ | ○○○○ | ▲▲▲▲ |
| ... | ... | ... | ... | ... | ... |

FIG. 17

(a) I/O EQUIPMENT INFORMATION TABLE 304

| Vender ID | Device ID | Class Code | AFFILIATION VLAN ID | MAC ADDRESS |
|---|---|---|---|---|
| ××× | ■■■ | □□□ | 1 | ○○○○ |
| ××× | ●●●● | ▲▲▲ | 0 | △△△△ |
| ... | ... | ... | ... | ... |

(b) VLAN ID INFORMATION TABLE 306

| AFFILIATION VLAN ID | MAC ADDRESS | DECISION FLAG |
|---|---|---|
| 1 | ×××× | 0 |
| 2 | ■■■■ | 1 |
| ... | ... | ... |
| 4094 | ●●●● | 0 |

(c) ENCAPSULATION TABLE 313

| AFFILIATION VLAN ID | MAC ADDRESS | BUS NO. | DEVICE NO. | I/O ADDRESS | MEMORY ADDRESS |
|---|---|---|---|---|---|
| 1 | ■■■■ | □□□ | ○○○ | △△△△ | ×××× |
| 1 | ●●●● | ▲▲▲ | □□□ | ○○○○ | ▲▲▲▲ |
| ... | ... | ... | ... | ... | ... |

FIG. 18

(a) I/O EQUIPMENT REQUEST TABLE 203

| Vender ID | Device ID | Class Code | SECURED FLAG | AFFILIATION VLAN ID |
|---|---|---|---|---|
| ××× | ■■■■ | □□□ | 1 | 1 |
| ○○○○ | ●●●● | ▲▲▲ | 0 | |
| ... | ... | ... | ... | |

(b) I/O EQUIPMENT INFORMATION TABLE 204

| Vender ID | Device ID | Class Code | AFFILIATION VLAN ID | MAC ADDRESS | FLAG IN USE |
|---|---|---|---|---|---|
| ××× | ■■■■ | □□□ | 1 | ○○○○ | 1 |
| ××× | ●●●● | ▲▲▲ | 0 | △△△△ | 0 |
| ... | ... | ... | ... | ... | |

FIG.38

VLAN ID INFORMATION TABLE

| VLAN ID | MAC ADDRESS |
|---|---|
| 1 | × × × × |
| 2 | □ □ □ □ |
| 3 | |
| 4 | |
| ⋮ | |

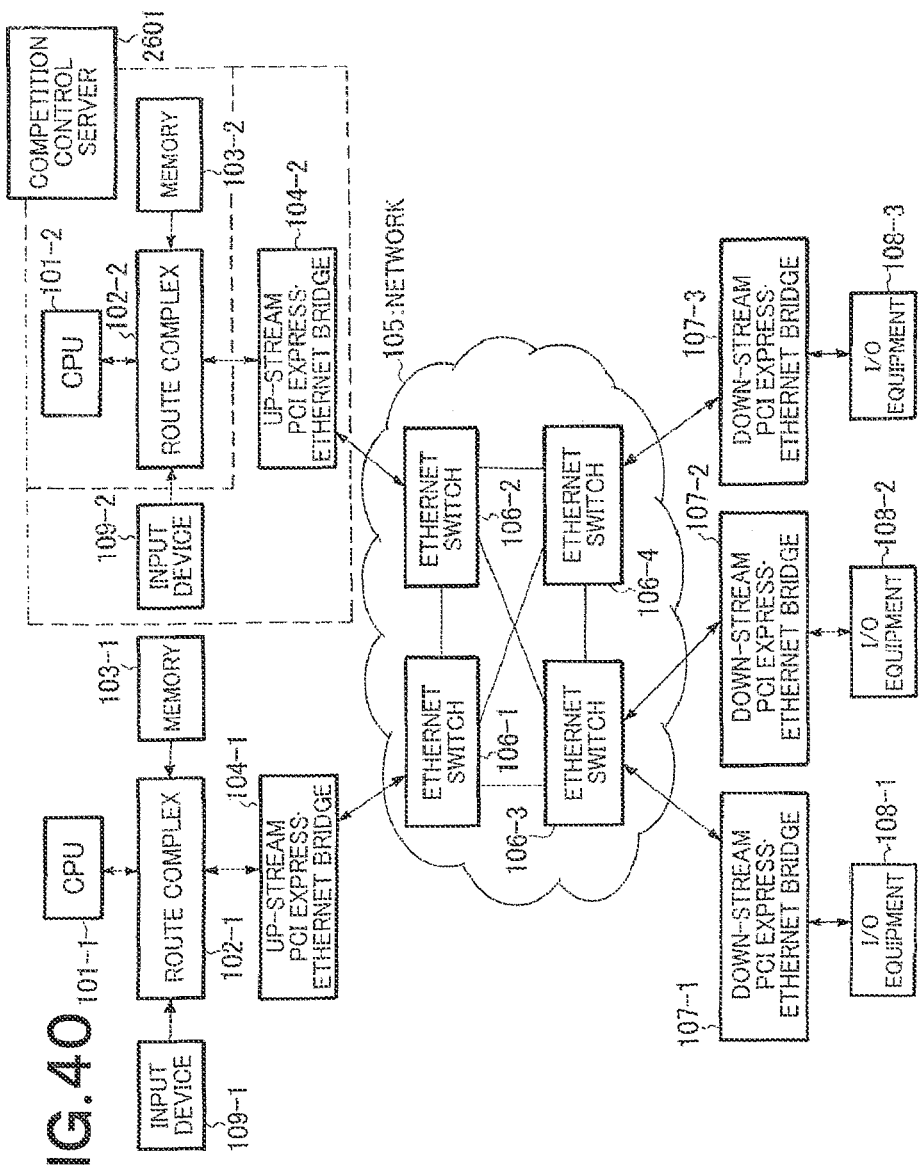

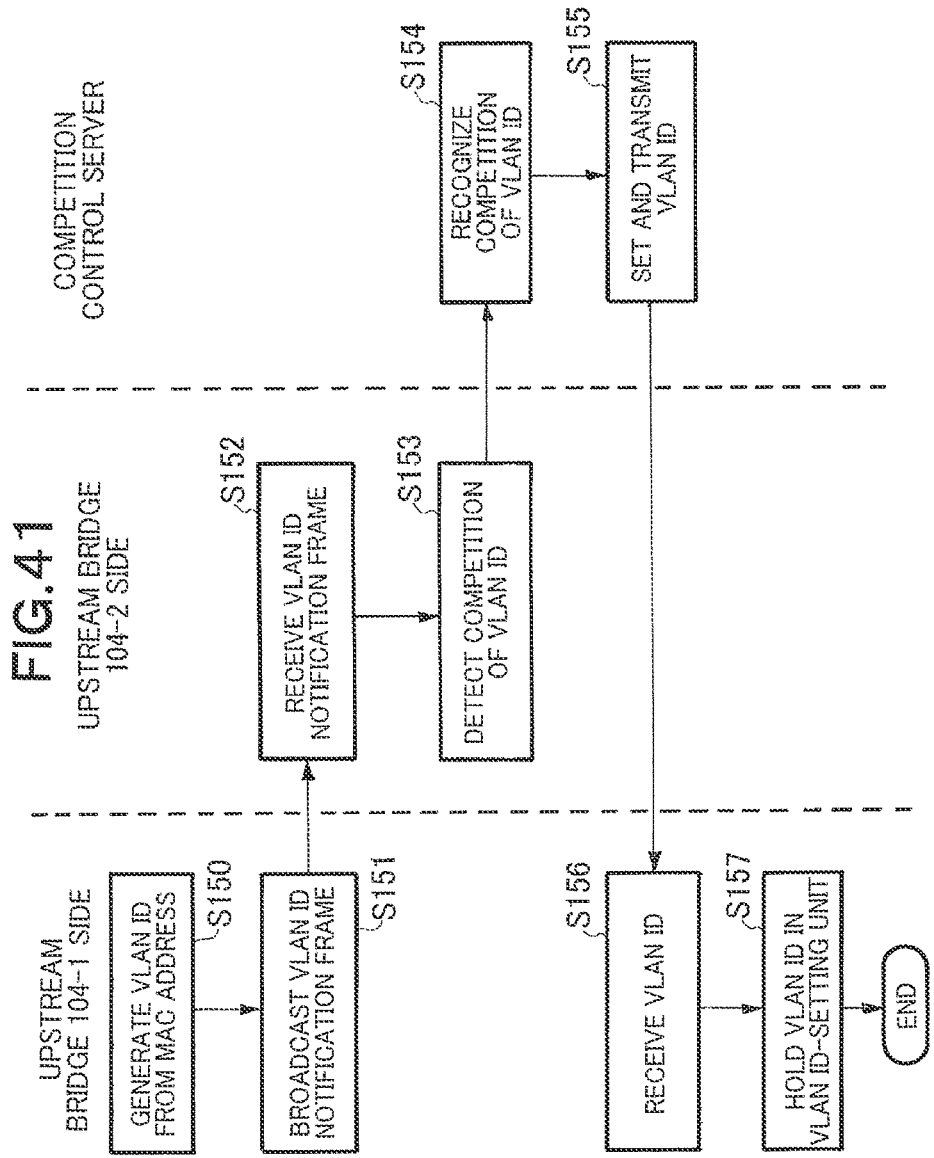

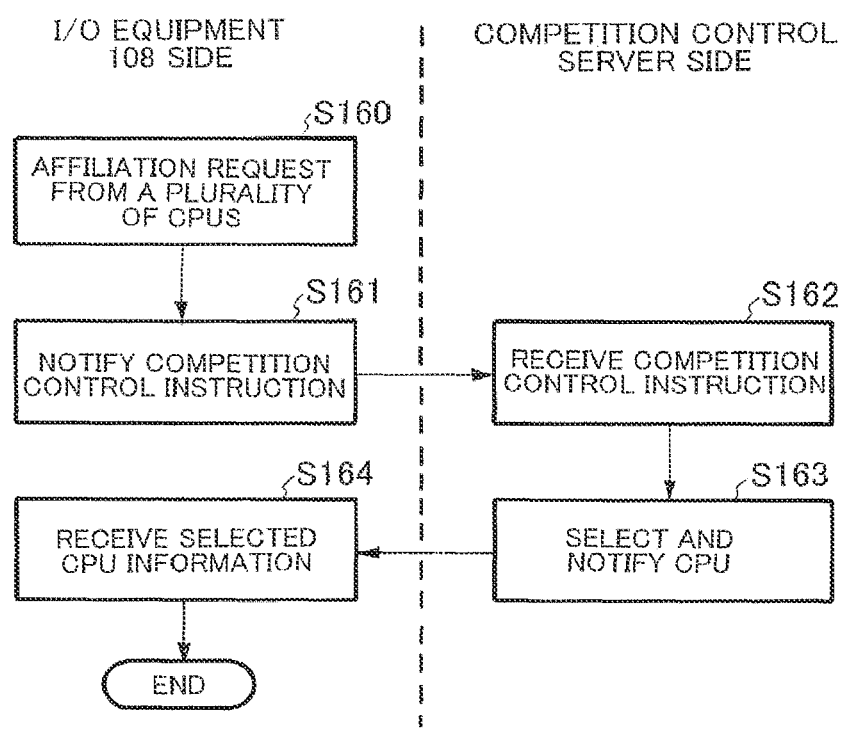

SHARED SYSTEM OF I/O EQUIPMENT, SHARED SYSTEM OF INFORMATION PROCESSING APPARATUS, AND METHOD USED THERETO

This application is a divisional application of U.S. application Ser. No. 11/857,846 filed Sep. 19, 2007, which claims priority from Japanese Patent Application No. 2006-254366 filed Sep. 20, 2006, which applications are incorporated herein by reference.

BACKGROUND OF THE INVENTION

1. Field of the Invention

The present invention relates to a system for sharing a plurality of downstream information processing apparatuses such as a plurality of I/O equipment among a plurality of upstream information processing apparatuses such as CPUs and a method used to the system, and particularly, to an I/O equipment sharing system which a plurality of CPUs and a plurality of I/O equipment are connected through a network and a method used to the I/O equipment sharing system.

This application is based upon and claims the benefit of priority from Japanese patent application No. 2006-254366, filed on Sep. 20, 2006, the disclosure of which is incorporated herein in its entirety by reference.

2. Related Art

At present, a peripheral component interconnect (PCI) is widely used as a bus standard for connecting between respective parts in a computer. A PCI Express is standardized as a next generation standard of the PCI. The PCI Express increases a communication capacity by changing a conventional parallel bus to a serial bus and carrying out communication by a packet system accompanied with switching.

However, the PCI Express permits only a tree-like arrangement in which a plurality of I/O equipment 108-1 to 108-3 are connected to one CPU 101 as shown in FIG. 1. In FIG. 1, the CPU 101 is connected to a route complex 102, and the route complex 102 is connected to the I/O equipment 108-1 to 108-3 through a PCI Express switch 1601. The PCI Express switch 1601 includes an upstream PCI-PCI bridge 1602 and downstream PCI-PCI bridges 1604-1 to 1604-3, the upstream PCI-PCI bridge 1602 is connected to the downstream PCI-PCI bridges 1604-1 to 1604-3 through a PCI Express switch internal bus 1603. The route complex 102 is connected to a memory 103.

On the other hand, conventionally, when a plurality of I/O equipment are shared among a plurality of CPUs, the advanced switching interconnect (ASI), in which a plurality of CPUs and a plurality of I/O apparatuses are connected to a network in a dispersed state, is standardized as shown in "ASI Core Architecture Specification Rev. 1. 1, ASI-SIG, November, 2004".

With reference to FIG. 2, CPUs 101-1 and 101-2 are connected to route complexes 102-1 and 102-2, respectively, and the route complexes 102-1, 102-2 are connected to I/O equipment 108-1 to 108-3 through an ASI network 1701. The route complexes 102-1, 102-2 are connected to memories 103-1, 103-2, respectively.

The ASI network 1701 includes route complex side PC Express-ASI bridges 1702-1 and 1702-2, an ASI switch 1703, a fabric manager 1704, and I/O equipment side PCI Express-ASI bridges 1705-1 to 1705-3.

The route complex side PCI Express-ASI bridges 1702-1 and 1702-2 are connected to the route complexes 102-1 and 102-2, and have a function for encapsulating a TLP (Transaction Layer Packet) in an ASI packet and carrying out transmission and reception. The ASI switch 1703 carries out switching so that the ASI packet, which encapsulates the packet (TLP) of the PCI Express, is transferred to a port of the destination of the ASI packet. The I/O equipment side PCI Express ASI bridges 1705-1 to 1705-3 are connected to the I/O equipment 108-1 to 108-3 and have a function for encapsulating a TLP in an ASI packet and carrying out transmission and reception. A fabric manager 1704 manages an inter-bridge connection in the route complex side PCI Express-ASI bridges 1702-1, 1702-2 and the I/O equipment side PCI Express-ASI bridges 1705-1 to 1705-3.

FIG. 3 shows a routing method in the ASI network 1701. In FIG. 3, the same components as the structure components those as shown in FIG. 2 are denoted by the same reference numerals. In the ASI, routing is carried out by a source routing method. In the method, a packet is transferred to a destination by using relative position information from a transmission source. Further, in the management method of I/O equipment 108-1 to 108-3 in the ASI, a fabric manager 1704 holds the routing information of all route complexes 102-1 and 102-2, ASI switches 1703-1 to 1703-3 and the I/O equipment 108-1 to 108-3, and manages a plurality of ASI address spaces. And the plurality of I/O equipment 108-1 to 108-3 can be managed by setting a source routing path of each ASI address space by a manager who operates the fabric manager 1704.

As a technology relating to the present invention, FIG. 1 of Japanese Patent Application Laid-Open Publication (JP-A) No. 10-49482 discloses a system in which one or at least two processors, a first bridge, a second bridge, and a plurality of peripheral devices are connected through a bus, respectively, (a bus for connecting a first bridge and a second bridge, and a bus for connecting the second bridge and the plurality of peripheral devices are a PCI bus). Further, JP-A No. 10-178442 discloses a system for allocating each one VLAN ID to each terminal, managing by a table, and controlling a connection between terminals.

Further, other technology relating the present invention is disclosed in "Protocol Interface #8 (PI-8) R1.0, ASI-SIG, February, 2004".

However, when an ASI is used between a plurality of CPUs, there are two disadvantages.

A first disadvantage resides in that it is complex to carry out a group management of a plurality of I/O equipment, and thereby expandability is restricted. This is because, when the group management of the plurality of I/O equipment is carried out in the ASI, a fabric manager is required to hold all the routing information and further a routing path must be set to each of ASI address spaces of the I/O equipment 108-1 to 108-3.

A second disadvantage resides in that N-fold redundancy cannot be easily set to the same I/O equipment. This is because when a plurality of the same I/O equipment make a different response, they are out of synchronization and cannot be operated, in addition to the reason of the first disadvantage.

Accordingly, an object of the present invention is to provide a system for and a method of easily carrying out setting for sharing a plurality of CPUs and a plurality of I/O equipment while increasing redundancy.

SUMMARY OF THE INVENTION

An I/O equipment sharing system of the present invention is characterized in that a plurality of CPUs are connected to a plurality of I/O equipment through at least a plurality of upstream PCI Express-bridges disposed corresponding to the plurality of CPUs and through a plurality of downstream PCI Express-bridges connected to the plurality of upstream PCI Express-bridges through a network and disposed corresponding to the plurality of I/O equipment, the plurality of upstream PCI Express-bridges and the plurality of downstream PCI Express-bridges include identifier setting units for setting the same identifier to the upstream and downstream PCI Express-bridges and filtering units for carrying out filtering by the set identifiers, respectively and the plurality of upstream PCI Express-bridges communicate with the downstream PCI Express-bridges by a frame to which the identifiers are added.

In an I/O equipment sharing method of the present invention which shares a plurality of I/O equipment between a plurality of CPUs in an I/O equipment sharing system in which the plurality of CPUs are connected to the plurality of I/O equipment through at least a plurality of upstream PCI Express-bridges disposed corresponding to the plurality of CPUs and through a plurality of downstream PCI Express-bridges connected to the plurality of upstream PCI Express-bridges through a network and disposed corresponding to the plurality of I/O equipment, the I/O equipment sharing method is characterized by including the steps of setting the same identifier to the plurality of upstream PCI Express-bridges and to the plurality of downstream PCI Express-bridges, carrying out a communication by a frame to which the identifiers are added, and carrying out filtering by the plurality of upstream PCI Express-bridges and the plurality of downstream PCI Express-bridges using the set identifier.

An information processing apparatus sharing system of the present invention is characterized in that a plurality of upstream information processing apparatuses are connected to a plurality of downstream information processing apparatuses through at least a plurality of upstream bridges disposed corresponding to the plurality of upstream information processing apparatuses and through a plurality of downstream bridges connected to the plurality of upstream bridges through a network and disposed corresponding to the plurality of downstream information processing apparatuses, the plurality of upstream bridges and the plurality of downstream bridges include identifier setting units for setting the same identifier to the upstream and downstream bridges and filtering units for carrying out filtering by the set identifiers, respectively, and the plurality of upstream bridges communicate with the plurality of downstream bridges by a frame to which the identifiers are added.

In a downstream information processing apparatus sharing method the present invention which shares a plurality of downstream information processing apparatuses between a plurality of upstream information processing apparatuses in an information processing apparatus sharing system in which the plurality of upstream information processing apparatuses are connected to a plurality of downstream information processing apparatuses through at least a plurality of upstream bridges disposed corresponding to the plurality of upstream processing apparatuses and through a plurality of downstream bridges connected to the plurality of upstream bridges through a network and disposed corresponding to the plurality of downstream processing apparatuses, the downstream information processing apparatus sharing method is characterized by including the steps of setting the same identifier to the plurality of upstream bridges and to the plurality of downstream bridges, carrying out communication by a frame to which the identifiers are added and carrying out filtering by the plurality of upstream bridges and the plurality of downstream bridges using the set identifier.

Since a plurality of downstream information processing apparatuses (for example, I/O equipment) can be shared between a plurality of upstream information processing apparatuses (for example, CPUs) by setting the same identifier without setting networks, a management can be simply carried out, thereby the extendibility of a network can be increased.

BRIEF DESCRIPTION OF THE DRAWINGS

FIG. 16 is a view showing tables for holding the upstream PCI Express-Ethernet bridge in the I/O equipment sharing system of the first exemplary embodiment;

FIG. 17 is a view showing tables for holding the downstream PCI Express-Ethernet bridge in the I/O equipment sharing system of the first exemplary embodiment;

FIG. 18 is a view showing tables for holding the upstream PCI Express-Ethernet bridge in the I/O equipment sharing system of the second exemplary embodiment;

FIG. 38 is a view showing a VLAN ID information table of a VLAN ID setting server 2501 in the I/O equipment sharing system of the fourth exemplary embodiment;

FIG. 40 is a flowchart of a competition control when a VLAN ID is set;

FIG. 41 is a flowchart of a competition control when a plurality of CPUs request to belong the same I/O equipment; and FIG. 42 is a block diagram of other overall configuration of the sixth exemplary embodiment.

DESCRIPTION OF THE PREFERRED EMBODIMENTS

Figure 1:
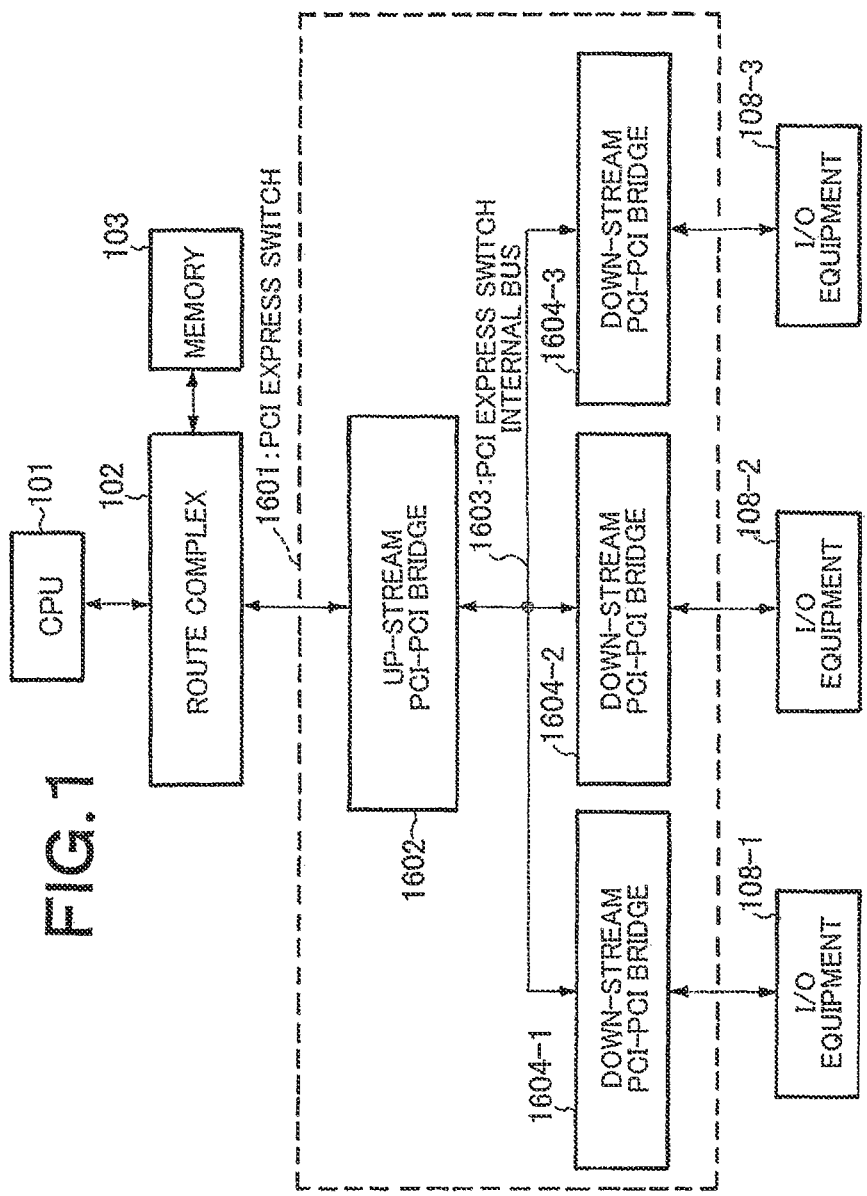
FIG. 1 is a block diagram of an overall configuration of a PCI Express.
Figure 2:
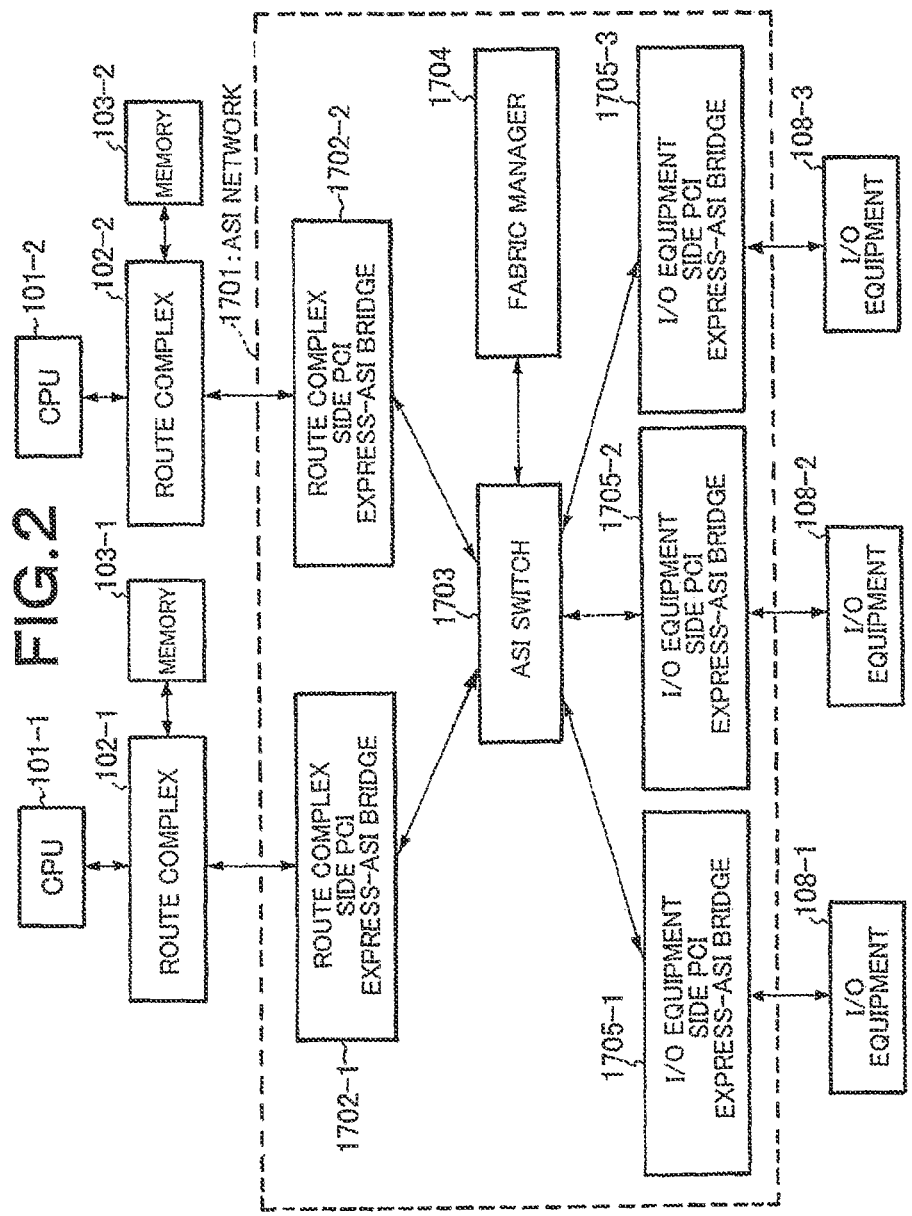
FIG. 2 is a block diagram of an overall configuration of an ASI.
Figure 3:
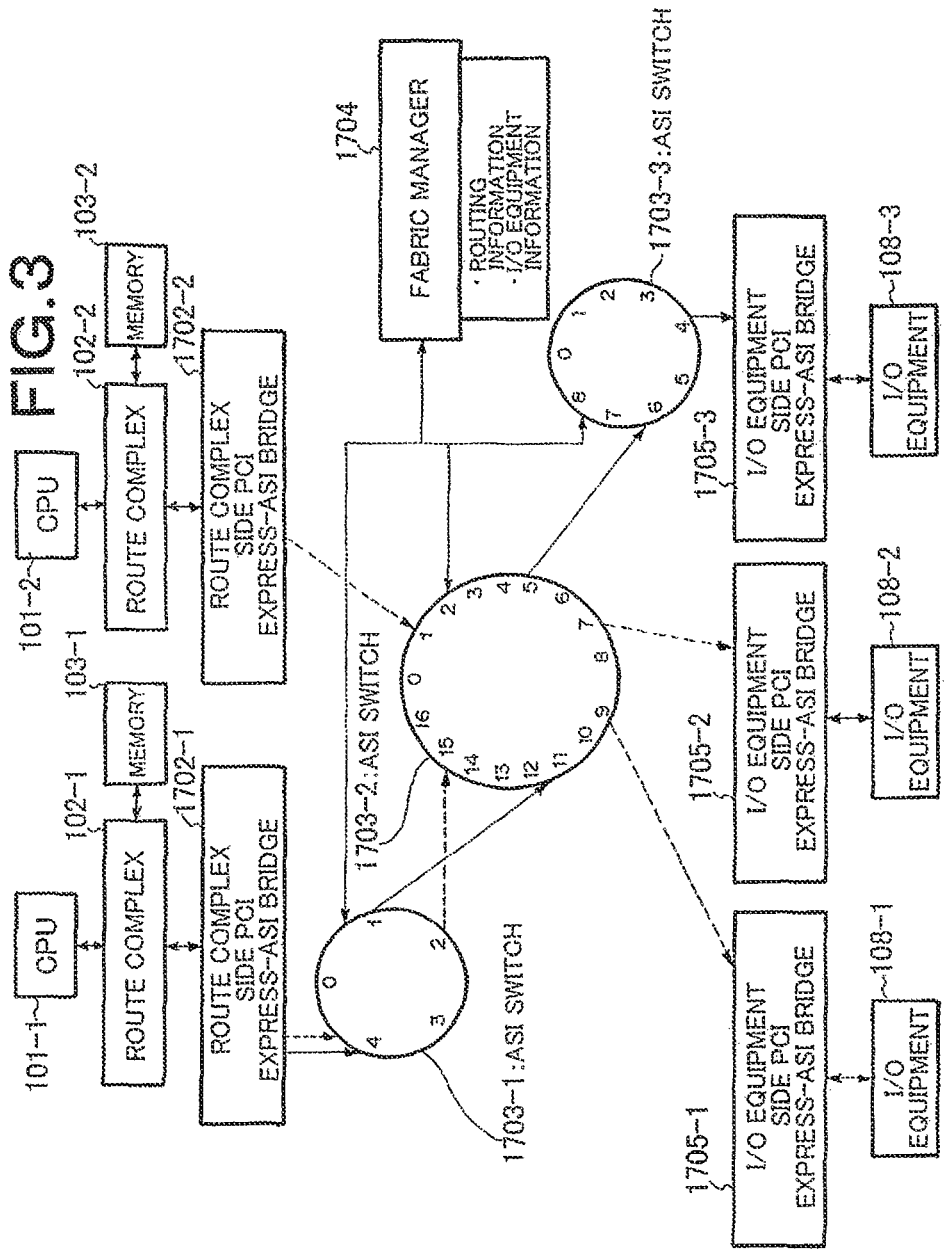
FIG. 3 a block diagram showing of a routing portion of the ASI.

Next, exemplary embodiments for carrying out the present invention will be explained in detail referring to the drawings. Note that, although a PCI Express is exemplified in the exemplary embodiments as an example of a bus standard for connecting between respective parts in a computer, the present invention is not limited to the standard. That is, the present invention can be applied to an information processing apparatus sharing system and method. In the information processing apparatus sharing system and method, a connection between a plurality of upstream information processing apparatuses (for example, CPUs and a plurality of I/O equipment) and a plurality of downstream information processing apparatuses is carried out through at least a plurality of upstream bridges and a plurality of downstream bridges. The plurality of upstream bridges are disposed corresponding to the plurality of upstream information processing apparatuses. The plurality of downstream bridges are connected to the upstream bridges through a network and disposed corresponding to the plurality of downstream information processing apparatuses. Further, the present invention is not limited to a connection of a plurality of CPUs and a plurality of I/O equipment and can be widely applied to systems for and methods of carrying out sharing in a connection between a plurality of upstream information processing apparatuses and a plurality of downstream information processing apparatuses such as a connection between a plurality of I/O equipment and a plurality of I/O equipment.

(1) First Exemplary Embodiment 1-1) Explanation of Configuration

Figure 4:
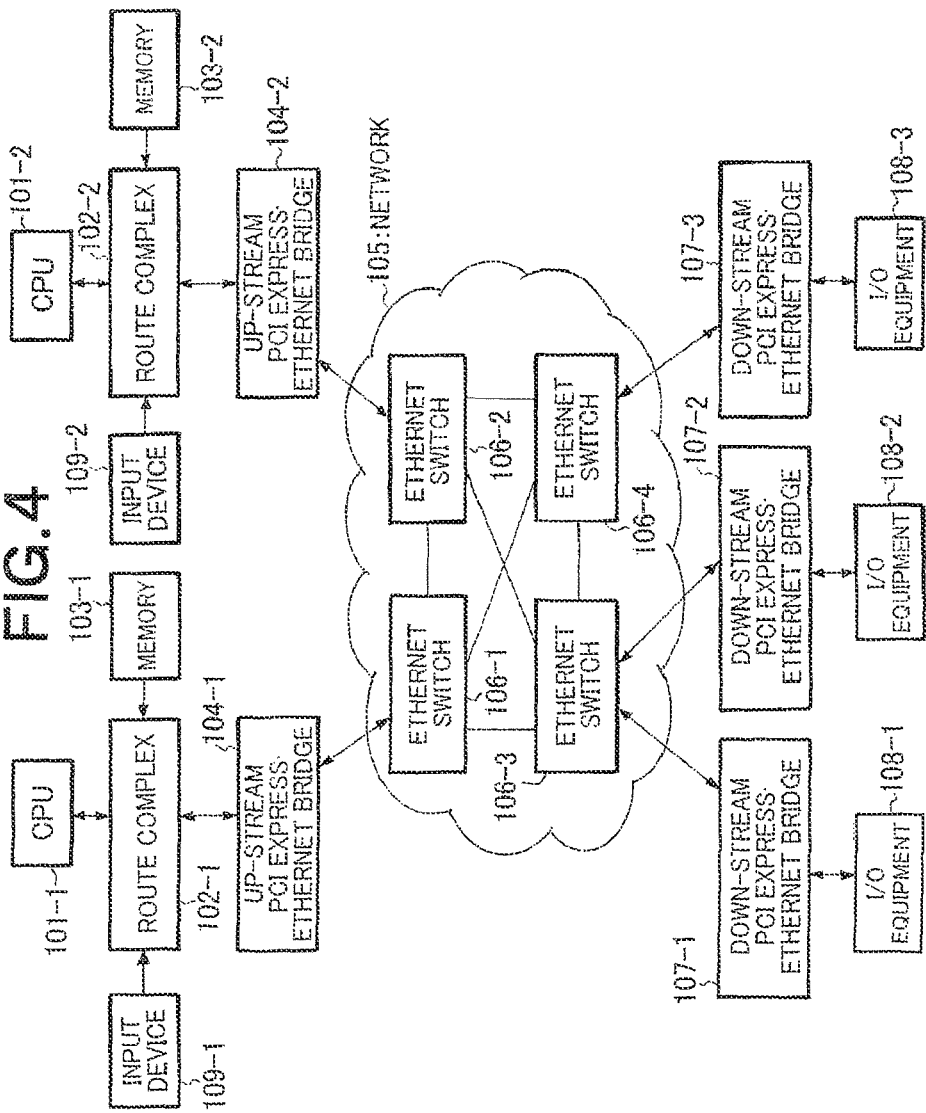
FIG. 4 is a block diagram showing an overall configuration of an I/O equipment sharing system of a first exemplary embodiment.

FIG. 4 is a block diagram showing a configuration of an I/O equipment sharing system of the exemplary embodiment.

The I/O equipment sharing system includes CPUs 101-1 and 101-2, route complexes 102-1 and 102-2 realized by chipsets, memories 103-1 and 103-2, upstream PCI Express-Ethernet (registered trademark) bridges (hereinafter, abbreviated as upstream bridges) 104-1 and 104-2, Ethernet (registered trademark) switches 106-1 to 106-4 constituting a network 105, downstream PCI Express-Ethernet bridges (hereinafter abbreviated as downstream bridges) 107-1 to 107-3, three pieces of I/O equipment 108-1 to 108-3, and input devices 109-1 and 109-2.

The route complex 102-1 is connected to the CPU 101-1, the memory 103-1 the input device 109-1, and the upstream bridge 104-1, and the route complex 102-2 is connected to the CPU 101-2, the memory 103-2, the input device 109-2, and the upstream bridge 104-2. The CPUs 101-1 and 101-2 are coupled to the upstream bridge 104-1 and 104-2, respectively. Further, the I/O equipment 108-1 to 108-3 are connected to the downstream bridges 107-1 to 107-3, respectively. The upstream bridges 104-1, 104-2 and the downstream bridges 107-1 to 107-3 are connected to the Ethernet switches 106-1 to 106-4 that constitute the network 105, respectively. The respective Ethernet switches 106-1 to 106-4 are connected to constitute a network through which data can be transmitted from arbitrary one of the upstream bridges 104-1, 104-2 to arbitrary one of the downstream bridges 107-1 to 107-3.

Figure 5:
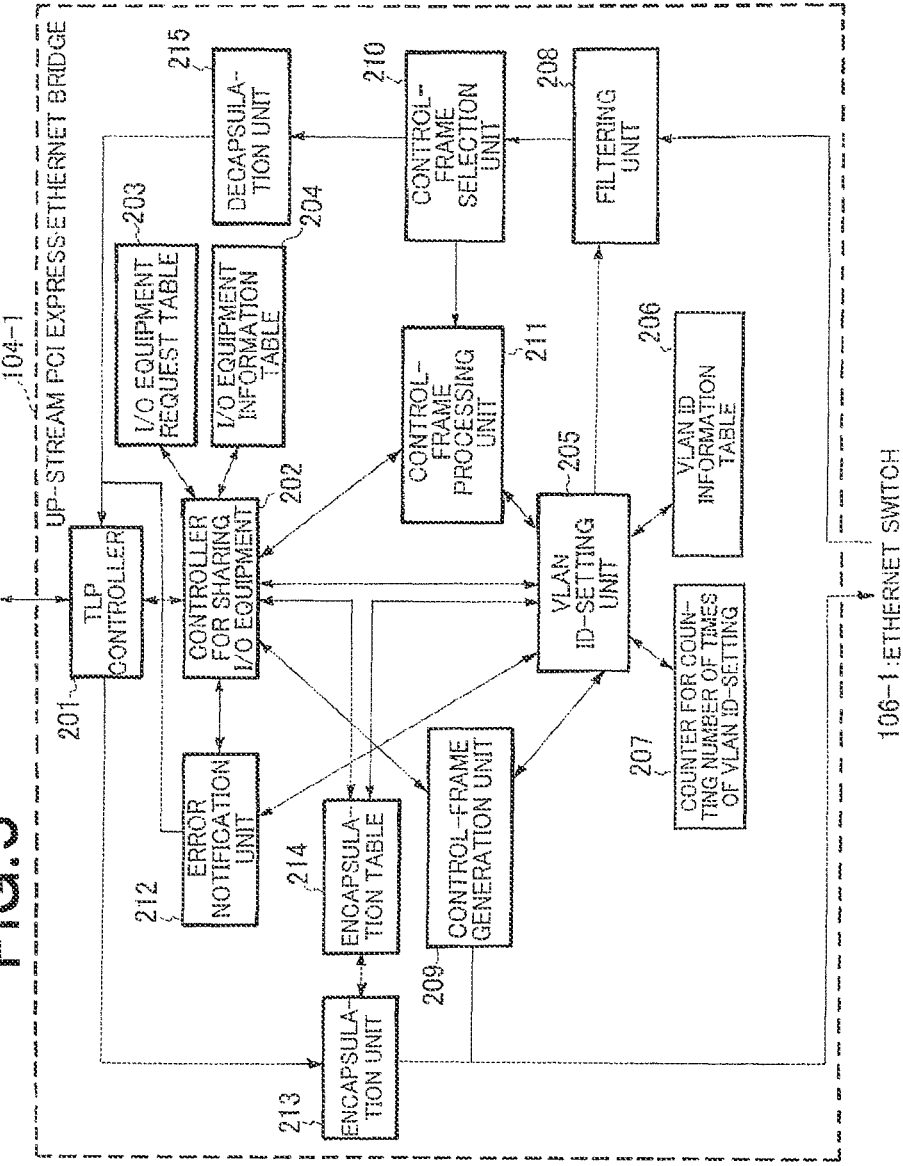
FIG. 5 is a block diagram showing a configuration of an upstream PCI Express-Ethernet bridge in the I/O equipment sharing system of the first exemplary embodiment.

FIG. 5 is a block diagram showing an internal structure of the upstream bridge 104-1. Although the structure of the upstream bridge 104-1 is shown here, the upstream bridge 104-2 has a similar structure. An upstream bridge 104-1 holds a MAC address and has a function for encapsulating and decapsulating TLP to/from an Ethernet (registered trademark) frame (frame format with IEEE802.3 Tag (frame format obtained by expanding (IEEE802.1Q))) to transmit and receive, and a function for setting a VLAN ID (acting as an identifier) and controlling setting for sharing I/O equipment.

As shown in FIG. 5, the upstream bridge 104-1 includes a TLP controller 201 for processing the TLP, an I/O equipment sharing controller 202 for controlling setting for sharing the I/O equipment 108-1 to 108-3, an I/O equipment request table 203 for holding the information of I/O equipment necessary to a user, an I/O equipment information table 204 for holding the I/O equipment information from the respective downstream bridges 107-1 to 107-3, a VLAN ID setting unit 205 for controlling setting of a VLAN ID, and a VLAN ID information table 206 for holding the VLAN ID setting information thereof (the upstream bridge 104-1) and the VLAN ID setting information from the upstream bridge 104-2.

Further, the upstream bridge 104-1 includes a counter 207 for counting the number of times of the VLAN ID-setting, a filtering unit 208 for filtering the frames other than the frame of a set MAC address and a set VLAN ID, a control frame generation (creation) unit 209 for generating a control frame, a control frame selection unit 210 for selecting a control frame and an encapsulated frame, a control frame processing unit 211 for processing the control frame, an error notification unit 212 for notifying the user of occurrence of an error, an encapsulation unit 213 for adding a destination MAC address and affiliation VLAN ID to the TLP and encapsulating the added TLP to an encapsulated frame (capsulized frame), an encapsulation table 214 for holding the information of the MAC address and the affiliation VLAN ID corresponding to the TLP destination in encapsulation, and a decapsulation unit 215 for decapsulating the TLP from the encapsulated frame.

The TLP controller 201 is connected to the route complex 102-1, the I/O equipment sharing controller 202, the error notification unit 212, the encapsulation (capsulization) unit 213, and the decapsulation (decapsulization) unit 215. The I/O equipment sharing controller 202 is connected to the TLP controller 201, the I/O equipment request table 203, the I/O equipment information table 204, the VLAN ID setting unit 205, the control frame generation unit 209, the control frame processing unit 211, the error notification unit 212, and the encapsulation table 214. The VLAN ID setting unit 205 is connected to the I/O equipment sharing controller 202, the VLAN ID information table 206, counter 207 for counting number of times of VLAN ID-setting, the filtering unit 208, the control frame generation unit 209, the control frame processing unit 211, the error notification unit 212, and the encapsulation table 214. The filtering unit 208 is connected to the VLAN ID setting unit 205, the control frame selection unit 210, and the Ethernet switch 106-1.

The control frame generation unit 209 is connected to the I/O equipment sharing controller 202, the VLAN ID setting unit 205, the encapsulation unit 213, and the Ethernet switch 106-1. The control frame selection unit 210 is connected to the filtering unit 208, the control frame processing unit 211, and the decapsulation unit 215. The encapsulation unit 213 is connected to the TLP controller 201, the encapsulation table 214, the Ethernet switch 106-1, and the control frame generation unit 209.

Next, the respective tables will be explained. A part (a) of FIG. 16 shows the I/O equipment request table 203. The I/O equipment request table 203 records the information of the I/O equipment requested by the user. The I/O equipment request table 203 holds Vender ID, Device ID, and Class Code prescribed by the PCI Express of necessary I/O equipment and Secured Flag, as items. A part (b) of FIG. 16 shows the I/O equipment information table 204. The I/O equipment information table 204 records the I/O equipment information transmitted from the respective downstream bridges. The I/O equipment information table 204 holds Vender ID, Device ID and Class Code prescribed by the PCI Express of I/O equipment, affiliation VLAN ID and MAC Address as items. A part (c) of FIG. 16 shows the VLAN ID information table 206. The VLAN ID information table 206 records the information of the VLAN ID and MAC Address set by the respective upstream bridges. The VLAN ID information table 206 holds affiliation VLAN ID, MAC Address, and decision Flag (fixed Flag) as items. A part (d) of FIG. 16 shows the encapsulation table 214. The encapsulation table 214 is a table which is referred to when the TLP is encapsulated. The encapsulation table 214 holds affiliation VLAN ID, MAC Address, Bus Number, Device Number, I/O Address, and Memory Address as items.

Figure 6:
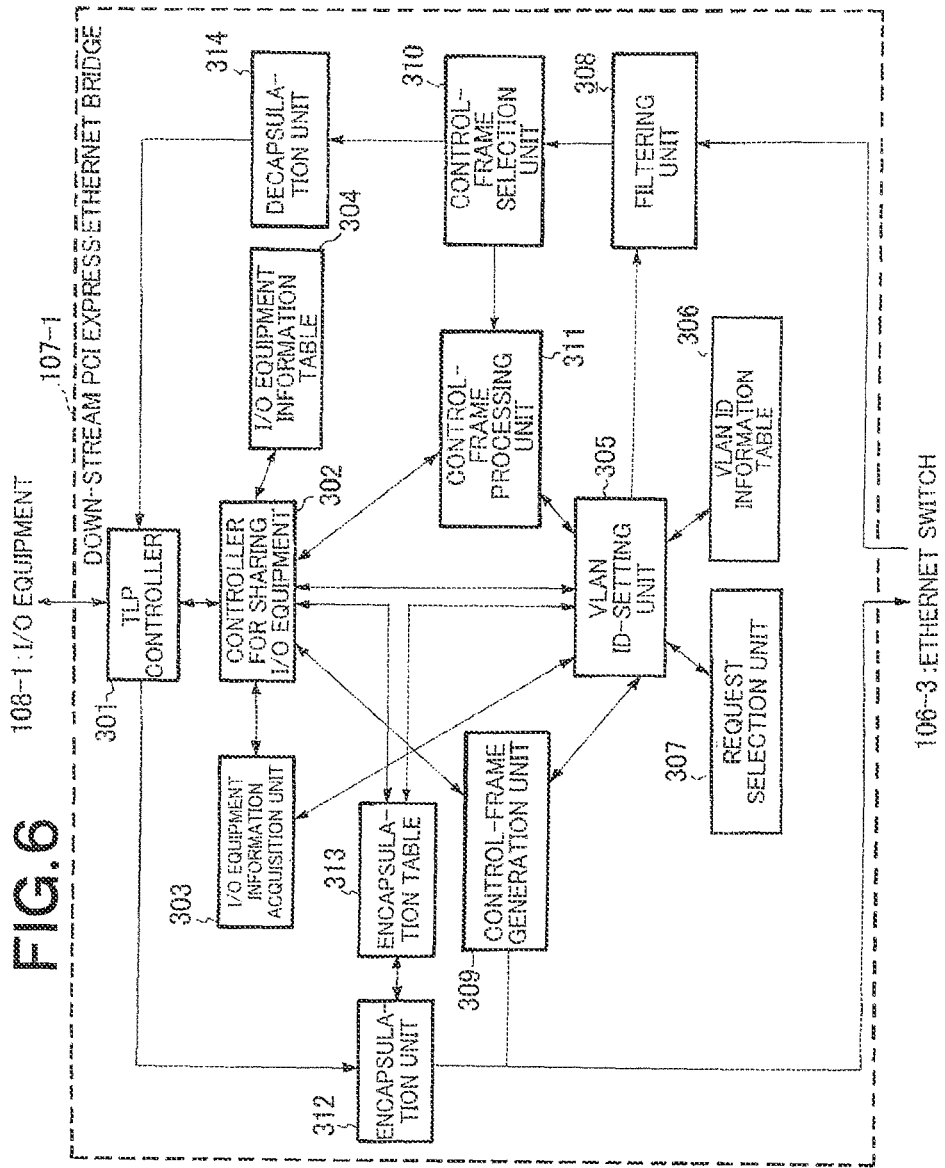
FIG. 6 is a block diagram showing a configuration of a downstream PCI Express-Ethernet bridge in the I/O equipment sharing system of the first exemplary embodiment.

FIG. 6 is a block diagram showing an internal configuration of the downstream bridge 107-1. Although the configuration of the downstream bridge 107-1 is shown here, the downstream bridge 107-2 and the downstream bridge 107-3 also have the same configuration. The downstream bridge 107-1 holds the MAC address and has a function for encapsulating and decapsulating the TLP to/from the Ethernet frame to transmit and receive, and a function for obtaining the information of the I/O equipment 108 and controlling setting for sharing I/O equipment.

The downstream bridge 107-1 includes a TLP controller 301 for processing the TLP, an I/O equipment sharing controller 302 for controlling setting for sharing the I/O equipment 108-1, an I/O equipment information acquisition unit 303 for acquiring the information of connected I/O equipment, an I/O equipment information table 304 for holding the I/O equipment information from the downstream bridges 107-2, 107-3 and the information of the I/O equipment connected thereto (to the downstream bridge 107-1), a VLAN ID setting unit 305 for controlling setting of the VLAN ID, and a VLAN ID information table 306 for holding the VLAN ID set information from the upstream bridges 104-1, 104-2.

Further, the downstream bridge 107-1 includes a request selection unit 307 for selecting one of VLAN ID setting requests from a plurality of the upstream bridges 104-1, 104-2, a filtering unit 308 for filtering the frames other than the frame of a set MAC address and a set VLAN ID, a control frame generation unit 309 for creating a control frame, a control frame selection unit 310 for selecting a control frame and an encapsulated frame, a control frame processing unit 311 for processing the control frame, an encapsulation unit 312 for adding the destination MAC address and affiliation VLAN ID to the TLP and encapsulating the added TLP to an encapsulated frame, an encapsulation table 313 for holding the information of the MAC address and the affiliated VLAN ID corresponding to the TLP destination in encapsulation, and a decapsulation unit 314 for decapsulating the TLP from the encapsulated frame.

The TLP controller 301 is connected to the I/O equipment 108-1, the I/O equipment sharing controller 302, the encapsulation unit 312, and the decapsulation unit 314. The I/O equipment sharing controller 302 is connected to the TLP controller 301, the I/O equipment information acquisition unit 303, the I/O equipment information table 304, the VLAN ID setting unit 305, the control frame creation unit 309, the control frame processing unit 311, and the encapsulation table 313. The VLAN ID setting unit 305 is connected to the I/O equipment sharing controller 302, the VLAN ID information table 306, the request selection unit 307, the filtering unit 308, the control frame creation unit 309, the control frame processing unit 311, and the encapsulation table 313.

The filtering unit 308 is connected to the VLAN ID setting unit 305, the control frame selection unit 310, and the Ethernet switch 106-3. The control frame creation unit 309 is connected to the I/O equipment sharing controller 302, the VLAN ID setting unit 305, and the Ethernet switch 106-3. The control frame selection unit 310 is connected to the filtering unit 308, the control frame processing unit 311, and the decapsulation unit 314. The encapsulation unit 312 is connected to the TLP controller 301, the encapsulation table 313, and the Ethernet switch 106-3.

Next, the respective tables will be explained. A part (a) of FIG. 17 shows the I/O equipment information table 304. The I/O equipment information table 304 records the I/O equipment information transmitted from the respective downstreams. The I/O equipment information table 304 holds Vender ID, Device ID, and Class Code prescribed by the PCI Express of I/O equipment and affiliation VLAN ID and MAC Address as items. A part (b) of FIG. 17 shows the VLAN ID Information table 306. The VLAN ID Information table 306 records the information of the VLAN ID and the MAC address set by the respective upstream bridges. The VLAN ID Information table 306 holds Affiliate VLAN ID, MAC Address, and Request Flag as items. A part (c) of FIG. 17 shows the encapsulation table 313. The encapsulation table 313 is a table referred to when the TLP is encapsulated. The encapsulation table 313 holds Affiliate VLAN ID, MAC Address, Bus Number, Device Number, I/O Address, and Memory Address are held as items.

1-2) Explanation of Operation of First Exemplary Embodiment

In the exemplary embodiment, a user carries out an operation for setting I/O equipment necessary to a system which is desired by a CPU manipulated by the user, and an operation for setting the VLAN ID among a plurality of CPUs, and an operation for setting for sharing a plurality of CPUs and a plurality of I/O equipment.

These operations are classified to an operation carried out just after a system starts, an operation carried out when a CPU is newly added to the system, an operation carried out when I/O equipment is newly added to the system, an operation carried out when a CPU is removed from the system, and an operation carried out when I/O equipment is removed from the system.

1) Just after System Starts

Just after the system starts, the filtering units 208 of the respective the upstream bridges 104-1,104-2 and the filtering units 308 of the respective downstream bridges 107-1 to 107-3 are set to receive all the frames of the VLAN IDs.

<Setting of System Architecture>

The user inputs the I/O equipment that he or she wants to use and stores the information of the I/O equipment to the upstream bridges. Setting to share the I/O equipment is carried out based on the stored information. The setting for sharing the I/O equipment is carried out by the following procedure.

First, the user sets I/O equipment necessary to him or her, for example, the I/O equipment 108-1, 108-2 using, for example, the input device 109-1. The set information is issued as a TLP, and the TLP controller 201 of the upstream bridge 104-1 writes necessary I/O equipment information (Vendor ID, Device ID, and Class Code prescribed by PCI Express) written to the TLP to the I/O equipment request table 203 through the I/O equipment sharing controller 202. The I/O equipment request table 203 is held even after a power supply is shut off so that data just before the power supply is shut off is reflected when the system starts next time.

Further, when a system configuration is changed while it is used by the user, the user sets I/O equipment necessary to him or her using the input device 109-1 likewise. The set information is issued as a TLP, and the TLP controller 201 of the upstream bridge 104-1 writes necessary I/O equipment information written to the TLP to the I/O equipment request table 203 through the I/O equipment sharing controller 202. Thereafter, the user carries out an I/O equipment sharing sequence.

Although the operation for setting the I/O equipment necessary to the user in the upstream bridge 104-1 using the input device 109-1 is explained here, an operation for setting I/O equipment necessary to other user in the upstream bridge 104-2 is carried out using the input device 109-2 likewise.

<Setting of VLAN ID>

Figure 7:
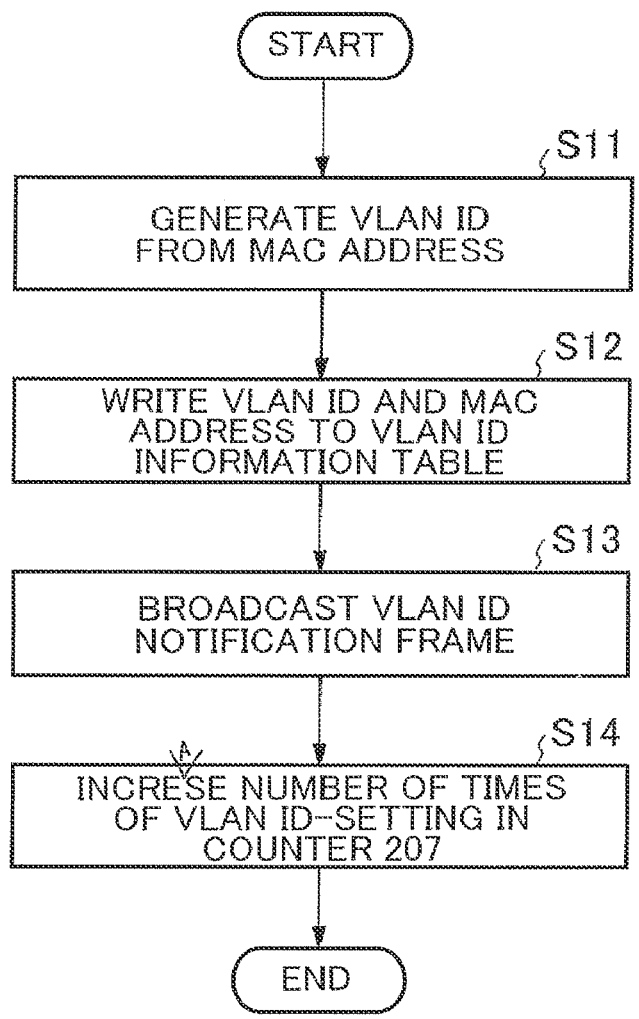
FIG. 7 is a flowchart of an initial setting operation of a VLAN ID.
Figure 8:
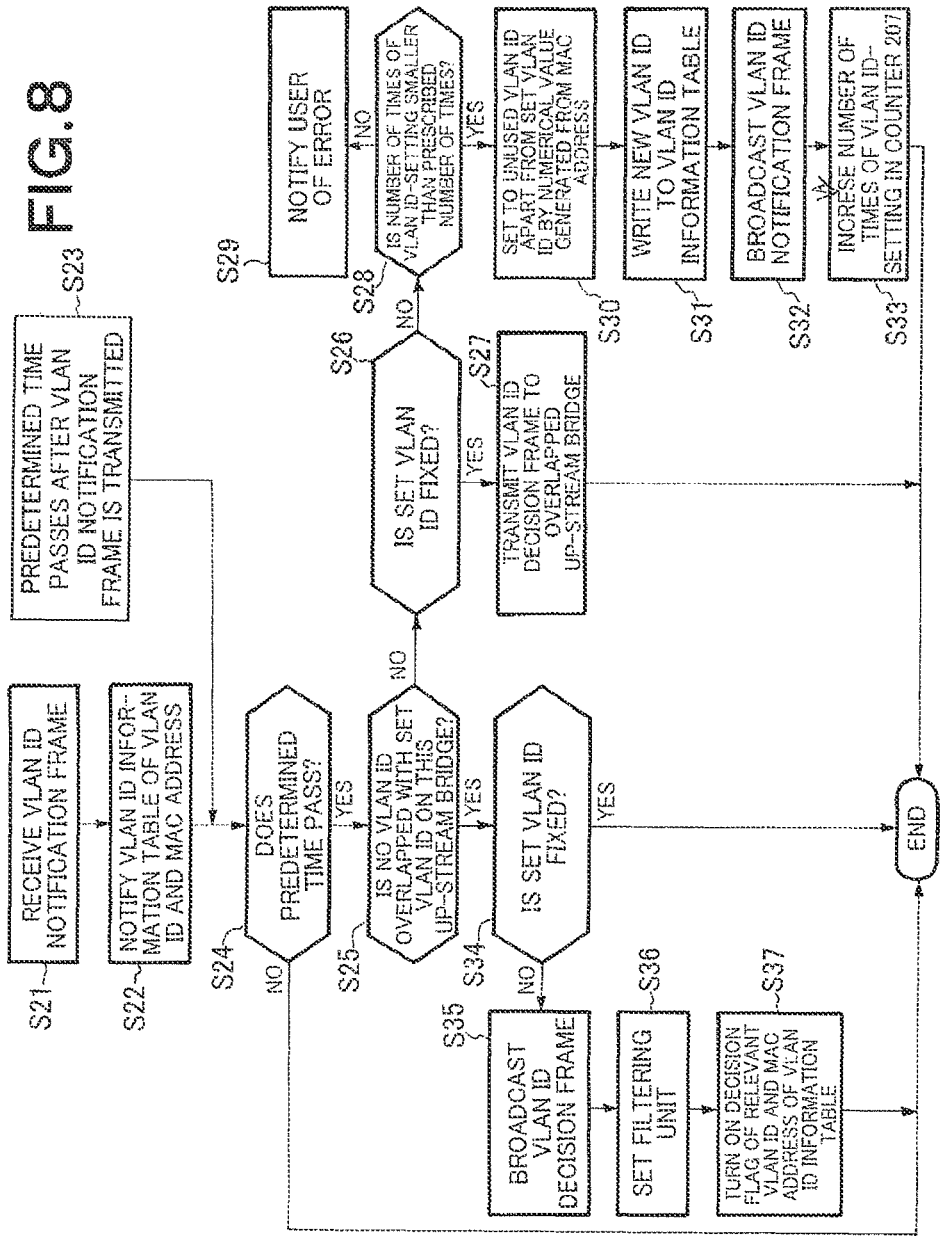
FIG. 8 is a flowchart of an operation when a VLAN ID notification frame is received or an operation when a predetermined time passes after a VLAN ID notification frame is transmitted.
Figure 9:
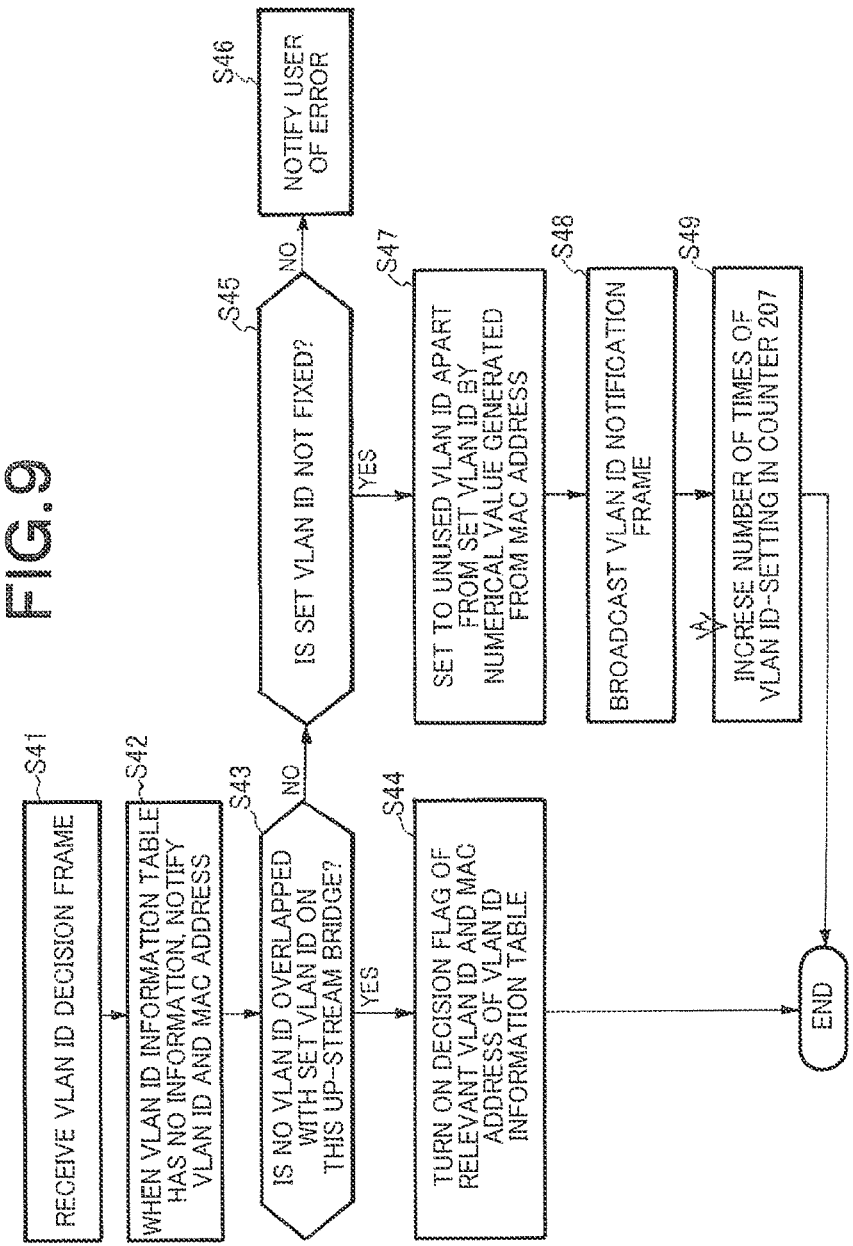
FIG. 9 is a flowchart of an operation when a VLAN ID decision frame is received.

Next, an operation for setting a VLAN ID (which acts as an identifier) between the upstream bridges 104-1, 104-2, which belong to the CPUs 101-1, 101-2, will be explained. FIGS. 7 to 9 show flowcharts. FIG. 7 shows a VLAN ID initially setting sequence. The operation in the upstream bridge 104-1 will be explained below.

First, as shown in FIG. 7, the VLAN ID setting unit 205 of the upstream bridge 104-1 creates the VLAN ID from a MAC address (step S11). The VLAN ID and the MAC address are written to the VLAN ID information table 206 (step S12). Thereafter, a VLAN ID notification frame is created to notify the other upstream bridge 104-2 of that which VLAN ID is set by the control frame generation unit 209, the upstream bridge 104-1 broadcasts the frame (step S13), and the number of times of VLAN ID-setting of the counter 207 is incremented (step S14).

The frame broadcasted from the upstream bridge 104-1 is distributed to the upstream bridge 104-2 and the respective downstream bridges 107-1 to 107-3 through the network 105.

The downstream bridges 107-1 to 107-3 which received the VLAN ID notification frame is selected by the control frame selection unit 310, and the control frame processing unit 311 abandons the VLAN ID notification frame.

FIG. 8 is a flowchart of an operation when the upstream bridge 104-2 receives the VLAN ID notification frame or an operation in a predetermined time passes after the VLAN ID notification frame is transmitted in the upstream bridge 104-1.

When the upstream bridge 104-2 receives the VLAN ID notification frame (step S21), the control frame processing unit 211 extracts the information of the VLAN ID and the MAC address from the VLAN ID notification frame selected by the control frame selection unit 210 and writes the information to the VLAN ID information table 206 (step S22). The upstream bridge 104-2 waits until a predetermined time passes and obtains the VLAN ID setting information of the other upstream bridge 104-1. The upstream bridge 104-1 waits until a predetermined time passes after the VLAN ID notification frame is transmitted and obtains the VLAN ID setting information of the other upstream bridge 104-2 (step S23). Although the following processing is explained as the operation of the upstream bridge 104-2, a similar operation is carried out also in the upstream bridge 104-1.

It is determined whether or not the predetermined time has passed (step S24), and when the predetermined time has passed, the VLAN ID setting unit 205 searches the VLAN ID information table 206 to confirm whether or not the set VLAN ID in the upstream bridge 104-2 is set in the other upstream bridge 104-1 (step S25).

When the VLAN ID thereof (the upstream bridge 104-2) overlaps the VLAN ID of the other upstream bridge 104-1, the VLAN ID setting unit 205 determines whether or not the set VLAN ID thereof is fixed (decided) by referring to the VLAN ID information table 206 (step S26). When the VLAN ID is fixed, the VLAN ID setting unit 205 transmits a VLAN ID decision (fixed) frame to the upstream bridge 104-1 to which overlapped setting is carried out, by the control frame generation unit 209 (step S27). When the set VLAN ID is not fixed, the VLAN ID setting unit 205 compares the number of times of the VLAN ID-setting in referring to the counter 207 with the prescribed number of set times (step S28). When a counter value exceeds the prescribed number of set times, the VLAN ID setting unit 205 notifies the user of an error using the error notification unit 212 (step S29). When the user receives the error, he or she carries out the VLAN ID initially setting sequence again by resetting the upstream bridge 104-2 (or manually set the VLAN ID in the VLAN ID initially setting sequence). When the counter value is equal to or less than the prescribed number of set times, the VLAN ID setting unit 205 sets a VLAN ID which is apart from the set VLAN ID by a numerical value created from the MAC address thereof, by referring to the VLAN ID information table 206 (step S30) and writes the VLAN ID to the VLAN ID information table 206 (step S31). Then, the control frame creation unit creates the VLAN ID notification frame of the new VLAN ID and broadcasts it (step S32), increments the number of times of VLAN ID-setting in the counter 207 (step S33), and waits for reception of a next VLAN ID notification frame.

When the VLAN ID of the upstream bridge 104-2 does not overlap that of the other upstream bridge 104-1, the VLAN ID setting unit 205 determines whether or not the set VLAN ID of the upstream bridge 104-2 is already fixed (step S34), and when the set VLAN ID of the upstream bridge 104-2 is already fixed, the VLAN ID notification frame reception sequence is finished. When the VLAN ID of the upstream bridge 104-2 is not fixed, a VLAN ID decision frame is created from the control frame generation unit 209 and broadcasted it (step S35), the filtering unit 208 is set to the VLAN ID or a VLAN ID 0 and set such that it can receive the MAC address thereof or a broadcast frame (step S36), and a decision flag (fixed flag) is attached to the relevant VLAN ID of the VLAN ID information table 206 (step S37), thereby the VLAN ID notification frame reception sequence is finished.

The frame broadcasted from the upstream bridge 104-2 is distributed to the upstream bridge 104-1 other than the upstream bridge 104-2 from which the frame was transmitted and the respective downstream bridges 107-1 to 107-3 through the network 105.

The respective downstream bridges 107-1 to 107-3, which received the VLAN ID decision frame, are selected by the control frame selection unit 310, respectively, and the control frame processing unit 311 extracts the information of the VLAN ID and the MAC address from the VLAN ID decision frame and writes the information together with a decision flag to the VLAN ID information table 306.

FIG. 9 shows a flowchart when the upstream bridge 104-1 receives the VLAN ID decision frame. When the upstream bridge 104-1 receives the VLAN ID decision frame (step S41), the VLAN ID decision frame selected by the control frame selection unit 210 extracts the VLAN ID and the MAC address of the frame in the control frame processing unit 211. When no relevant information exists in the VLAN ID information table 206, the VLAN ID setting unit 205 first writes the VLAN ID and the MAC address of the frame to the VLAN ID information table 206 (step S42). Thereafter, the VLAN ID setting unit 205 confirms whether or not the VLAN ID thereof overlaps with the extracted VLAN ID (step S43). When the VLAN ID thereof does not overlap, the VLAN ID setting unit 205 attaches a fixing mark to the relevant VLAN ID and MAC address of the VLAN ID information table (step S44), thereby the sequence is finished.

When the VLAN ID thereof overlaps, the VLAN ID setting unit 205 confirms whether or not the VLAN ID thereof is fixed (step S45). When the VLAN ID thereof is fixed, the VLAN ID setting unit 205 notifies the user of an error. (step S46). When the VLAN ID thereof is not fixed, the VLAN ID setting unit 205 sets a VLAN ID which is apart from the set VLAN ID by a numerical value created from the MAC address thereof referring to the VLAN ID information table 206 (step S47) and writes the VLAN ID to the VLAN ID information table 206. Then, the control frame creation unit creates the VLAN ID notification frame of the new VLAN ID and broadcasts it (step S47), increments the number of times of VLAN ID-setting in the counter 207 (step S49) and waits for reception of a next VLAN ID notification frame.

Further, the VLAN ID setting unit 205 transmits the VLAN ID notification frame, and when it does not receive a VLAN ID notification frame from the other upstream bridge 104-2 until a predetermined time passes, the VLAN ID setting unit 205 determines that no other starting upstream bridge exists. Thus, the VLAN ID setting unit 205 creates a VLAN ID decision frame from the control frame generation unit 209 and broadcasts it, and the filtering unit 208 is set to the VLAN ID or a VLAN ID 0 and set such that it can receive the MAC address thereof or a broadcast frame, and sets a decision flag to the relevant VLAN ID of the VLAN ID information table 206.

These operations are carried out by each of the upstream bridges 104-1, 104-2. Further, the VLAN ID initially setting sequence is carried out when the system is started and when it is reset, by using reception of the respective control frames as a trigger.

<Setting for Sharing I/O Equipment>

Figure 10:
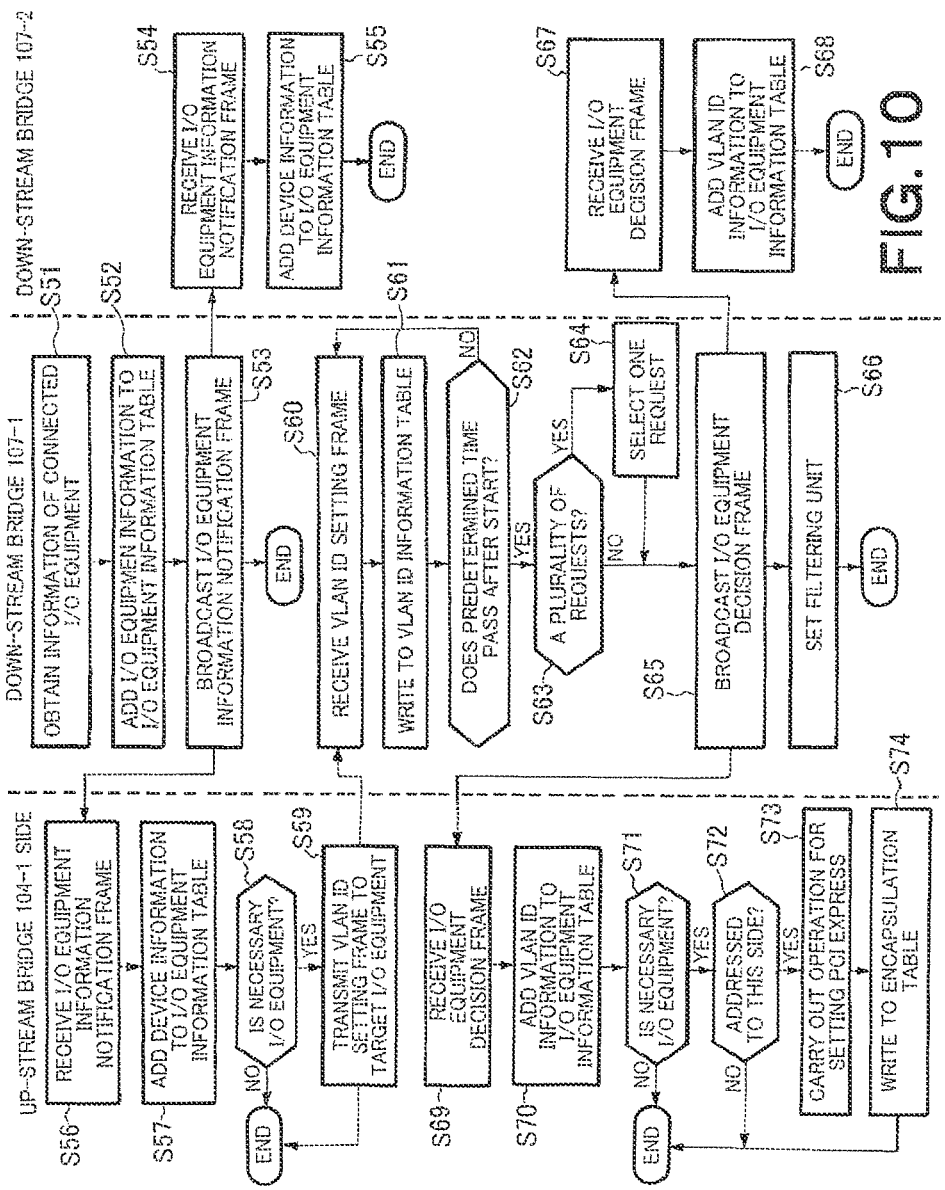
FIG. 10 is a flowchart of an I/O-equipment-sharing setting operation.

FIG. 10 shows an I/O-equipment-sharing setting sequence. Although the following operation is explained as to the operation of the downstream bridge 107-1, a similar operation is also carried out in the other downstream bridges 107-2, 107-3.

First, the downstream bridge 107-1 acquires the I/O equipment information (Vendor ID, Device ID, Class Code prescribed by PCI Express) of the I/O equipment 108-1 connected thereto using the I/O equipment information acquisition unit 303 (step S51). The downstream bridge 107-1 writes the acquired information and the MAC address thereof to the I/O equipment information table 304 (step S52). The control frame creation unit 309 creates an I/O equipment information notification frame based on the information and broadcasts it (step S53).

Note that when the I/O equipment 108-1 is not used by any of the CPUs 101-1 and 102-2, the I/O equipment information notification frame is set to an VLAN ID 0, whereas when the I/O equipment 108-1 is used by any of the CPUs 101-1 and 102-2, the I/O equipment information notification frame is set to the VLAN ID thereof, and the VLAN ID is periodically broadcasted from the downstream bridge 107-1.

The frame broadcasted from the downstream bridge 107-1 is distributed to the downstream bridges 107-2, 107-3 other than the downstream bridge 107-1 from which the frame was transmitted and the upstream bridges 104-1, 104-2 through the network 105.

The downstream bridge 107-2, which received the I/O equipment information notification frame (step S54) is selected by the control frame selection unit 310 (although explanation is carried out here as to the downstream bridge 107-2, this explanation is also applied to the downstream bridge 107-3 likewise). The control frame processing unit 311 reads the I/O equipment information and the MAC address from the I/O equipment information notification frame and writes them to the I/O equipment information table 304 (step S55).

Further, the downstream bridge 104-1, which received the I/O equipment information notification frame (step S56), is selected by the control frame selection unit 210 (although explanation is carried out here as to the upstream bridge 104-1, this explanation is also applied to the upstream bridge 104-2 likewise). The control frame processing unit 211 reads the I/O equipment information and the MAC address from the I/O equipment information notification frame and writes them to the I/O equipment information table 204 (step S57). Next, the I/O equipment sharing controller 202 compares the I/O equipment request table 203 with the I/O equipment information table 204 and confirms whether or not the I/O equipment required by the user exists (step S58). When the required I/O equipment does not exist, the I/O equipment-sharing setting sequence of in the upstream bridge 104-1 is finished. When the required I/O equipment exists, the control frame generation unit 209 creates a VLAN ID setting frame and transmits the VLAN ID setting frame to set a target I/O equipment to the VLAN ID thereof (step S59). As already described in the setting of system architecture, since the I/O equipment 108-1, 108-2 are set in the upstream bridge 104-1 as the I/O equipment necessary to the user, the VLAN ID setting frame is transmitted to the downstream bridges 107-1, 107-2.

The downstream bridge 107-1, which received the VLAN ID setting frame (step S60), is selected by the control frame selection unit 310, and the control frame processing unit 311 reads the VLAN ID and the MAC address from the VLAN ID setting frame and sets a request flag of the VLAN ID information table 306 (step S61). The downstream bridge 107-1 waits for arrival of the VLAN ID setting frame until a predetermined time passes after it starts (step S62). After the predetermined time has passed, a VLAN ID setting unit 304 first confirms whether or not a plurality of request flags of the VLAN ID information table 306 are set (step S63). When only one request flag is set, the VLAN ID setting unit 304 broadcasts an I/O equipment decision (fixed) frame created by the control frame creation unit 309 with the VLAN ID 0, to the upstream bridge 104-1 of the VLAN ID, the MAC address to which the request flag is set (step S65). When a plurality of request flags are set (when the VLAN ID setting frames are transmitted from both the upstream bridges 104-1, 104-2), the request selection unit 307 selects one request (step S64). The request selection unit 307 may select the request at random or by a method of preferentially selecting a request having a large or small VLAN ID value, a method of selecting a request near to the MAC address thereof, and the like. The I/O equipment decision frame created by the control frame creation unit 309 is broadcasted with the VLAN ID 0 to the upstream bridge 104-1 of the selected VLAN ID, MAC address (step S65). After the I/O equipment decision frame is transmitted, and the filtering unit 308 is set to the VLAN ID or a VLAN ID 0 and set such that it can receive the MAC address thereof or a broadcast frame (step S66), and the VLAN ID is written to the column thereof of the I/O equipment information table.

The frame broadcasted from the downstream bridge 107-1 is distributed to the downstream bridges 107-2, 107-3 other than the downstream bridge 107-1 from which the frame is transmitted and the upstream bridge 104-1 through the network 105. Although explanation is carried out here as to the downstream bridge 107-1, a similar operation is also carried out in the downstream bridge 107-2 which received the VLAN ID setting frame.

The downstream bridge 107-2, which received the I/O equipment decision frame (step S67), is selected by the control frame selection unit 310 (although explanation is carried out here as to the downstream bridge 107-2, this explanation is also applied to the downstream bridge 107-3 likewise), and the control frame processing unit 311 reads the I/O equipment information of a transmission source and the VLAN ID information of a set destination from the I/O equipment decision frame and writes them to the I/O equipment information table 304 (step S68).

The upstream bridge 104-1, which received the I/O equipment decision frame (step S69) is selected by the control frame selection unit 210, and the control frame processing unit 211 reads the I/O equipment information of the transmission source and the VLAN ID information of the set destination from the I/O equipment decision frame and writes them to the I/O equipment information table 204 (step S70). Further, the I/O equipment sharing controller 202 determines whether or not the I/O equipment of the transmission destination is I/O equipment necessary to it (step S71). When the I/O equipment of the transmission destination is not the I/O equipment necessary to the I/O equipment sharing controller 202, it finishes the I/O equipment decision frame reception sequence. When the I/O equipment of the transmission destination is the I/O equipment necessary to the I/O equipment sharing controller 202, it compares the VLAN ID thereof with the VLAN ID of the set destination of the I/O equipment decision frame to determine whether or not the I/O equipment is destined to it (step S72). When the I/O equipment is not destined to it, the I/O equipment sharing controller 202 finishes the I/O equipment decision frame reception sequence. When the I/O equipment is destined to it, the I/O equipment sharing controller 202 carries out a PCI Express setting operation such that the CPU 101-1 thereof can use the I/O equipment (step S73), subsequently records the MAC address and the VLAN ID of the I/O equipment and the bus number, the device number, the I/O address, and the memory address of a PCI Express which are set to the encapsulation table 214 (step S74), and finishes the operation.

When the I/O equipment sharing controller 202 receives no I/O equipment decision frame destined thereto when a predetermined time passes after the upstream bridge 104-1 transmits the VLAN ID setting frame, it notifies the user of that sharing of I/O equipment fails.

2) In Ordinary Operation (Communication Between CPU and I/O Equipment)

Next, how communication is carried out between a route complex and I/O equipment in an ordinary operation after the I/O equipment is shared will be explained. Explanation will be made here as to communication between the route complex 102-1 and the I/O equipment 108-1.

Figure 11:
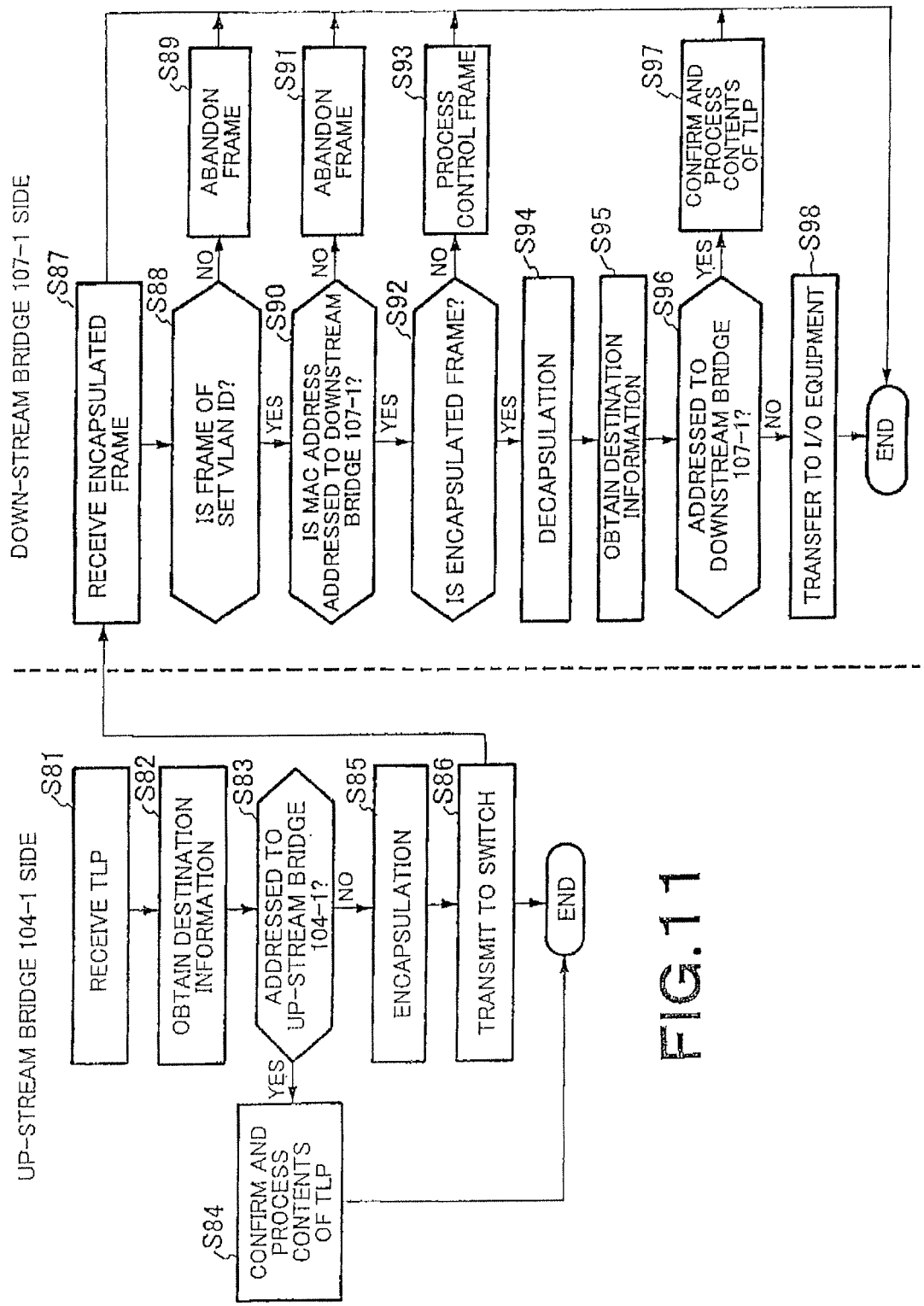
FIG. 11 is a flowchart of communication between the upstream PCI Express-Ethernet bridge and the downstream PCI Express-Ethernet bridge in an ordinary operation.

FIG. 11 shows a communication procedure in the ordinary operation. First, a case, in which the upstream bridge 104-1 receives a TLP, will be explained. The upstream bridge 104-1, which received the TLP from the route complex 102-1 (step S81), reads the destination information of the TLP by the TLP controller 201 (step S82). The upstream bridge 104-1 determines whether or not the destination is directed thereto (step S83), and when it is directed thereto, since the TLP accesses the upstream bridge 104-1 upstream thereof, the TLP controller reads the contents of the TLP and processes the contents thereof (step S84). When the destination is not directed thereto, the TLP is encapsulated to the encapsulated frame of the MAC address and the VALN ID of the destination in the encapsulation unit 213 based on the encapsulation table 214 (step S85) and transmitted to the Ethernet switch 106-1 (step S86).

Since the plurality of Ethernet switches 106, which constitute the network 105, have a self-leaning function, they automatically construct an address table and transfer the encapsulated frame to the downstream bridge 107-1 of the destination (it is assumed here that the destination is the downstream bridge 107-1).

The downstream bridge 107-1, which received the encapsulated frame (step S87), determines whether or not the encapsulated frame is the frame of a set VLAN ID in the filtering unit 308 (step S88), and the filtering unit 308 abandons the frames other than the frame of the set VLAN ID (step 89). Whereas, when the encapsulated frame is the frame of the set VLAN ID, the frame is accepted. Further, the filtering unit 308 confirms the MAC address of the destination (step S90), abandons the frames other than the frame destined thereto or a broadcasted frame (step S91) and accepts the frame destined thereto or the broadcasted frame. Next, the control frame selection unit 310 determines whether the frame is a control frame or an encapsulated frame (step S92). When the frame is the control frame, it is transferred to the control frame processing unit 311 and processed therein (step S93). When the frame is the encapsulated frame, it is transferred to the decapsulation unit 314 and decapsulated therein (step S94). The decapsulated TLP is transferred to the TLP controller 301, which reads the destination of the TLP (step S95) and determines whether the TLP is destined to the downstream bridge 107-1 (step S96). When the TLP is destined to the downstream bridge 107-1, TLP controller 301 confirms the contents of the TLP and processes them (step S97). When the destination is directed to the I/O equipment 108-1 to which the destination is connected, TLP controller 301 transfers the contents of the TLP to the I/O equipment 108-1 (step S98) to thereby finish the processing.

Figure 12:
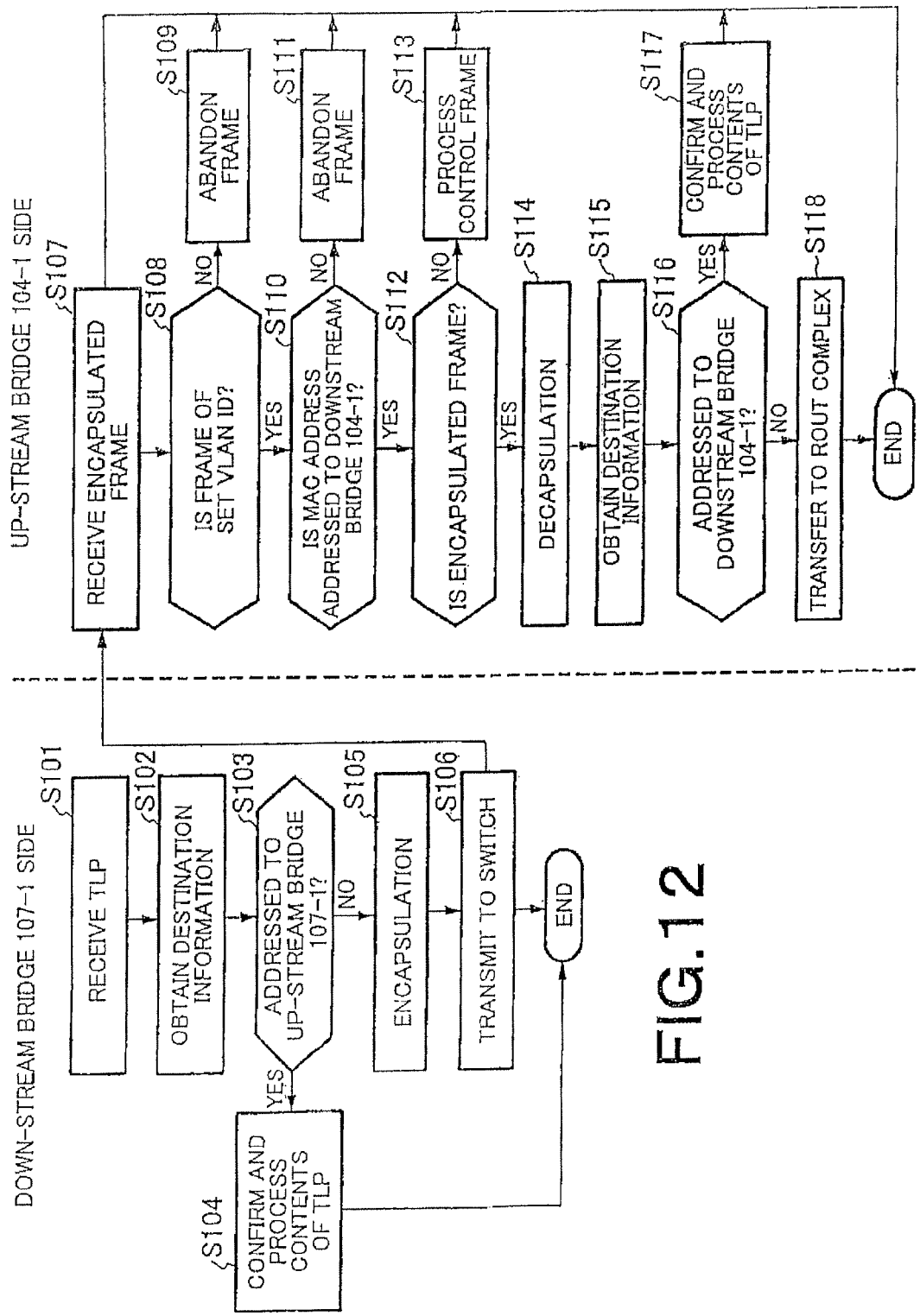
FIG. 12 is a flowchart of communication between the downstream PCI Express-Ethernet bridge and the upstream PCI Express-Ethernet bridge in an ordinary operation.

Next, a case, in which the downstream bridge 107-1 receives the TLP from the I/O equipment 108-1, will be explained using FIG. 12. The downstream bridge 107-1, which received the TLP (step S101), reads the destination information of the TLP in the TLP controller 301 (step S102) and determines whether or not the destination is directed thereto (step S103). When the destination is directed thereto, since the TLP accesses the downstream bridge 107-1 thereof, the TLP controller reads the contents of the TLP and processes the contents (step S104). When the destination is not directed thereto, the TLP is encapsulated to the encapsulated frame of the MAC address and the VALN ID of the destination in the encapsulation unit 312 based on the encapsulation table 313 (step S105), transmitted to the Ethernet switch 106-3 (step S106), transferred in the network 105, and transmitted to the target upstream bridge 104-1 (it is assumed here that the target upstream bridge is the upstream bridge 104-1).

The upstream bridge 104-1, which received the encapsulated frame (step S107), determines whether or not the encapsulated frame is the frame of a set VLAN ID in the filtering unit 208 (step S108), the filtering unit 208 abandons the frames other than the frame of the set VLAN ID (step 109). Whereas, when the encapsulated frame is the frame of the set VLAN ID, the frame is accepted. Further, the filtering unit 208 confirms the MAC address of the destination (step S110), abandons the frames other than the frame destined thereto or a broadcast frame (step S111) and accept the frame destined thereto or the broadcasted frame. Next, the control frame selection unit 210 determines whether the frame is a control frame or an encapsulated frame (step S122). When the frame is the control frame, it is transferred to the control frame processing unit 211 and processed therein (step S113). When the frame is the encapsulated frame, it is transferred to the decapsulation unit 215 and decapsulated therein (step S114). The decapsulated TLP is transferred to the TLP controller 201, which reads the destination of the TLP (step S115) and determines whether the TLP is destined to the downstream bridge 104-1 (step S116). When the TLP is destined to the downstream bridge 104-1, the TLP controller 201 confirms the contents of the TLP and processes them (step S117). When the destination is directed to the route complex 102-1 to which the destination is connected, the TLP controller 201 transfers the contents of the TLP to the route complex 102-1 (step S118) to thereby finish the processing.

3) When CPU is Newly Added

An operation, which is carried out when a CPU, a route complex, a memory, an upstream bridge, an input device are newly added while the system is being operated, will be explained. It is assumed here that a CPU 101-3, a route complex 102-3, a memory 103-3, an upstream bridge 104-3, an input device 109-3 (not shown) are added, and the CPU 101-3, the route complex 102-3, the memory 103-3, the upstream bridge 104-3, and the input device 109-3 which are newly added will be mainly explained below. When they are newly added, setting for system architecture, setting for a VLAN ID, and setting for sharing I/O equipment are carried out likewise when the system starts. First, a setting of system architecture is the same as that carried out just after the system starts.

Next, the newly added upstream bridge 104-3 sets a VLAN ID to set the VLAN ID thereof. Although a basic operation is the same as that just after the system starts except that the VLAN IDs of the other upstreams bridge 104-1, 104-2 are already fixed. The operation is carried out according to FIGS. 7 to 9.

Further, the setting for sharing the I/O equipment is carried out according to FIG. 10. A downstream bridge connected to I/O equipment, which is not used, periodically transmits an I/O equipment information notification frame by a VLAN 0. A sharing-of-I/O-equipment setting sequence is started by receiving the I/O equipment information notification frame, thereby I/O equipment are shared, and the operation shifts to an ordinary operation.

4) When I/O Equipment is Newly Added

An operation, which is carried out when a downstream bridge and I/O equipment are newly added, will be explained. It is assumed here that a downstream bridge 107-4 and I/O equipment 108-4 (not shown) are newly added. At the time, an operation is started from the operation in which the added downstream bridge 107-4 obtains the information of the added I/O equipment 108-4. Thereafter, the setting is carried out according to a procedure shown in FIG. 10, and then the operation shifts to an ordinary operation.

5) When CPU is Removed from System

A procedure for removing a CPU, a route complex, a memory, an upstream bridge, and an input device while a system is in operation will be explained. It is assumed here that a CPU 101-1, a route complex 102-1, a memory 103-1, an upstream bridge 104-1, and an input device 109-1 are removed. When it is assumed here that the upstream bridge 104-1 to be removed uses, for example, the downstream bridge 107-1 and the I/O equipment 108-1, a VLAN ID removing frame created by the control frame generation unit 209 is transmitted to the target I/O equipment 108-1 to cancel the setting for sharing the downstream bridge 107-1 and the I/O equipment 108-1. The downstream bridge 107-1, which received the VLAN ID removing frame, resets the I/O equipment 108-1 connected to the downstream bridge 107-1 itself. The reset downstream bridge 107-1 starts an I/O-equipment-sharing setting operation and broadcasts an I/O equipment information notification frame of a VLAN 0. The upstream bridge 104-1 being removed, which received the broadcasted I/O equipment information notification frame, removes relevant I/O equipment information from the I/O equipment request table 203.

The operation is repeated until all the I/O equipment whose secured state flags are set in the I/O equipment request table 203 are removed. After all the secured I/O equipment are removed, the CPU 101-1, the route complex 102-1, the memory 103-1, the upstream bridge 104-1, and the input device 109-1 are placed in a removable state and removed.

6) When I/O Equipment is Removed from System

A procedure for removing I/O equipment being operated from a system in operation will be explained. It is assumed here that the CPU 101-1 is connected to the I/O equipment 108-1, and the I/O equipment 108-1 is to be removed. A removal operation is started in response to a removal instruction from the I/O equipment 108-1 (depression of an attention button) or a removal instruction from the user of the I/O equipment 108-1. When the removal instruction issued from the I/O equipment 108-1, a command based on a PCI Express is issued through communication between the CPU 101-1 and the I/O equipment 108-1 in ordinary operation. When the I/O equipment is removed, since the I/O equipment information notification frame, which is periodically transmitted, is not received by the upstream bridge 104-1, relevant I/O equipment information is removed from the I/O equipment information table 204 and the secured flag of the I/O request table 203 are removed.

On the other hand, when the upstream bridge 104-1 receives the removal instruction from the user, the upstream bridge 104-1, which received the removal instruction, transmits an I/O equipment removing frame created by the control frame generation unit 209 to the target downstream bridge 104-1. The downstream bridge 107-1, which received the I/O equipment removing frame, is selected by the control frame selection unit 310, information is read by the control frame processing unit 311, an I/O removal instruction TLP is sent from the TLP controller 301 to the I/O equipment 108-1, and the I/O equipment 108-1 is placed in a state in which it issues a removal instruction and thereby, an operation is carried out in the same procedure as that in the above case in which the removal instruction issued from the I/O equipment 108-1.

7) When Sharing of I/O Equipment is Cancelled

A procedure for canceling sharing of I/O equipment in use while the system in operation will be explained. It is assumed here that sharing of the I/O equipment 108-1 used by the CPU 101-1 is cancelled. Cancel of sharing is started in response to a removal instruction from the user. The upstream bridge 104-1, which received a removal instruction TLP, transmits a VLAN ID removing frame created by the control frame generation unit 209 to the target I/O equipment 108-1 to cancel the setting for sharing the downstream bridge 107-1 and the I/O equipment 108-1 in use. The downstream bridge 107-1, which received the VLAN ID removing frame, resets the I/O equipment 108-1 connected to the downstream bridge 107-1 itself. The reset downstream bridge 107-1 starts an I/O-equipment-sharing setting operation and broadcasts an I/O equipment information notification frame of a VLAN 0. The upstream bridge 104-1 being removed, which received the broadcasted I/O equipment information notification frame, removes relevant I/O equipment information from the I/O equipment request table 203. Further, when a request for carrying out setting for sharing the I/O equipment issued, the I/O equipment 108-1 whose sharing is cancelled starts the sharing-of-I/O-equipment setting sequence.

8) When Power Supply to CPU is Shut Off

A case, in which a power supply to the CPU 101-1 and the upstream bridge 104-1 is shut off contrary to the intension of the user when the system is in operation, will be explained. It is assumed here that the CPU 101-1 uses the I/O equipment 108-1. When the power supply to the CPU 101-1 and the upstream bridge 104-1 is shut off, the I/O equipment 108-1 used by the upstream bridge 104-1 and the CPU 101-1 does not receive data from the upstream bridge 104-1. When this state continues for a predetermined time, the control frame creation unit 309 of the downstream bridge 107-1 to which the I/O equipment 108-1 is connected transmits an I/O equipment confirmation frame to the upstream bridge 104-1. When the CPU 101-1 and the upstream bridge 104-1 are in operation, the upstream bridge 104-1, which received the I/O equipment confirmation frame, returns a response, and the downstream bridge 107-1, which received the response, carries out an ordinary operation. However, when the CPU 101-1 and the upstream bridge 104-1 are not in operation, since no response is returned, the downstream bridge 107-1 resets the I/O equipment 108-1 connected to the downstream bridge 107-1 itself after a predetermined time passes. The reset downstream bridge 107-1 starts an I/O-equipment-sharing setting operation, broadcasts an I/O equipment information notification frame of a VLAN 0, and when there is a request for the setting for sharing the I/O equipment, a sharing-of-I/O-equipment setting sequence is started.

Although the case, in which three sets of the I/O equipment are shared between the two CPUs, is explained above, the number of them is not limited to the above number, and the configuration of the exemplary embodiment can be also applied to a case in which two or four or more I/O equipment are shared between three or more CPUs likewise. This is the same in the respective exemplary embodiments to be explained below.

1-3) Advantages of First Exemplary Embodiment

Setting for sharing I/O equipment between a plurality of CPUs can be automatically carried out by using the exemplary embodiment. And the setting for sharing I/O equipment is easily because the setting can be managed only the VLAN ID.

(2) Second Exemplary Embodiment 2-1) Explanation of Configuration

In the second exemplary embodiment, a VLAN ID is set to each of I/O equipment in use, and a plurality of the same I/O equipment are caused to belong to the same VLAN ID. One of the same I/O equipment is selected, and the frames of the I/O equipment other than the frame of the I/O equipment selected by a MAC address in the frames of the same VLAN IDs are abandoned by the setting the filtering portion of an upstream bridge.

When communication is carried out to I/O equipment, the I/O equipment is set to the VLAN ID and broadcasted, thereby a frame is distributed to a plurality of the same I/O equipment. The frame from the I/O equipment to the upstream bridge receives the frame from the I/O equipment selected by the setting carried out by the filtering portion.

Figure 13:
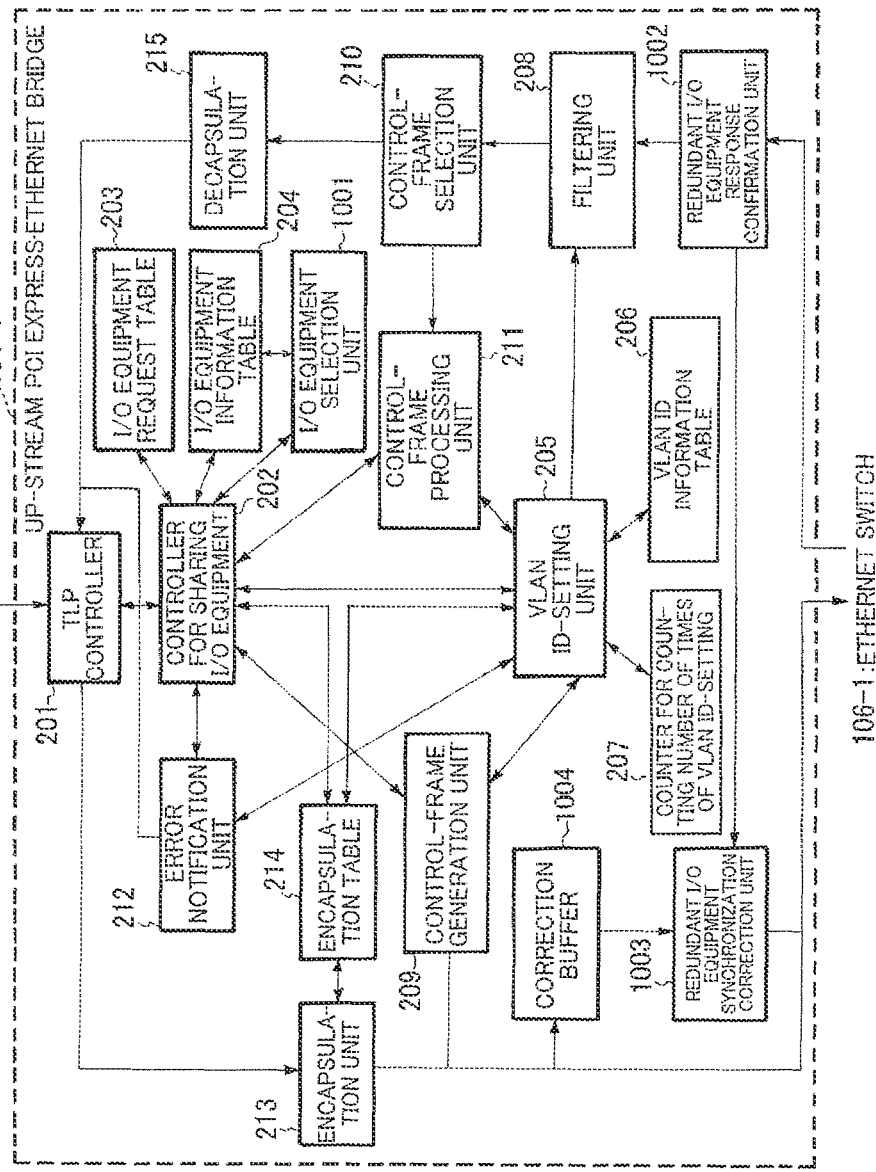
FIG. 13 is a block diagram showing a configuration of an upstream PCI Express-Ethernet bridge of a second exemplary embodiment.

Further, the second exemplary embodiment includes a redundancy I/O equipment response confirmation unit for confirming whether or not the response from the I/O equipment which is active at the time agrees with the responses from a plurality of I/O equipment in a stand-by state, a redundancy I/O equipment synchronization correcting unit and correction buffer for correcting an unsynchronized state, as a recovery means when an unsynchronized state occurs between a plurality of the same redundantly set I/O equipment Although the configuration of the second exemplary embodiment is the same as that of the first exemplary embodiment except the configuration of the upstream bridge, it is preferable that the I/O equipment includes a plurality of the same the I/O equipment. FIG. 13 shows the upstream bridge of the second exemplary embodiment. Although the configuration of an upstream bridge 104-1 is shown here, the configuration of an upstream bridge 104-2 is the same as that of the upstream bridge 104-1. The same components as those of FIG. 5 are denoted by the same reference numerals, and the explanation thereof is omitted. An I/O equipment sharing system has the same configuration as that of the exemplary embodiment 1 shown in FIG. 4.

In comparison with the upstream bridge 104 of the first exemplary embodiment shown in FIG. 5, an I/O equipment selection unit 1001, a redundant I/O equipment response confirmation unit 1002, a redundant I/O equipment synchronization correction unit 1003, and a correction buffer 1004 are added. The I/O equipment selection unit 1001 is connected to an I/O equipment sharing controller 202 and an I/O equipment information table 204. The redundant I/O equipment response confirmation unit 1002 is connected to the redundant I/O equipment synchronization correction unit 1003, a filtering unit 208, and an Ethernet switch 106-1. The redundant I/O equipment synchronization correction unit 1003 is connected to the redundant I/O equipment response confirmation unit 1002, the correction buffer 1004, and the Ethernet switch 106-1. The correction buffer 1004 is connected to the redundant I/O equipment synchronization correction unit 1003, a encapsulation unit 213, and a control frame generation unit 209. Further, the item of a set VLAN ID is added to the contents of an I/O equipment request table 203 of the upstream bridge 104-1. Further, the item of a flag in use is added to the I/O equipment information table 204.

A part (a) of FIG. 18 shows the I/O equipment request table 203. In the table 203, the item of an affiliation VLAN ID is added to the I/O equipment request table 203 of the first exemplary embodiment. A part (b) of FIG. 18 shows the I/O equipment information table 204. The item of a flag in use is added to the I/O equipment information table 204 of the first exemplary embodiment. The other tables have the same contents as those of the first exemplary embodiment.

2-2) Explanation of Operation of Second Exemplary Embodiment

Next, the operation the second exemplary embodiment will be explained.

1) Just after System Starts

Just after the system starts, the filtering units 208 of the upstream bridges 104-1, 104-2 and the filtering units 308 of downstream bridges 107-1 to 107-3 are set such that they can receive the frames of all the VLAN IDs.

<Setting of System Architecture>

A user inputs which I/O equipment he or she wants to use and a degree of redundancy and stores the information to the upstream bridge. I/O equipment is shared based on the stored information. A procedure for sharing it is as described below.

First, the user sets the I/O equipment which the user requires and the degrees of redundancy (number of secured sheets) of the respective I/O equipment using, for example, an input device 109-1. The information issued as a TLP, and a TLP controller 201 of the upstream bridge 104-1 writes the necessary I/O equipment information written to the TLP (Vendor ID, Device ID, and Class Code prescribed by PCI Express) to the I/O equipment request table 203 through the I/O equipment sharing controller 202. At the time, the same I/O equipment information whose amount is equal to the designated number of degree of redundancy is written in the I/O equipment request table 203.

Although the operation for setting the I/O equipment which the user requires and the degree of redundancy on the upstream bridge 104-1 using the input device 109-1 is explained here, an operation for setting the I/O equipment which other user requthisires and a degree of redundancy on the upstream bridge 104-2 using an input device 109-2 is carried out likewise.

<Setting of VLAN ID>

Since a VLAN ID is set to each requested I/O equipment in the second exemplary embodiment, a VLAN ID setting operation is repeated until the VLAN ID is allocated to all the I/O equipment registered to the I/O equipment request table 203.

Figure 14:
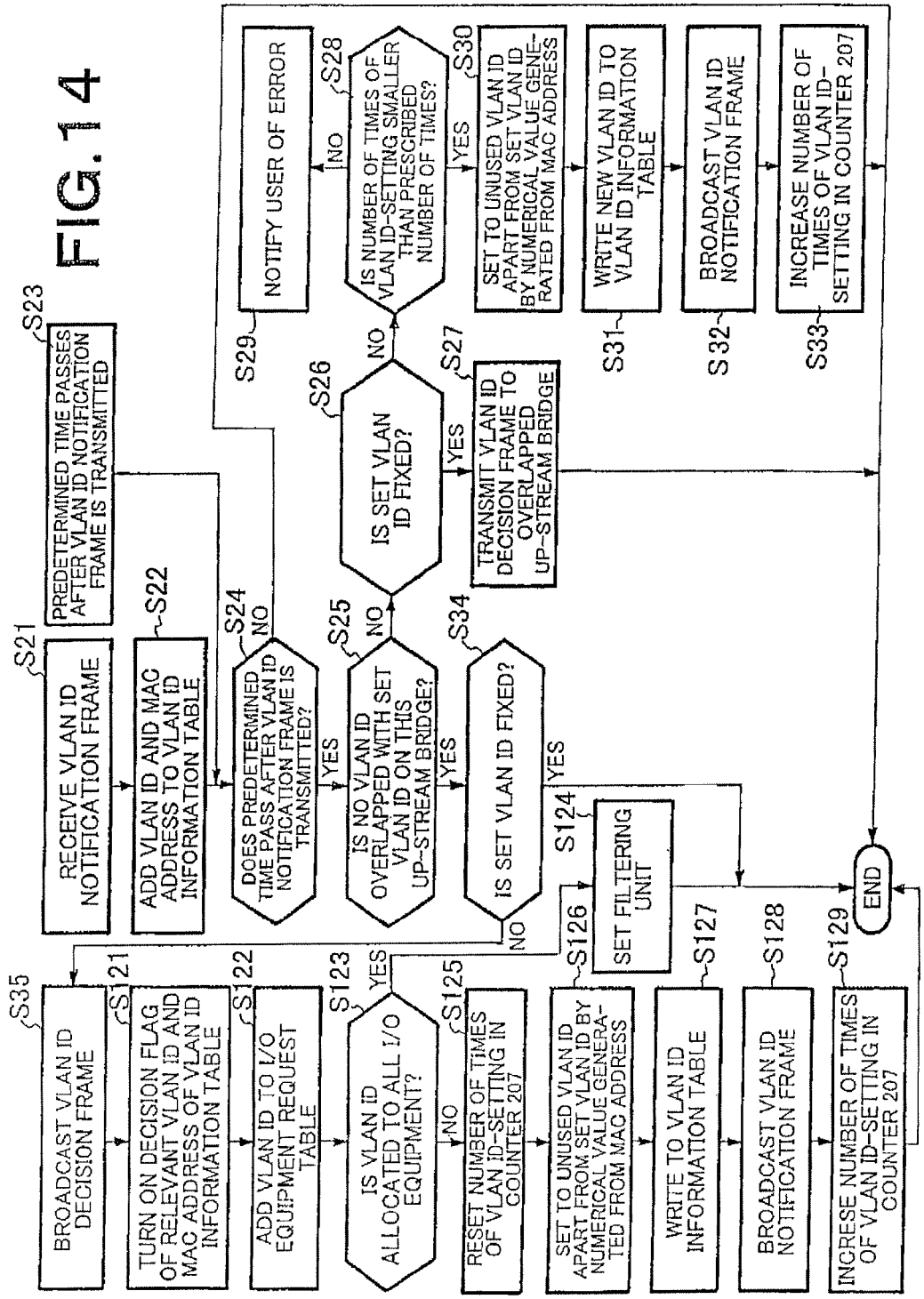
FIG. 14 is a flowchart of an operation when a VLAN ID notification frame is received and when a predetermined time passes after a VLAN ID notification frame is transmitted.

An operation for setting the VLAN ID between the upstream bridges 104-1, 104-2 which belong to CPUs 101-1, 101-2 will be explained. FIGS. 7, 14, and 9 show flowcharts. A VLAN ID initially setting sequence of FIG. 7 and the operation carried out when the upstream bridge 104-1 of FIG. 9 receives a VLAN ID decision frame are the same as those of the first exemplary embodiment.

The operation when the upstream bridge 104-2 receives a VLAN ID notification frame or the operation when a predetermined time passes after the upstream bridge 104-1 transmits the VLAN ID notification frame includes an operation different from that of the first exemplary embodiment. FIG. 14 shows a flowchart of the operation of the second exemplary embodiment when the upstream bridge 104-2 receives the VLAN ID notification frame or a flowchart of the operation when the predetermined time has passed after the upstream bridge 104-1 transmits the VLAN ID notification frame. The operation of the second exemplary embodiment after the VLAN ID decision frame is broadcasted is different from that of the first exemplary embodiment operation. That is, the operation from step 21 to step S35 is the same as that of FIG. 8, and the operation from step S121 to step S129 after step S35 is different from that of the first exemplary embodiment. The operation will be explained below.

After the VLAN ID decision frame is broadcasted (after step S35), the VLAN ID decision flag, which is set by a VLAN ID information table 206 this time, is set (step S121). Then, the VLAN ID is recorded to the column of the affiliated VLAN ID, to which the VLAN ID is not allocated, of the I/O equipment request table 203 shown in the part (a) of FIG. 18 (step S122). When the same I/O equipment exists at the time the VLAN ID is recorded, the VLAN ID is also recorded to the column of the affiliation (affiliated) VLAN ID of the I/O equipment. Further, it is confirmed whether or not the VLAN ID is allocated to all the I/O equipment referring to the I/O equipment request table 203 (step S123). When the VLAN ID is allocated to all the I/O equipment, the filtering unit 208 is set to a VLAN 0 so that the VLAN IDs fixed up to that time can be received (step S124), thereby the procedure is finished. When the VLAN ID is not allocated to all the I/O equipment, first, the number of times of VLAN ID-setting in the counter 207 is reset (step S125). Then, an unused VLAN ID, which is apart by a numerical value created from a MAC address is selected by referring to the VLAN ID information table (step S126). The VLAN ID and the MAC address are added to the VLAN ID information table 206 (step S127), the VLAN ID notification frame is broadcasted (step S127), and the number of times of VLAN ID-setting in the counter 207 is incremented (step S129), thereby the procedure is finished. That is, the VLAN IDs, which are equal to the number of different I/O equipment, are secured, and the same VLAN ID is set to the same I/O equipment.

<Setting for Sharing I/O Equipment>

In the first exemplary embodiment of the setting for sharing I/O equipment, the same VLAN ID is set to all the I/O equipment secured by the upstream bridge. In the second exemplary embodiment, however, a different VLAN ID is set to different I/O equipment, and the same VLAN ID is set to the same I/O equipment.

Figure 15:
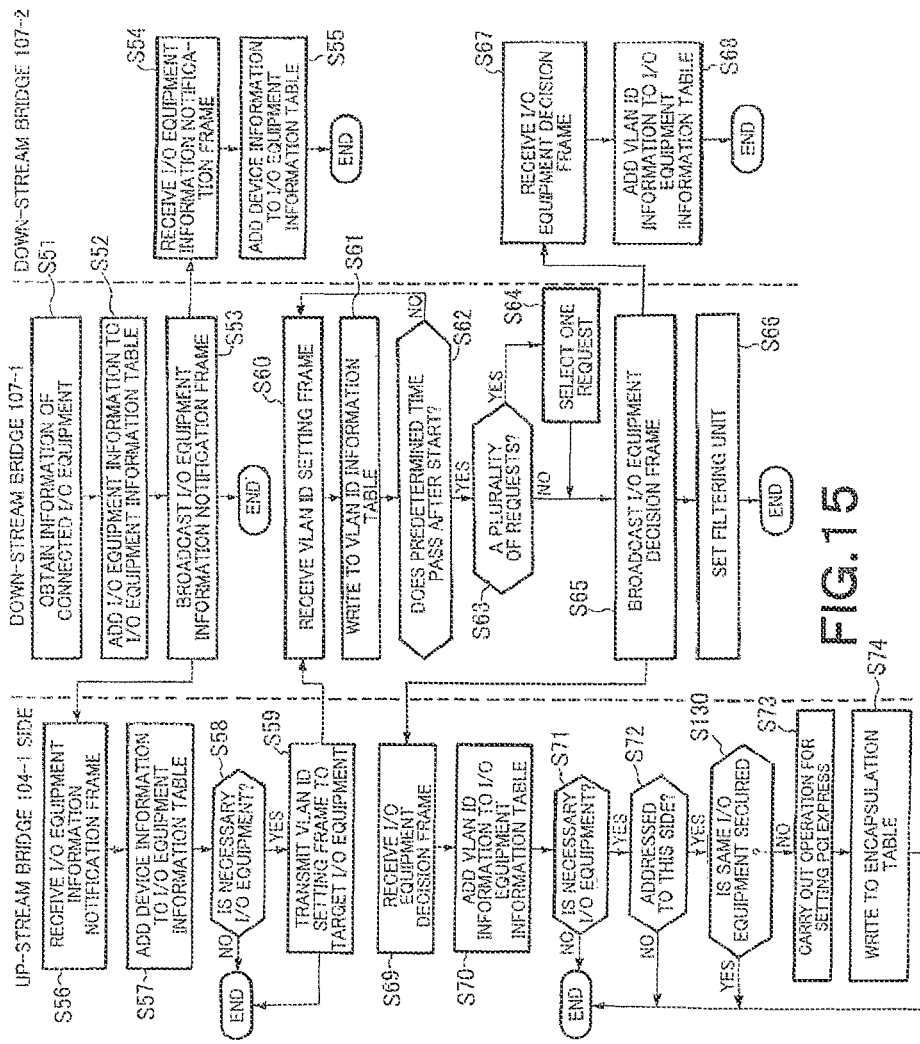
FIG. 15 is a flowchart of an I/O-equipment-sharing setting operation of the second exemplary embodiment.

The sharing-of-I/O-equipment setting sequence of the second exemplary embodiment is as shown in FIG. 15. The portion, which operates when the upstream bridge 104-1 receives the I/O equipment decision frame, of the sharing-of-I/O-equipment setting sequence of the second exemplary embodiment is different from that of the first exemplary embodiment (Note that although the operation of the upstream bridge 104-1 is explained likewise the explanation of FIG. 10, this operation is also applied to the upstream bridge 104-2 likewise). That is, the operation from step S51 to step S74 excluding step 130 is the same as that of FIG. 10. The upstream bridge 104-1, which received the I/O equipment decision frame (step S69), is selected by a control frame selection unit 210, and a control frame processing unit 211 reads the I/O equipment information of a transmission source and the VLAN ID information of a set destination from the I/O equipment decision frame and writes them to the I/O equipment information table 204 (step S70). Further, the I/O equipment sharing controller 202 determines whether or not the I/O equipment of the transmission destination is the I/O equipment necessary to the I/O equipment sharing controller 202 (step S71). When the I/O equipment is not necessary to it, the I/O equipment decision frame reception sequence is finished. When the I/O equipment is necessary to it, the VLAN ID thereof is compared with the VLAN ID of the set destination of the I/O equipment decision frame to determine whether or not the I/O equipment is directed thereto (step S72). When the I/O equipment is not directed thereto, the I/O equipment decision frame reception sequence is finished. When the I/O equipment is directed thereto, it is confirmed whether or not the same I/O equipment is already secured (step S130), and when it is already secured, the I/O equipment decision frame reception sequence is finished. When the I/O equipment is not yet secured, a PCI Express setting operation is carried out so that the CPU 101-1 thereof can use I/O equipment (step S73), and thereafter the MAC address and the VLAN ID of the I/O equipment and the bus number, the device number, the I/O address, and memory address of the PCI Express, which are set to the encapsulation table 214, are recorded (step S74). When a plurality of the same the I/O equipment are set redundantly, the I/O equipment selection unit 1001 selects one of the plurality of the I/O equipment which are set redundantly and sets the flag in use of relevant I/O equipment of the I/O equipment information table 204 as shown in a part (b) of FIG. 18 so that one of the plurality of I/O equipment is made active and the other of them are placed in a stand-by state. Further, the filtering unit 208 is set such that the set VLAN ID and VLAN ID 0 and further the frame other than the MAC address and the broadcast address of the active I/O equipment are abandoned.

2) When Ordinary Operation is Carried Out
(Communication Between CPU-I/O Equipment, without Setting of N-Fold Redundancy)

Next, how communication is carried out between a route complex and I/O equipment in an ordinary operation after the completion of the setting for sharing the I/O equipment will be explained.

In the second exemplary embodiment, since the VLAN ID is set to each different I/O equipment, and the same VLAN ID is set to the same I/O equipment. When communication is carried out, although a frame directed to the downstream bridge of target I/O equipment is unicasted by the set VLAN ID in the first exemplary embodiment, it is broadcasted in the set VLAN ID in the second exemplary embodiment and transmitted to all the same affiliated I/O equipment. Transmitted encapsulated frames are received by the respective downstream bridges in the VLAN and operated respectively. Since the encapsulated frames from the respective downstream bridges in the VLAN are set such that they abandon the MAC addresses other than that of the downstream bridge of the I/O equipment selected by the filtering unit, the encapsulated frame from the selected I/O equipment is decapsulated and processed as a TLP.

3) When Ordinary Operation is Carried Out
(Communication Between CPU-I/O Equipment, with Setting of N-Fold Redundancy)

Next, an ordinary operation, when N-fold redundancy is set, will be explained. When the N-fold redundancy is set in the ordinary operation in the above operation 2), it is required to make uniformly the status between the same I/O equipment same as that of the I/O equipment set to active. First, when a frame is encapsulated from the upstream bridge and transmitted, a copy of the frame is placed in the correction buffer 1004 sectioned to each VLAN ID. Thereafter, when a response frame is received from respective I/O equipment, the redundant I/O equipment response confirmation unit 1002 compares the responses from the respective I/O equipment, and when the I/O equipment are not synchronized, a result of the comparison is sent to the redundant I/O equipment synchronization correction unit 1003, and the MAC address of the copy of the frame of the correction buffer is changed from a broadcast address to the MAC address of the I/O equipment which is not synchronized and, the MAC address is sent to the I/O equipment which is not synchronized (the I/O equipment from which NACK is transmitted). When the I/O equipment are synchronized, the frame is sent to the filtering unit 208. Subsequent processing is the same as that explained in 2).

4) When CPU is Newly Added

In the operation of the first exemplary embodiment for newly adding a CPU, the points of change, which are carried out in the second exemplary embodiment to the construction of a system, the setting of VLAN ID, and the setting for sharing I/O equipment of the first exemplary embodiment, are reflected as they are.

5) When I/O Equipment is Newly Added

In the operation of the first exemplary embodiment for newly adding a CPU, the points of change, which are carried out in the second exemplary embodiment to the construction of a system, the setting of VLAN ID, and the setting for sharing I/O equipment of the first exemplary embodiment, are reflected as they are.

6) When CPU is Removed from System

In the operation of the first exemplary embodiment for newly adding a CPU, the points of change, which are carried out in the second exemplary embodiment to the construction of a system, the setting of VLAN ID, and the setting for sharing I/O equipment of the first exemplary embodiment, are reflected as they are.

7) When I/O Equipment is Removed from System

In the operation of the first exemplary embodiment for newly adding a CPU, the points of change, which are carried out in the second exemplary embodiment to the construction of a system, the setting of VLAN ID, and the setting for sharing I/O equipment of the first exemplary embodiment, are reflected as they are.

8) When Sharing of I/O Equipment is Cancelled

In the operation of the first exemplary embodiment for newly adding a CPU, In the operation of the first exemplary embodiment for newly adding a CPU, the points of change, which are carried out in the second exemplary embodiment to the construction of a system, the setting of VLAN ID, and the setting for sharing I/O equipment of the first exemplary embodiment, are reflected as they are.

9) When Power Supply to CPU is Shut Off

In the operation of the first exemplary embodiment when power supply to a CPU is shut off, the points of change, which are carried out in the second exemplary embodiment to the construction of a system, the setting of VLAN ID, and the setting for sharing I/O equipment of the first exemplary embodiment, are reflected as they are.

2-3) Advantages of Second Exemplary Embodiment

The redundancy configuration of the I/O equipment can be easily set using the second exemplary embodiment.

(3) Third Exemplary Embodiment

Figure 19:
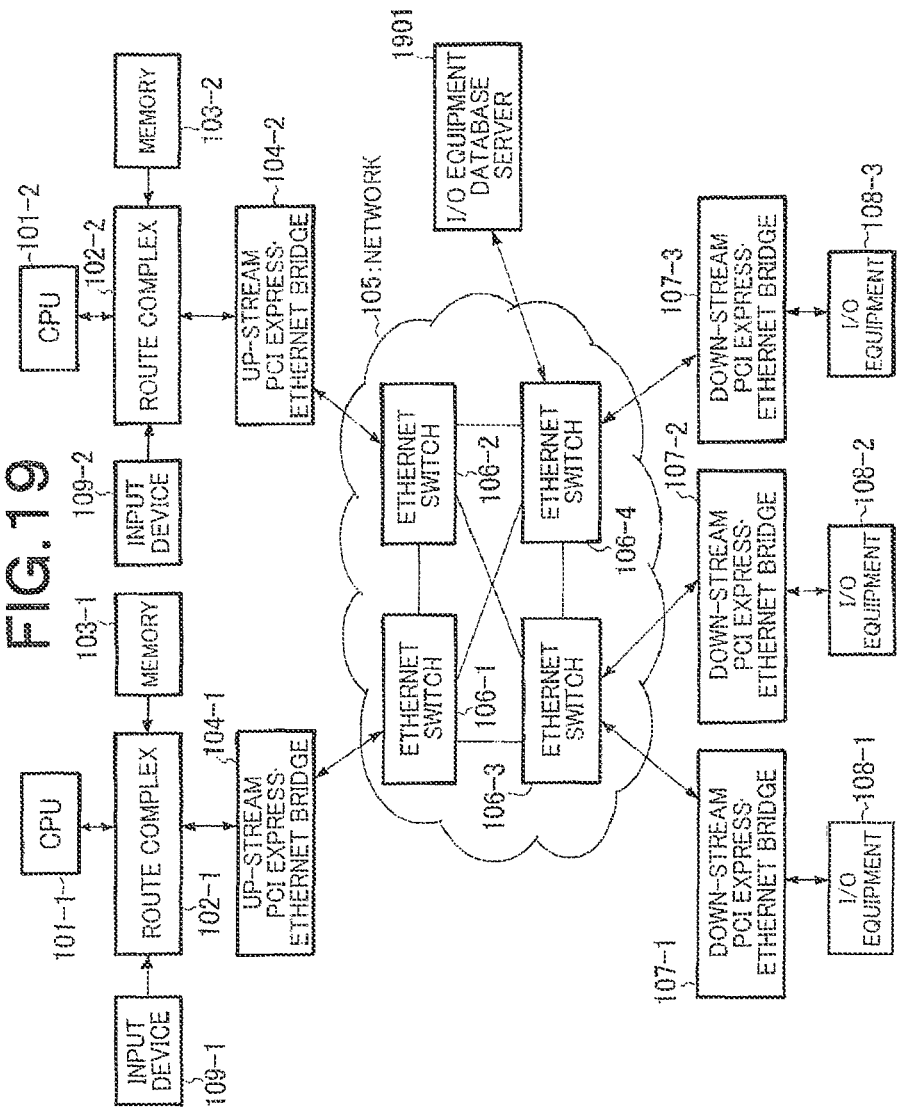
FIG. 19 is a block diagram showing an overall configuration of an I/O equipment sharing system of a third exemplary embodiment.
Figure 20:
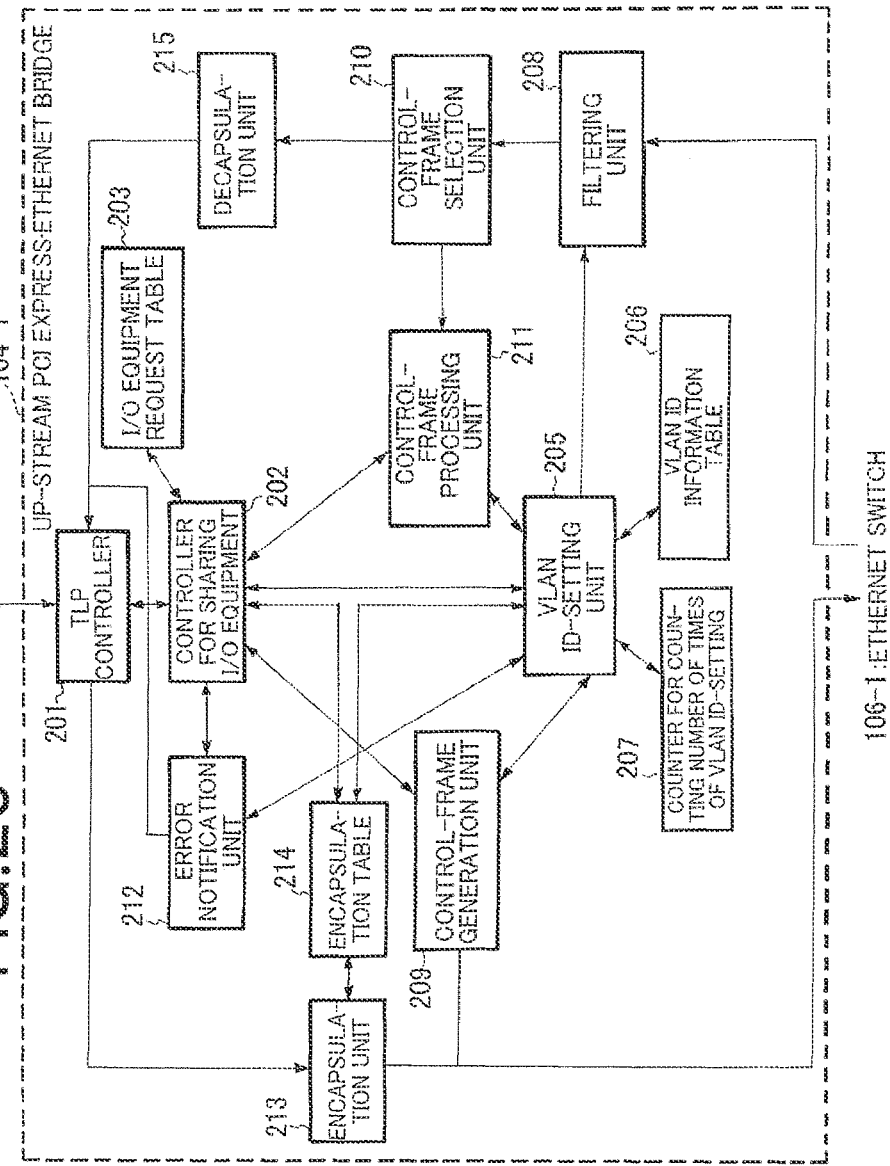
FIG. 20 is a block diagram showing a configuration of an upstream PCI Express-Ethernet bridge in the I/O equipment sharing system of the third exemplary embodiment.
Figure 21:
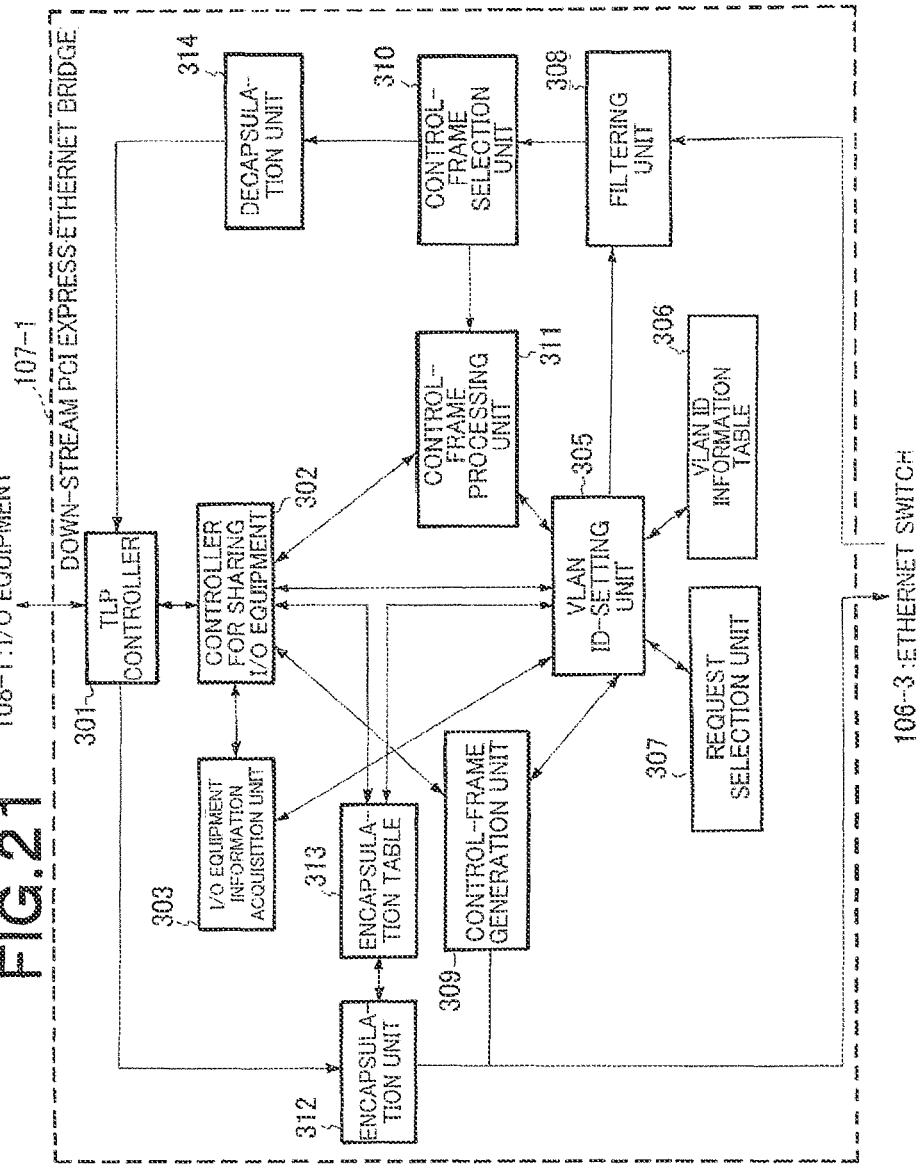
FIG. 21 is a block diagram showing a configuration of a downstream PCI Express-Ethernet bridge in the I/O equipment sharing system of the third exemplary embodiment.
Figure 22:
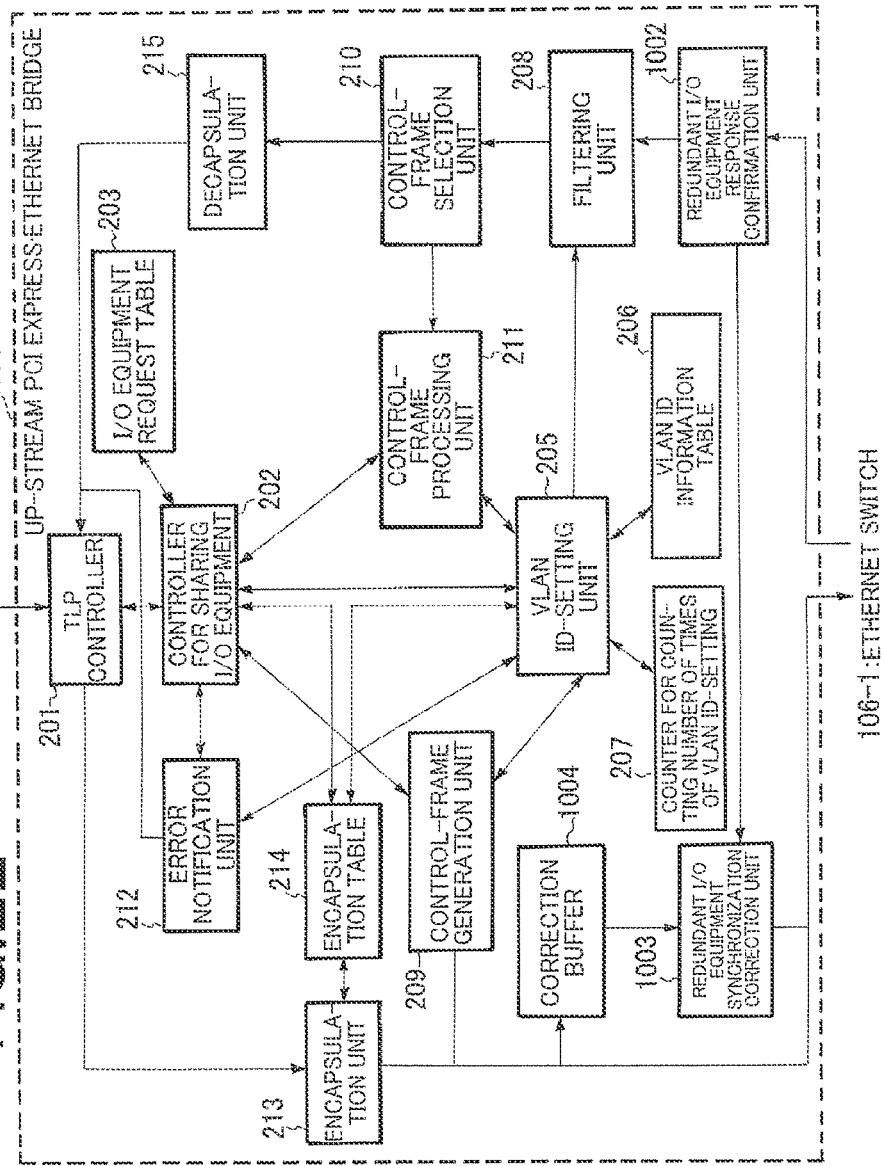
FIG. 22 is a block diagram showing a configuration of the upstream PCI Express-Ethernet bridge in the I/O equipment sharing system of the third exemplary embodiment.

A third exemplary embodiment will be explained. FIG. 19 shows an overall block diagram of the third exemplary embodiment. In the third exemplary embodiment, an I/O equipment database server 1901 is newly added in the first and second exemplary embodiments. The I/O equipment database server 1901 receives the I/O equipment information notification frames transmitted from I/O equipment 108-1 to 108-3, respectively and creates the database of the I/O equipment. Although an upstream bridge and a downstream bridge may be arranged similarly to those shown in the block diagrams of the first and second exemplary embodiments, they are preferably arranged as shown in the block diagrams shown below. FIGS. 20 and 21 are block diagrams showing the upstream bridge and the downstream bridge modified from those of the first exemplary embodiment, and FIG. 22 shows the upstream bridge modified from that of the second exemplary embodiment. Although FIGS. 20 and 21 shows the configurations of an upstream bridge 104-1 and a downstream bridge 107-1, and FIG. 22 shows the configuration of the upstream bridge 104-1, an upstream bridge 104-2 and downstream bridges 107-2, 107-3 also have the same configurations.

The configurations shown in FIGS. 20 to 22 are obtained by removing the I/O equipment information tables 204, 304 from the configurations of the upstream bridge 104-1 and downstream bridge 107-1 in the configuration of the first and second exemplary embodiments. The database held by the I/O equipment database server 1901 is the same as that in the part (b) of FIG. 16 when it is changed from the first exemplary embodiment and is the same as the table shown in the part (b) of FIG. 18 when it is changed from the second exemplary embodiment.

Next, the operation of the third exemplary embodiment will be explained. The operation of the third exemplary embodiment is different from that of the first and second exemplary embodiments in the operation for sharing a plurality of I/O equipment.

Figure 23:
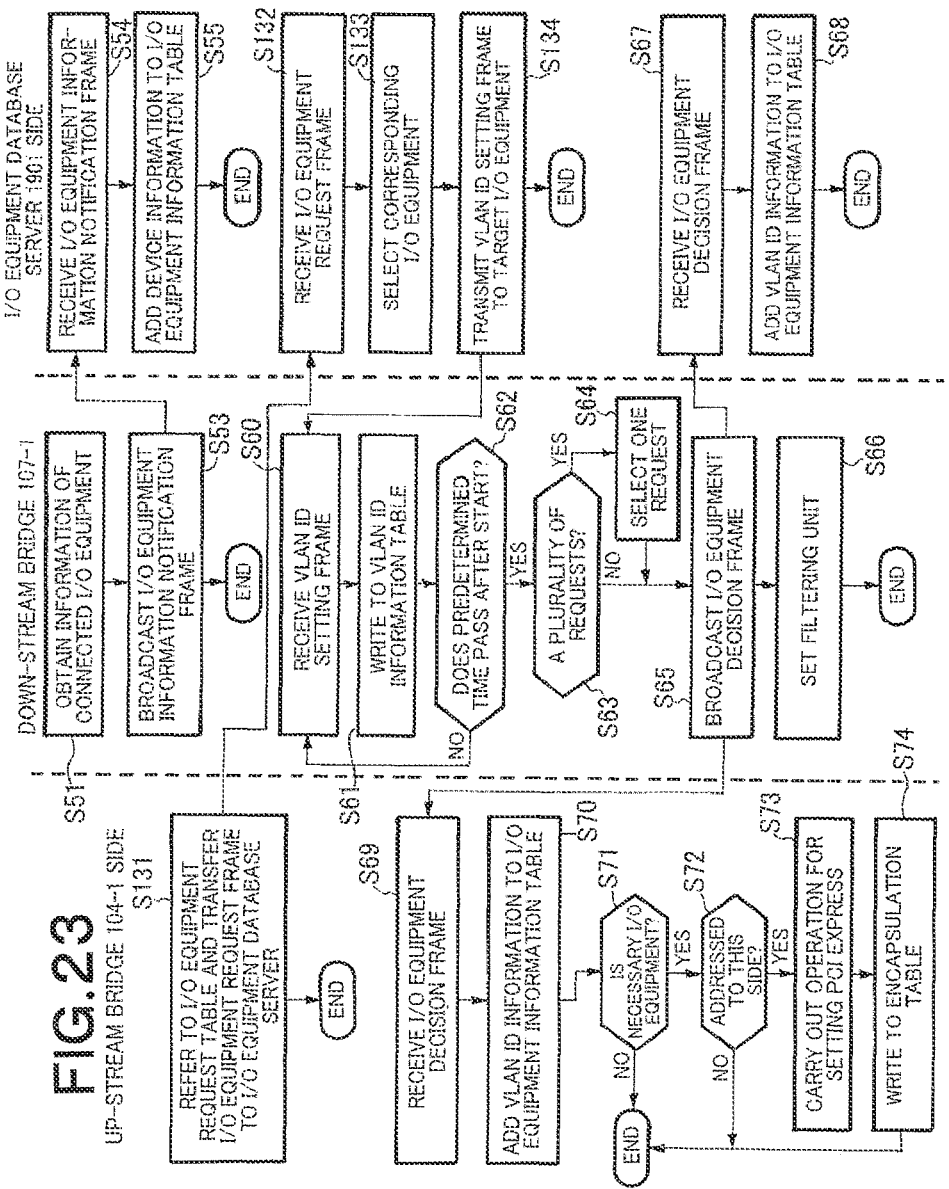
FIG. 23 is a flowchart of an I/O-equipment-sharing setting operation of the third exemplary embodiment.

FIG. 23 shows a sharing setting sequence. The operations from step S51 to step S55 and from step S60 to step S74 are the same as those in FIG. 10, and the operation from steps S131 to S134 is different from that of the first exemplary embodiment. Further, the operation from step S131 to step S134 is different from the first exemplary embodiment. Further, the operations at steps S54, S55, step S67, and S68 are carried out by the I/O equipment database server 1901.

Each of the downstream bridges 107-1 to 107-3 broadcasts the I/O equipment information notification frame (step S53). The I/O equipment database server 1901 receives the I/O equipment information notification frames (step S54) and additionally records I/O equipment information to an I/O equipment information table (step S55). Further, each of the upstream bridges 104-1, 104-2 sends an I/O equipment request frame to the I/O equipment database server 1901 based on necessary I/O equipment information set to it (step S131). The I/O equipment database server 1901 receives the I/O equipment request frame (step S132) and selects corresponding I/O equipment referring to the I/O equipment information table (step S133). In following explanation, it is assumed that the I/O equipment information necessary to the I/O equipment 108-1 is sent from the upstream bridge 104-1 to the I/O equipment database server 1901 and the I/O equipment database server 1901 selects the I/O equipment 108-1.

A VLAN ID setting frame is sent to the downstream bridge 107-1 to which the I/O equipment 108-1 is connected so that the VLAN ID setting frame is set to the VLAN ID to which the upstream bridge 104-1, which requested the selected I/O equipment 108-1, is set (step S134). After the downstream bridge 107-1 receives the VLAN ID setting frame, a similar operation is carried out except that when the I/O equipment database server 1901 receives an I/O equipment decision frame (step S67), it adds VLAN ID information to the I/O equipment information table (step S68).

Figure 24:
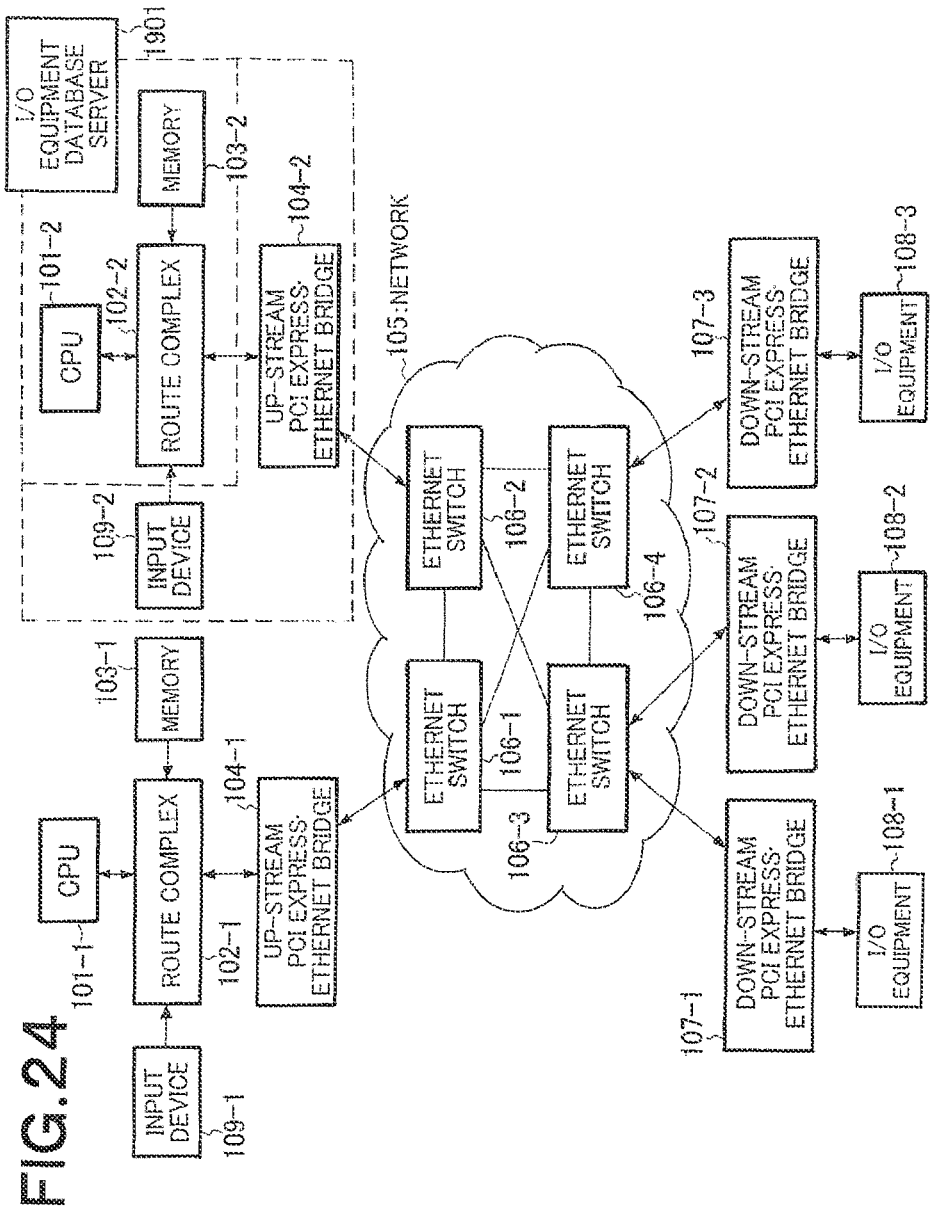
FIG. 24 is a block diagram showing an overall configuration of an I/O equipment sharing system of the third exemplary embodiment.

Further, as shown in FIG. 24, the I/O equipment database server 1901 may be mounted on an apparatus composed of the CPU, the route complex, the memory (an upstream bridge and an input device may be included). FIG. 24 shows an configuration in which the I/O equipment database server 1901 is mounted on an apparatus composed of a CPU 101-2, a route complex 102-2, and a memory 103-2 (the upstream bridge 104-2 and the input device 109-2 may be included)

When the third exemplary embodiment is used, since the upstream bridges and downstream bridges do not include the I/O equipment information table, the upstream bridges and the downstream bridges can be easily mounted.

(4) Fourth Exemplary Embodiment

Figure 25:
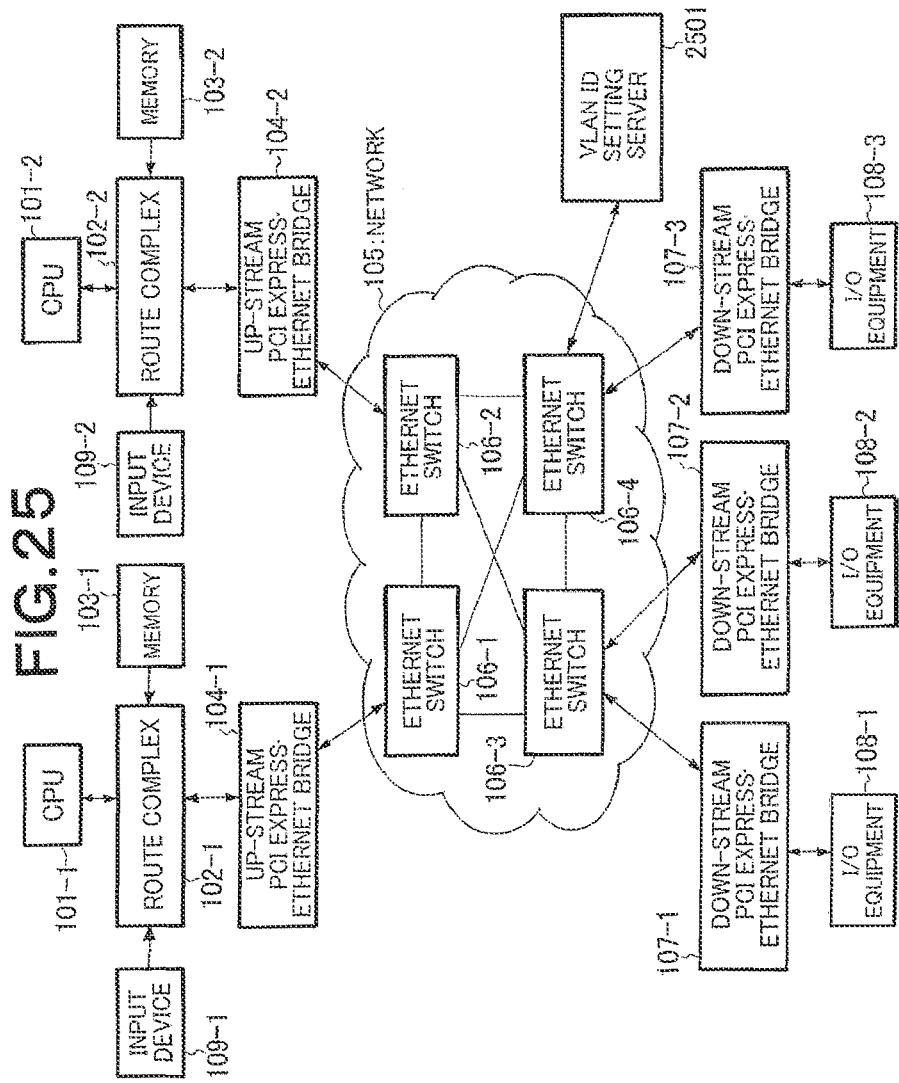
FIG. 25 is a block diagram showing an overall configuration of an I/O equipment sharing system of a fourth exemplary embodiment.
Figure 26:
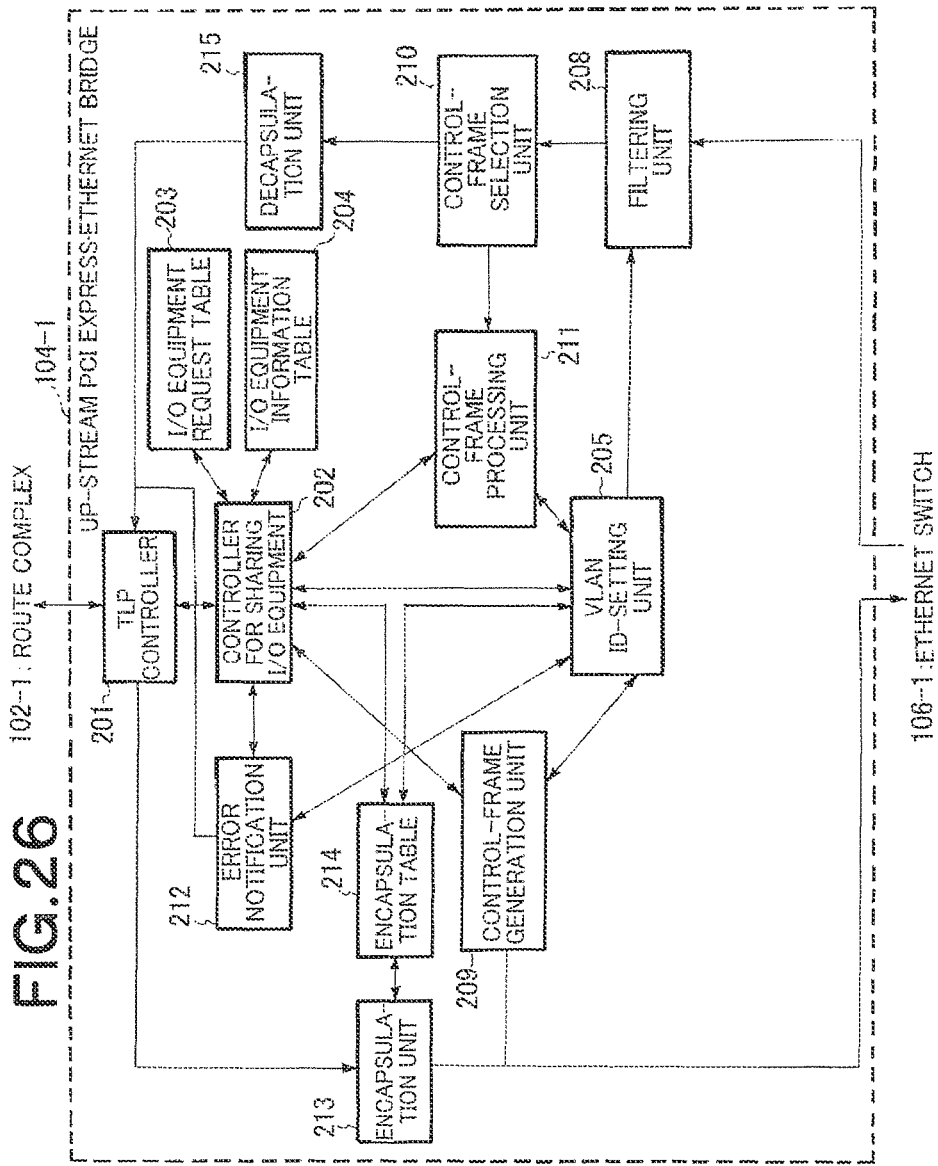
FIG. 26 is a block diagram showing a configuration of an upstream PCI Express-Ethernet bridge in the I/O equipment sharing system of the fourth exemplary embodiment.
Figure 27:
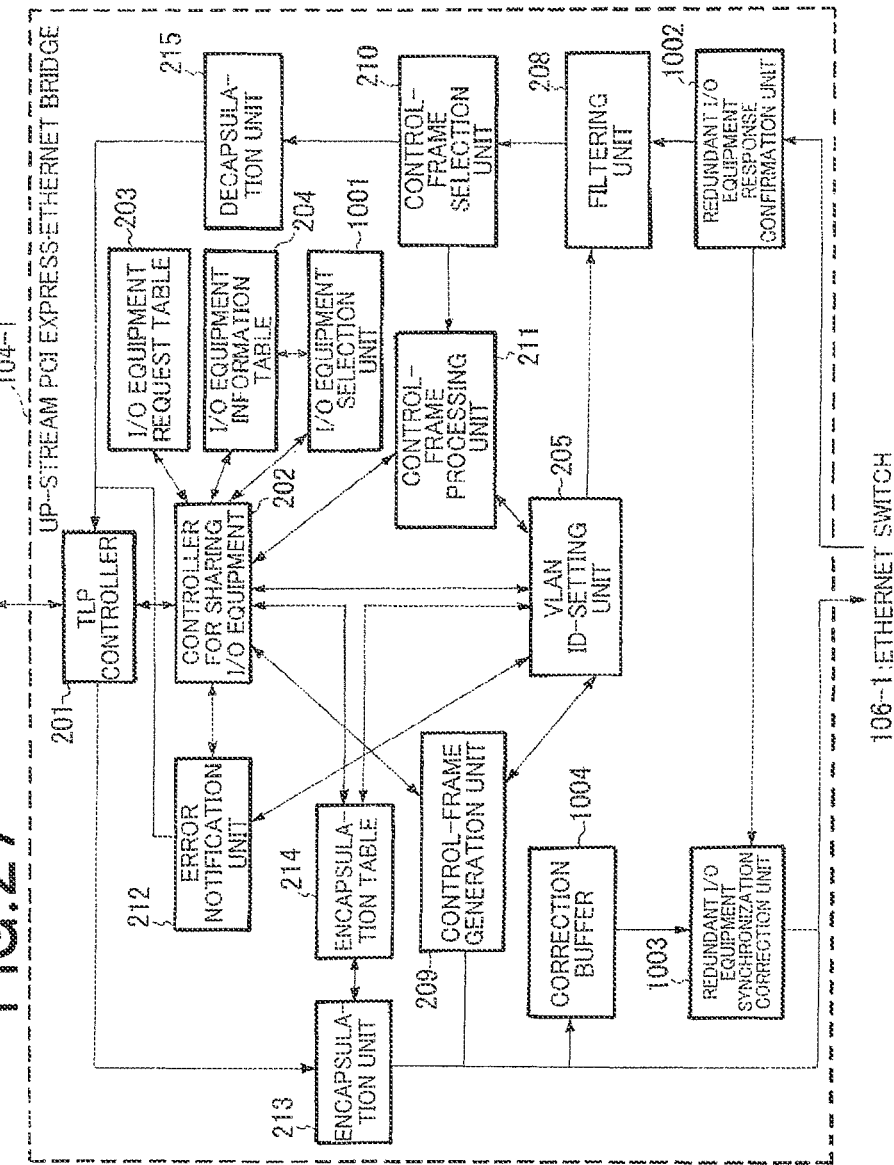
FIG. 27 is a block diagram showing a configuration of the upstream PCI Express-Ethernet bridge in the I/O equipment sharing system of the fourth exemplary embodiment.

A fourth exemplary embodiment will be explained. FIG. 25 shows an overall block diagram of the fourth exemplary embodiment. In the fourth exemplary embodiment, a VLAN ID setting server 2501 is newly added to the first, second, and third exemplary embodiments. The VLAN ID setting server 2501 sets the VLAN IDs of upstream bridges 104-1, 104-2. The VLAN ID setting server 2501 is connected to Ethernet switches 106-1 to 106-4. Although the upstream bridge may be arranged similarly to that shown in the block diagrams of the first and second exemplary embodiments, it is preferable to arrange it as shown in the following block diagram. The block diagram of the upstream bridge modified from that of the first exemplary embodiment is shown in FIG. 26, and the upstream bridge modified from that of the second exemplary embodiment is shown in FIG. 27. The upstream bridge of the fourth exemplary embodiment shown in FIGS. 26 and 27 is arranged by removing the VLAN ID information table 206 and the counter 207 from the first and second exemplary embodiments.

Next, an operation of the fourth exemplary embodiment will be explained. The operation of the fourth exemplary embodiment is the same as that of the first, second, and third exemplary embodiments except the operation for carrying out a VLAN ID setting sequence. The VLAN ID setting sequence of the fourth exemplary embodiment will be explained using FIGS. 37 and 38.

Figure 37:
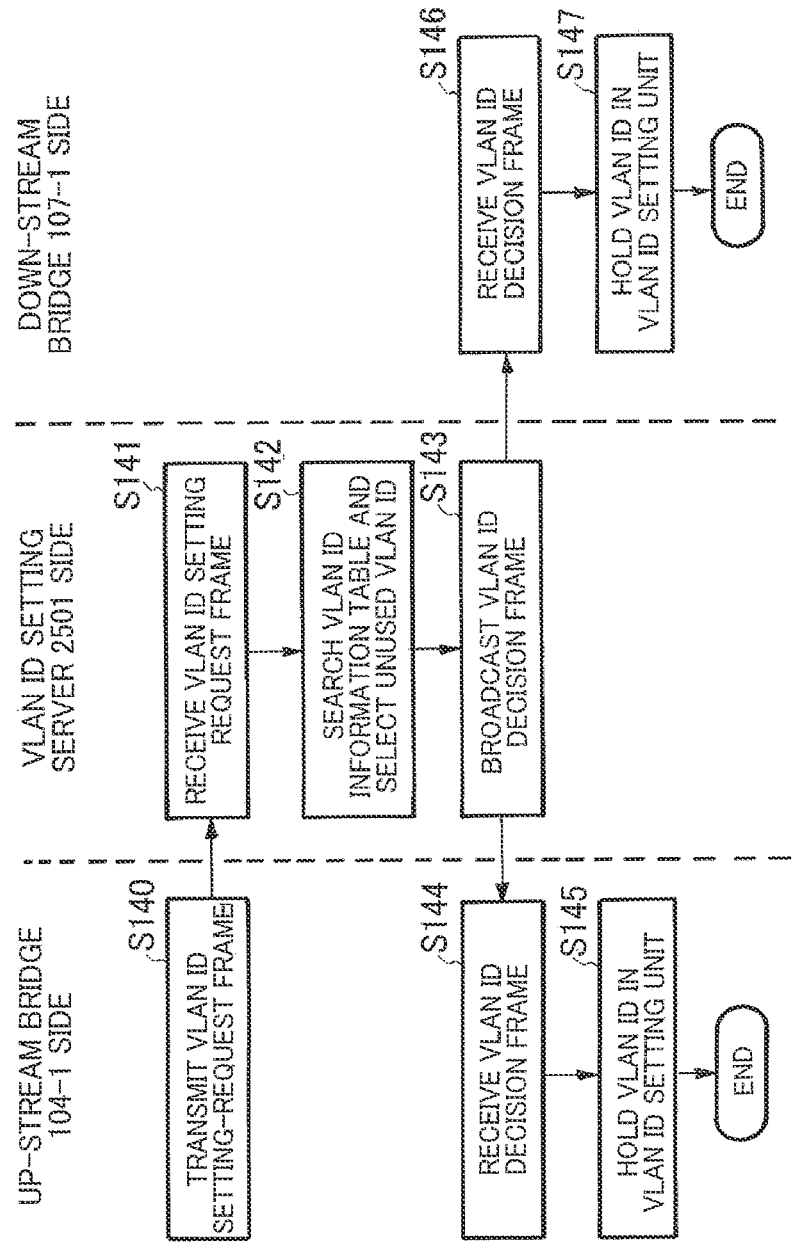
FIG. 37 is a flowchart of a VLAN ID setting sequence in the I/O equipment sharing system of the fourth exemplary embodiment.

As shown in FIG. 37, after the upstream bridge 104-1 starts, it sends a VLAN ID setting request frame to a VLAN ID setting server 2501 (step S140). Note that although a VLAN ID setting request frame is sent also from the upstream bridge 104-2, the operation when the VLAN ID setting request frame is sent from the upstream bridge 104-1 will be explained here.

When the VLAN ID setting server 2501 receives the VLAN ID setting request frame (step S141), it selects a VLAN ID which is not used at the time referring to a VLAN ID information table shown FIG. 38 (step S142). As described above, in the exemplary embodiment, the VLAN ID is set based on the VLAN ID information table of the VLAN ID setting server 2501. Then, the VLAN ID setting server 2501 broadcasts a VLAN ID decision frame (step S143).

When the upstream bridge 104-1, which requested the selected VLAN ID, receives the VLAN ID decision frame (step S144), it hold the VLAN ID thereof in a VLAN ID setting unit. Further, when downstream bridges 107-1 to 107-3 receive the VLAN ID decision frame (step S145), the VLAN ID setting unit holds the VLAN ID thereof. Thereafter, the process goes to a sharing-of-I/O-equipment setting sequence.

Figure 28:
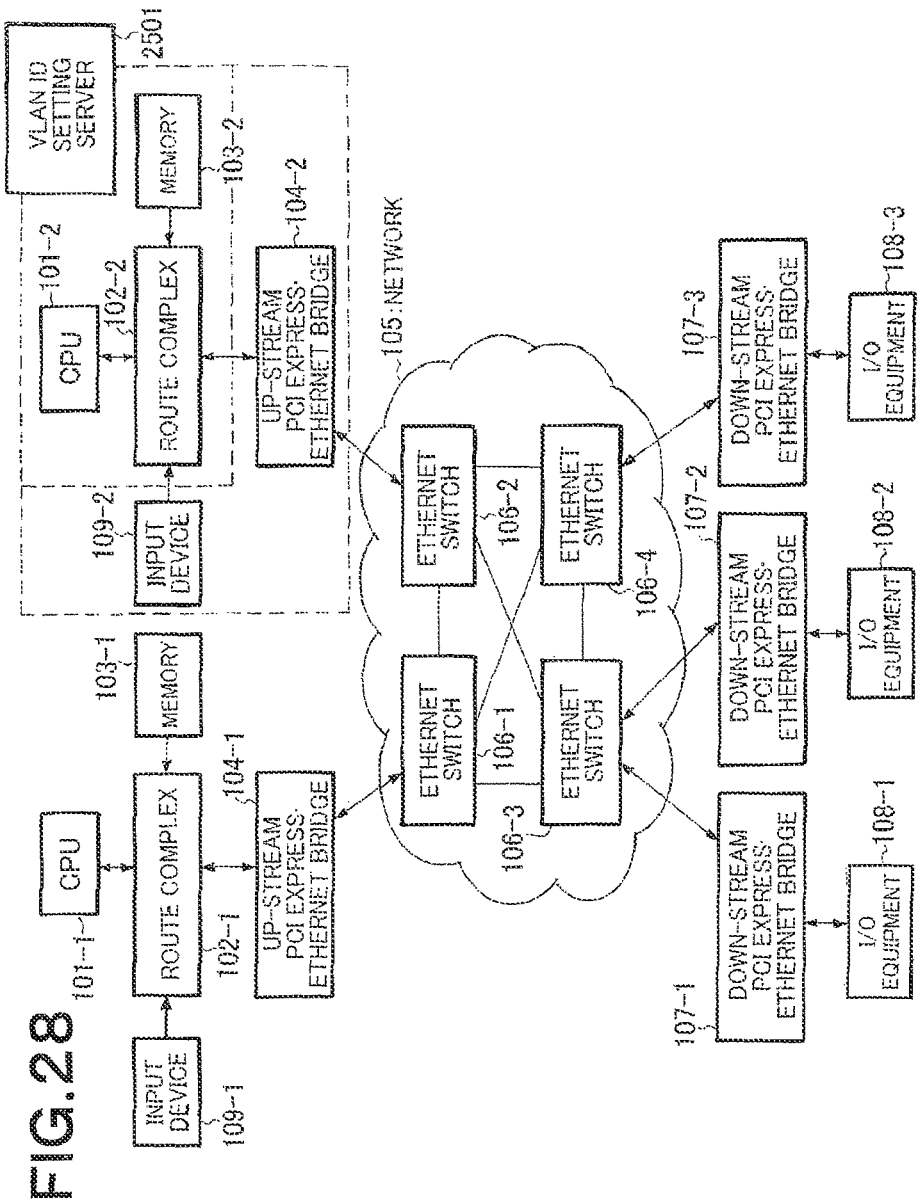
FIG. 28 is a block diagram showing an overall configuration of an I/O equipment sharing system of the fourth exemplary embodiment.

Further, as shown in FIG. 28, the VLAN ID setting server 2501 may be mounted on an apparatus composed of the CPU, the route complex, and the memory (an upstream bridge and an input device may be included). FIG. 28 shows an configuration in which the VLAN ID setting server 2501 is mounted on an apparatus composed of a CPU 101-2, a route complex 102-2, and a memory 103-2 (the upstream bridge 104-2 and an input device 109-2 may be included).

When the fourth exemplary embodiment is used, since the respective upstream bridges do not include the VLAN ID table 206, the upstream bridges can be easily mounted.

(5) Fifth Exemplary Embodiment

Figure 29:
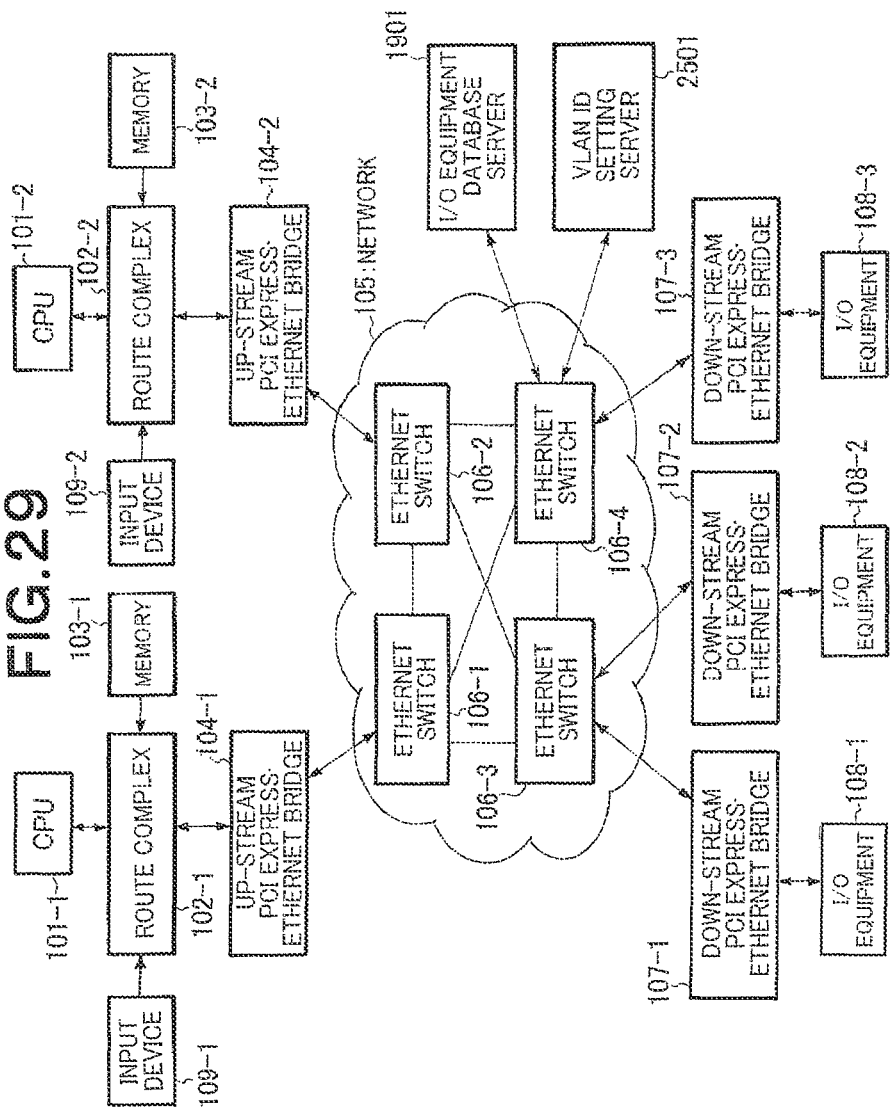
FIG. 29 is a block diagram showing an overall configuration of an I/O equipment sharing system of a fifth exemplary embodiment.
Figure 30:
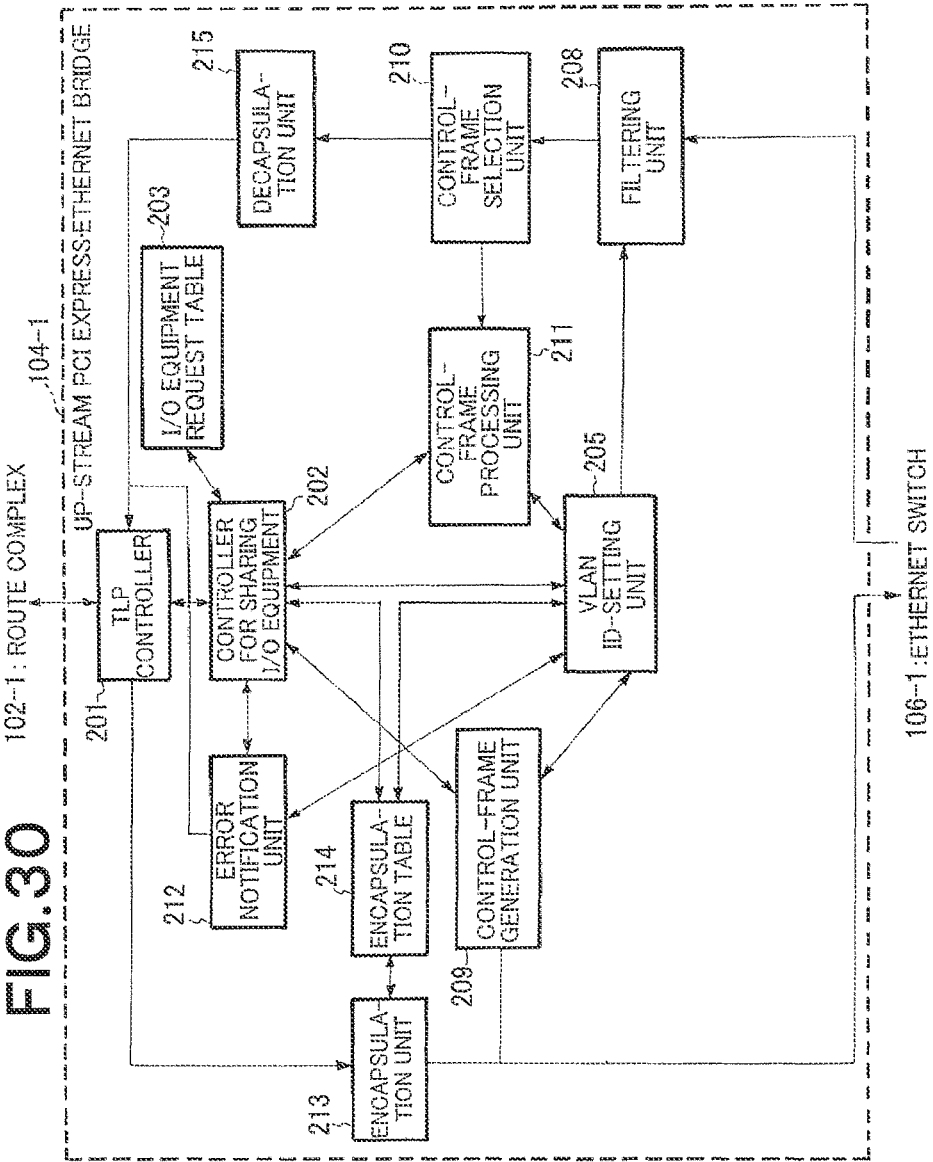
FIG. 30 is a block diagram showing a configuration of an upstream PCI Express-Ethernet bridge in the I/O equipment sharing system of the fifth exemplary embodiment.
Figure 31:
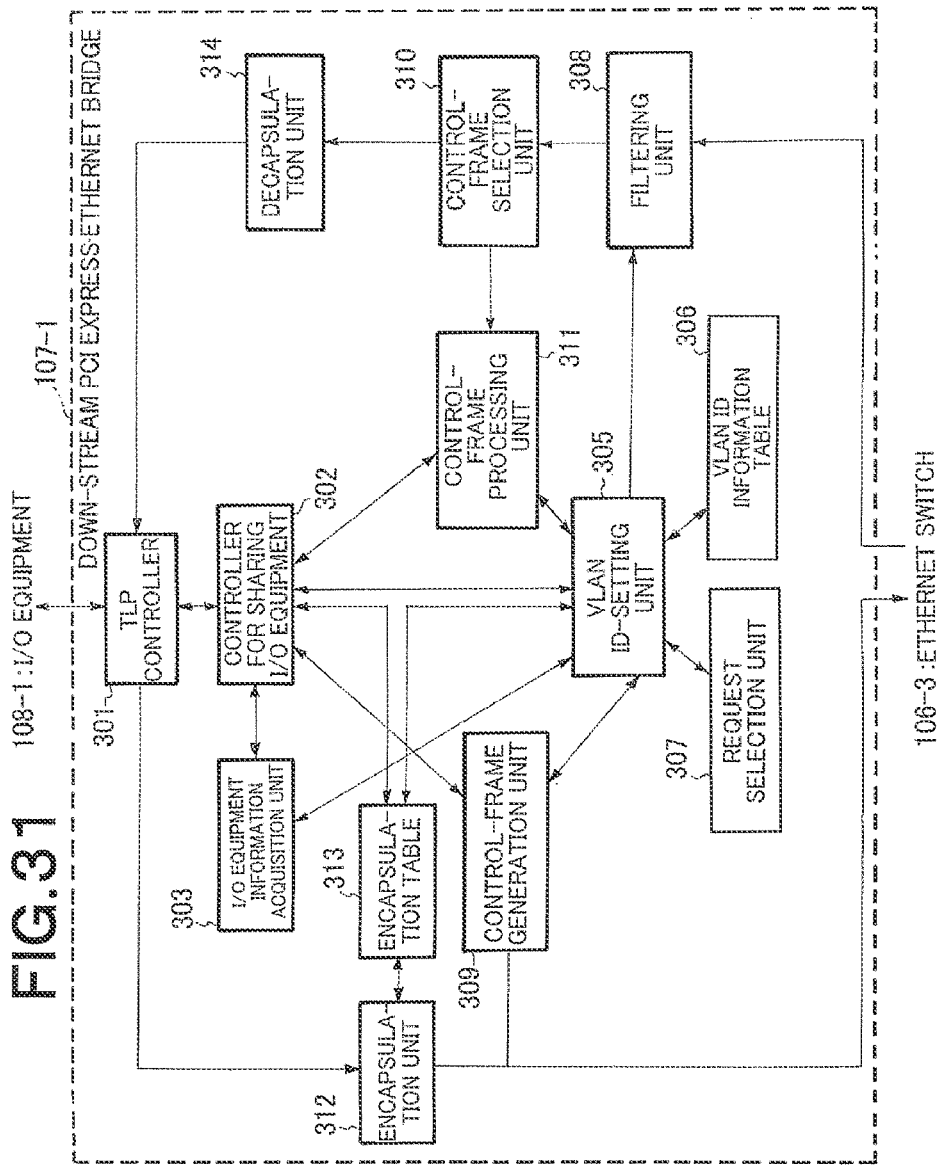
FIG. 31 is a block diagram showing a configuration of a downstream PCI Express-Ethernet bridge in the I/O equipment sharing system of the fifth exemplary embodiment.
Figure 32:
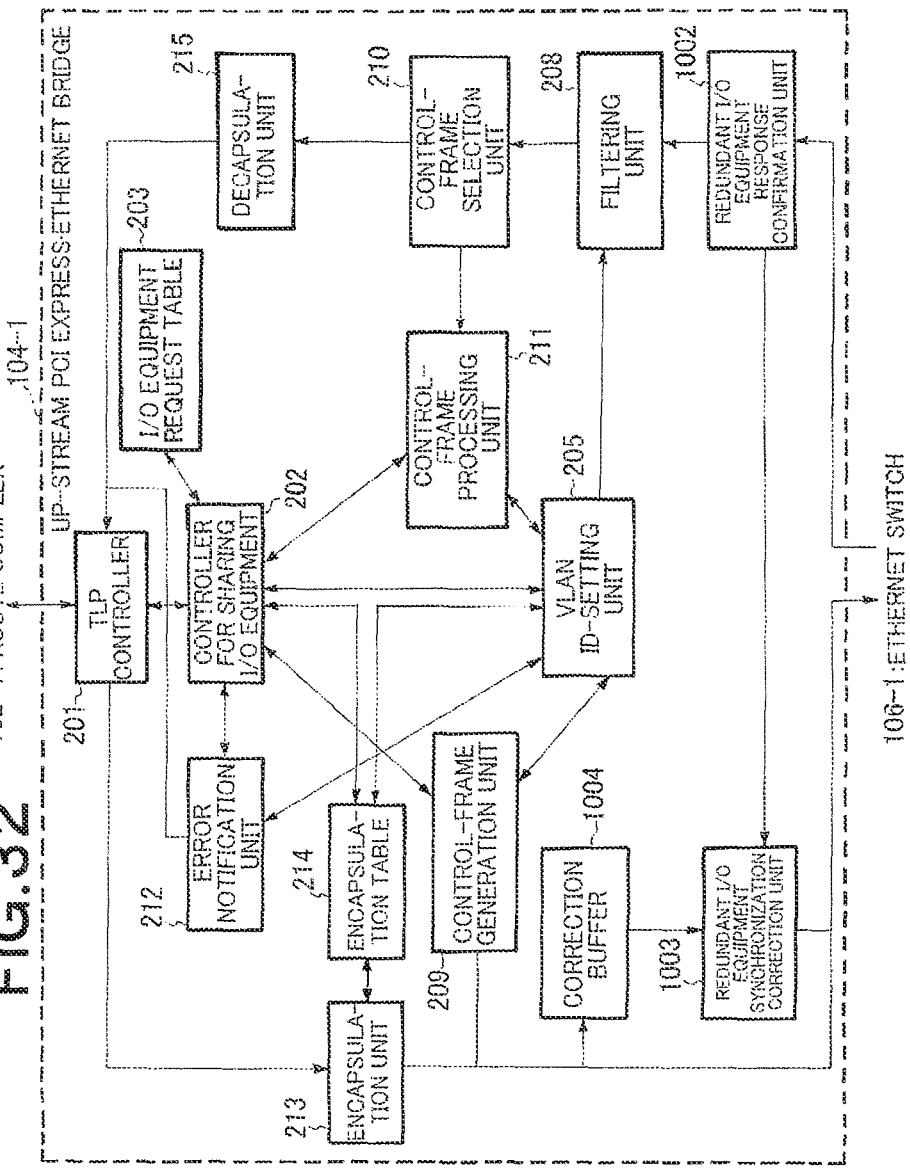
FIG. 32 is a block diagram showing a configuration of the upstream PCI Express-Ethernet bridge in the I/O equipment sharing system of the fifth exemplary embodiment.

A fifth exemplary embodiment will be explained. FIG. 29 shows an overall block diagram of the fifth exemplary embodiment. The fifth exemplary embodiment includes the I/O equipment database server 1901 and the VLAN ID setting server 2501 of the third and fourth exemplary embodiments in the arrangement thereof. Although an upstream bridge and a downstream bridge may be arranged similarly to those shown in the block diagrams of the first, second, third, and fourth exemplary embodiments, it is preferable to arrange them as shown in the following block diagrams. FIGS. 30 and 31 show block diagrams of the upstream bridge and downstream bridge changed from those of the first exemplary embodiment, and FIG. 32 shows the upstream bridge changed from that of the second exemplary embodiment. The change from the first and second exemplary embodiments is carried out by removing the I/O equipment information tables 204 and 304, the VLAN ID information tables 206 and 306, and counter 207 for counting number of times of VLAN ID-setting.

Next, the operation of the fifth exemplary embodiment will be explained. In the fifth exemplary embodiment, the operation of a VLAN ID setting sequence is the same as that of the fourth exemplary embodiment, and the operation of a sharing-of-I/O-equipment setting sequence is the same as that of the third exemplary embodiment.

Figure 33:
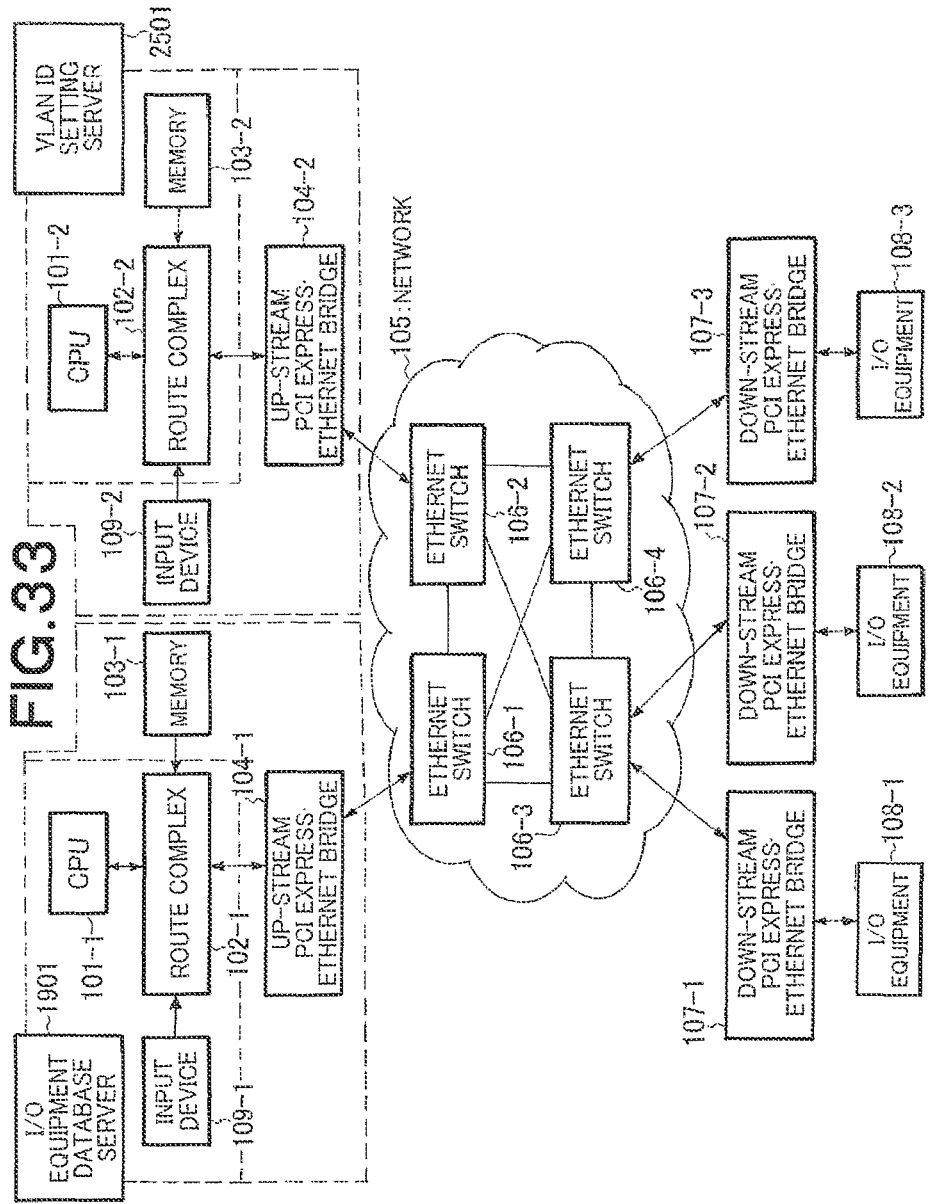
FIG. 33 is a block diagram showing an overall configuration of an I/O equipment sharing system of the fifth exemplary embodiment.
Figure 34:
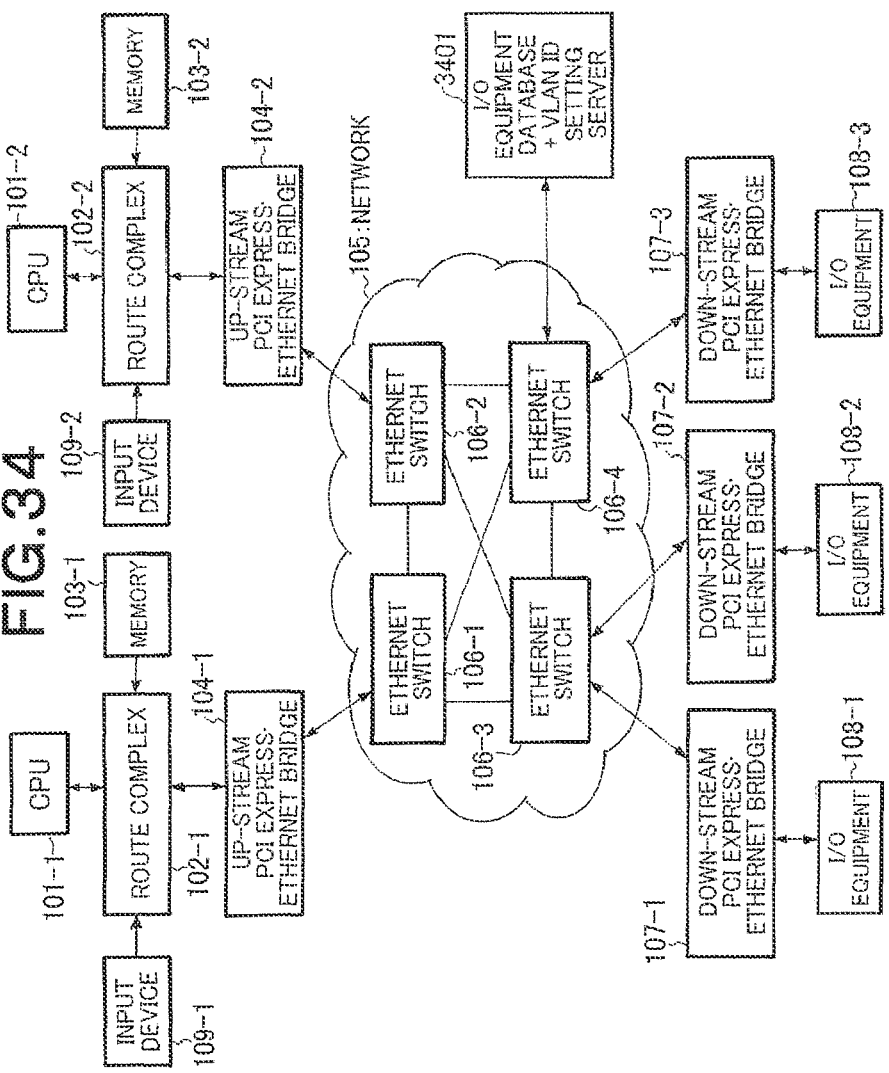
FIG. 34 is a block diagram showing an overall configuration of an I/O equipment sharing system of the fifth exemplary embodiment.

Further, as shown in FIG. 33, the I/O equipment database server 1901 and the VLAN ID setting server 2501 may be mounted on an apparatus composed of the CPU, the route complex, and the memory (an upstream bridge and an input device may be included). FIG. 33 shows a configuration in which the I/O equipment database server 1901 is mounted on an apparatus composed of a CPU 101-1, a route complex 102-1, and a memory 103-1 (an upstream bridge 104-1 and an input device 109-1 may be included), and the VLAN ID setting server 2501 is mounted on an apparatus composed of a CPU 101-2, a route complex 102-2, and a memory 103-2 (an upstream bridge 104-2 and an input device 109-2 may be included). As shown in FIG. 34, the I/O equipment database server 1901 and the VLAN ID setting server 2501 may be mounted on one server 3401.

Figure 35:
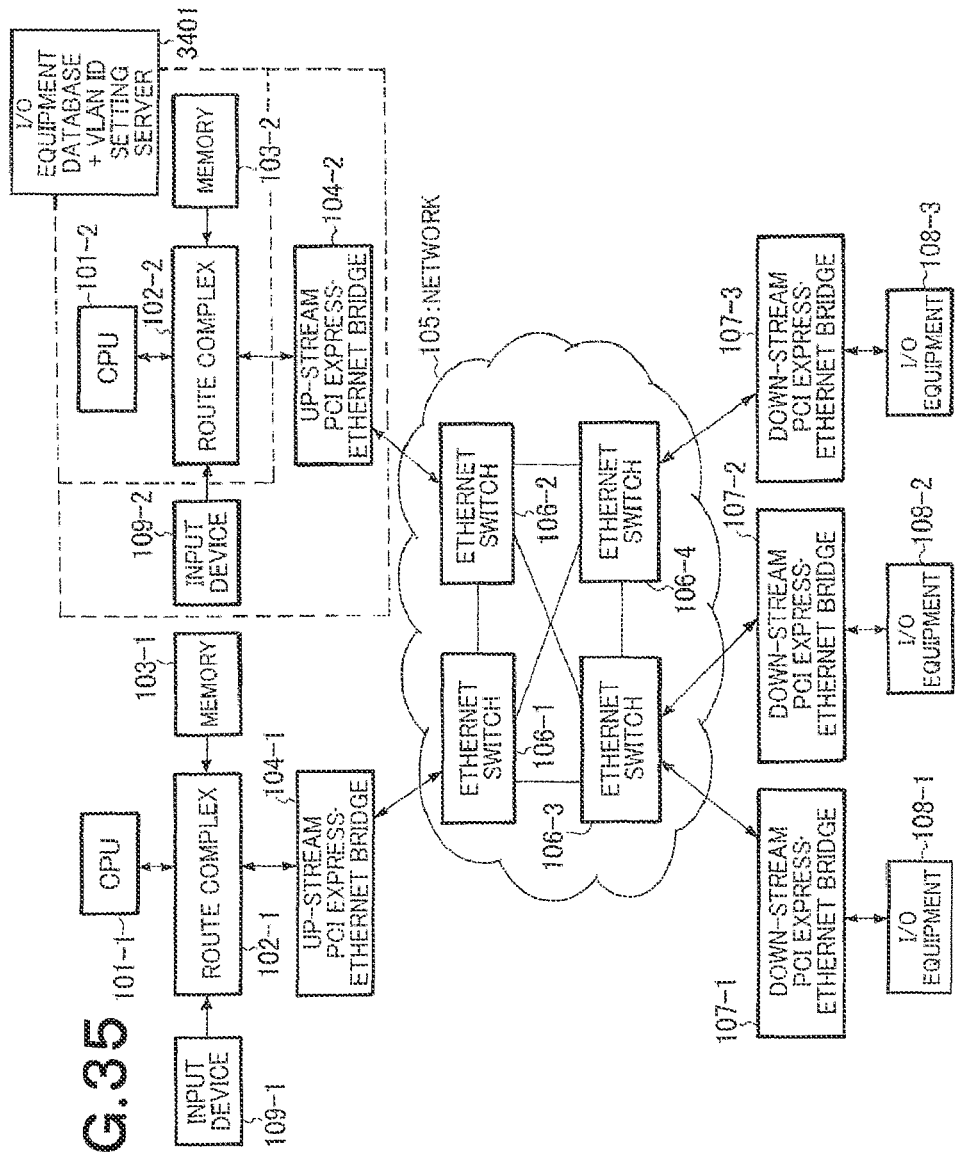
FIG. 35 is a block diagram showing an overall configuration of an I/O equipment sharing system of the fifth exemplary embodiment.

As shown in FIG. 35, the server 3401 may be mounted on an apparatus composed of the CPU, the route complex, and the memory (an upstream bridge and an input device may be included). In FIG. 35, the server 3401 is mounted on an apparatus composed of a CPU 101-2, a route complex 102-2, a memory 103-2 (an upstream bridge 104-2 and an input device 109-2 may be included).

Since the respective upstream bridges and downstream bridges do not hold the I/O equipment information table, the VLAN ID information table, and the counter for counting the number of times of the VLAN ID-setting by using the fifth exemplary embodiment, the upstream bridges and the downstream bridges can be easily mounted.

(6) Sixth Exemplary Embodiment

Figure 39:
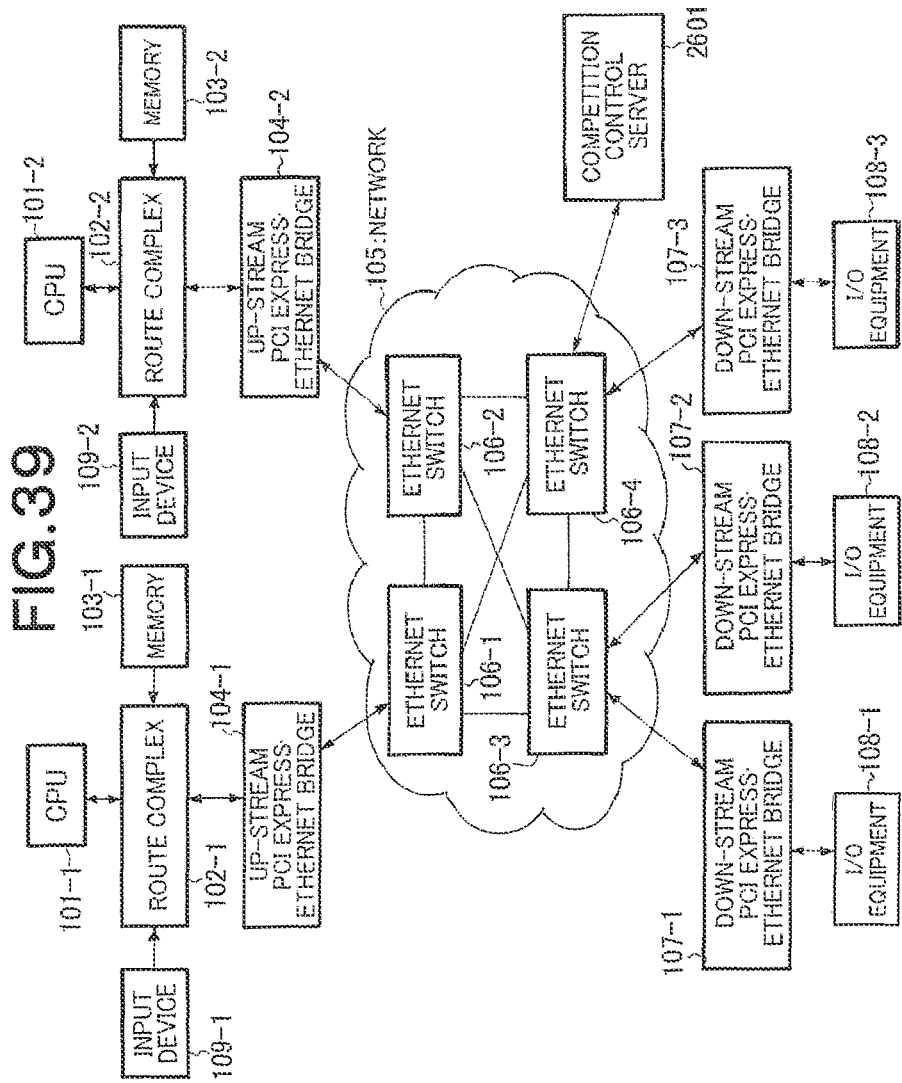
FIG. 39 a block diagram of an overall configuration of the I/O equipment sharing system of a sixth exemplary embodiment.

A sixth exemplary embodiment will be explained. The sixth exemplary embodiment will explain a configuration including a unit for controlling competition when set VLAN IDs compete against each other between a plurality of upstream bridges or when a plurality of CPUs request the same I/O equipment to permit for them to belong to it. The configuration of the sixth exemplary embodiment is the same as any of the configurations of the first, second, third, fourth, and fifth exemplary embodiments except the portion for carrying out the competition control. The sixth exemplary embodiment is added the unit (competition control unit) for carrying out the competition control to the competition of the VLAN IDs or the competition of the request to the I/O equipment, as a competition control server. FIG. 39 is a block diagram of the sixth exemplary embodiment. A reference numeral 2601 shows the competition control server. When the VLAN IDs are set or when the plurality of CPUs request the same I/O equipment to permit for them to belong to it, the competition control must be carried out. The exemplary embodiment is provided with the competition control server 2601 specialized in the competition control. The operations of the exemplary embodiment when the VLAN IDs are set or when the plurality of CPUs request the same I/O equipment to permit for them to belong to it will be explained below.

1) Competition Control when VLAN Id is Set

When respective upstream bridges create VLAN IDs from a MAC address (exemplary embodiments 1 to 3), there is a case in which at least two upstream bridges create the same VLAN IDs. After the upstream bridges create the VLAN IDs from the MAC address, the VLAN IDs advertise against each other. In, for example, FIG. 41, an upstream bridge 104-1 creates a VLAN ID from a MAC address (step S150) and broadcasts a VLAN ID notification frame (step S151)

When an upstream bridge receives an advertising frame (VLAN ID notification frame) and finds an upstream bridge other than it which advertises the same VLAN ID as the upstream bridge, the upstream bridge accesses the competition control server 2601 to request it to solve the competition. In FIG. 41, an upstream bridge 104-2 receives a advertising frame (step S152), recognizes that the VLAN ID thereof is the same as that of an upstream bridge 104-1 and competes thereagainst (step S153), and accesses the competition control server 2601. Since the VLAN ID also competes in the upstream bridge 104-1, it also accesses the competition control server 2601.

The competition control server 2601 recognizes the occurrence of competition due to the access from the upstream bridges 104-1, 104-2 having the same VLAN ID (step S154), solves the competition, and notifies the upstream bridges 104-1, 104-2 which compete against each other of it. As an example of a method of solving competition, the competition control server 2601 is previously provided with a VLAN ID which cannot be created by any of the upstreams, and when competition occurs, the competition control server 2601 sets the VLAN ID (step S155) and sends it one of the upstream bridges 104-1, 104-2. The upstream bridge receives the set VLAN ID (step S156) and holds in a VLAN ID information table and a VLAN ID setting unit (step S157). It is needless to say that the competition may be solved by a method other than the above method.

2) Competition Control when a Plurality of CPUs Request the Same I/O Equipment to Permit for them to Belong to it Competition also occurs when a plurality of CPUs request the same the I/O equipment to permit for them to belong to it. As shown in FIG. 42, when competition occurs by a plurality of CPUs which request the I/O equipment 108-1 to permit for them to belong to it (step S160), the I/O equipment 108-1 accesses the competition control server 2601 and requests it to carry out a competition control (instructs the competition control) (step S161). On receiving the request for the competition control (on receiving a competition control instruction) (step S162), the competition server 2601 solves the competition and notifies the I/O equipment and the CPUs of a result of solution. Methods of solving the competition includes a first method of selecting one of the CPUs and prohibits the use of the other CPUs, a second method of allocating the I/O equipment to one of the CPUs and allocate the same I/O equipment as the requested I/O equipment or I/O equipment (having the same function) to the other CPUs by providing the competition control server with the I/O information database in a system, and the like. FIG. 42 shows a method of solving the competition by selecting one CPU and notifying it to the I/O equipment 108-1 (step S163) and receiving the information of the CPU to which the I/O equipment 108-1 is selected (step S164).

Note that the competition control server 2601 may be disposed in any location on a network as long as the respective upstream bridges and the respective downstream bridges can access it. Further, as shown in FIG. 40, the competition control server 2601 may be mounted on an apparatus composed of the CPU, the route complex, and the memory (an upstream and an input device may be included). FIG. 40 shows a mode in which the competition control server 2601 is mounted on an apparatus composed of the CPU 101-2, the route complex 102-2, and the memory 103-2 (the upstream bridge 104-2 and an input device 109-2 may be included). When competition occurs, it can be solved promptly by using the sixth exemplary embodiment.

(7) Seventh Exemplary Embodiment

A seventh exemplary embodiment will be explained. I/O equipment can be roughly classified into a volatile type and a non-volatile type. When power supply is turned of, the data of volatile I/O equipment is erased, and the data of non-volatile I/O equipment is not erased even if power supply is shut off. The volatile I/O equipment is, for example, a graphic accelerator card, a sound card, or an engine card on which various types of processing engines are mounted. The volatile I/O equipment does not have an external output terminal. However, if I/O equipment has an external input/output terminal to which other equipment is connected, the I/O equipment is regarded as volatile I/O equipment when it is connected/disconnected to/from the volatile I/O equipment at the time the volatile I/O equipment is started or ended. On the other hand, the non-volatile I/O equipment is I/O equipment to which the volatile I/O equipment does not belong and for example, is a network interface card whose physical wirings are connected to fixed ports, or a storage interface card to which a storage unit is connected such that the data thereof is stored even if the power supply to which is shut off.

In the volatile I/O equipment, no problem arises even if any CPU uses it. However, when a non-volatile I/O equipment is connected and the allocation thereof is changed, there is a possibility that the data thereof is rewritten by other CUP without permission. To cope with this problem, when the non-volatile I/O equipment is connected, a region management device is newly added to set using-region of an I/O equipment to each CPU.

Figure 36:
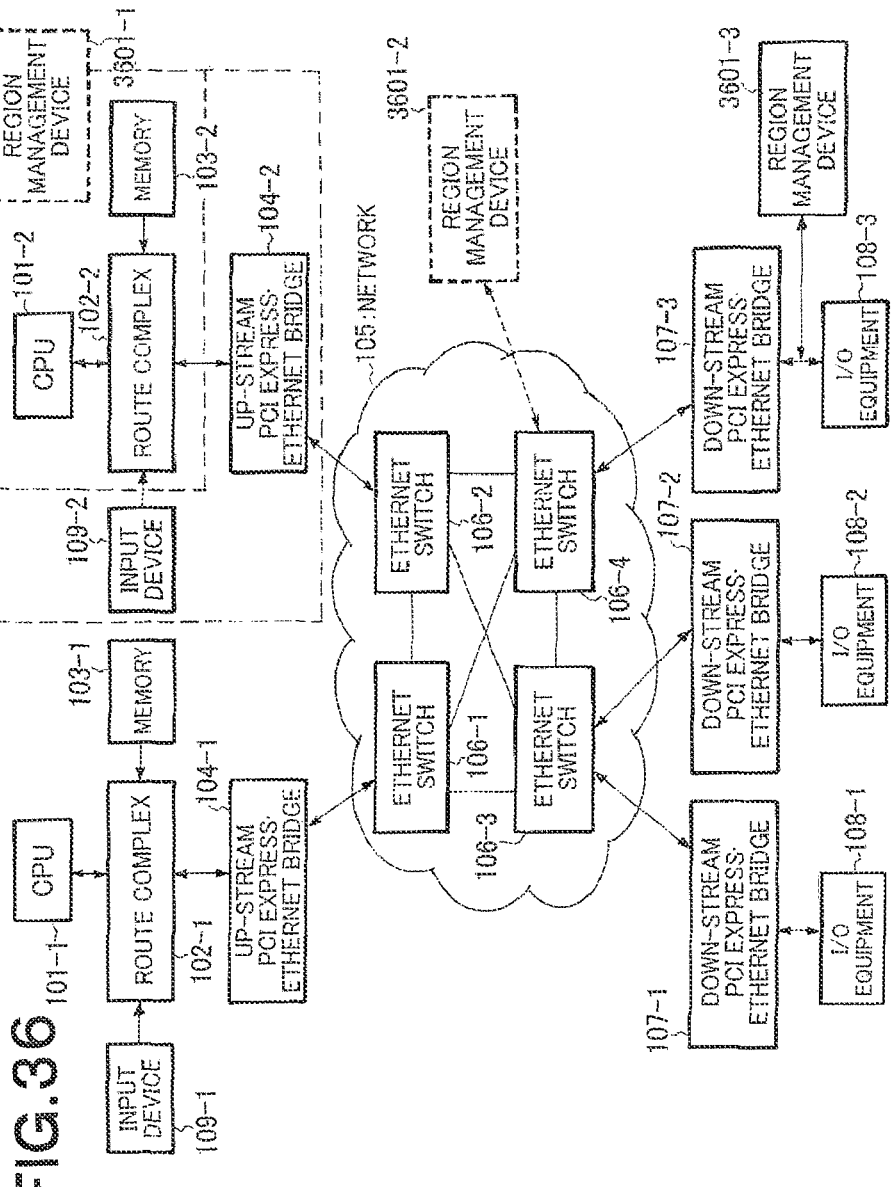
FIG. 36 is a block diagram showing an overall configuration of an I/O equipment sharing system of a seventh exemplary embodiment.

FIG. 36 shows an example of an overall block diagram of an example when a first example of the seventh exemplary embodiment is modified. The region management device may be disposed as a region management device 3601-3 between the non-volatile I/O equipment and the downstream bridge 107, may be disposed as a region management device 3601-2 to a portion on the network 105, or may be disposed on an apparatus composed of the CPU 101-2, the route complex 102-2, and the memory 103-2 (the upstream bridge 104-2 and an input device 109-2 may be included) as a region management device 3601-1. Otherwise, there is considered a configuration in which the region management device is disposed on the I/O equipment database server 1901, on the VLAN ID setting server 2501, or a server 3401. Since the region management device 3601 holds the user information of the non-volatile I/O equipment, it is controlled so as to be used in a region set to each user.

The data of the non-volatile I/O equipment 108 can be prevented from being broken by other user by using the seventh exemplary embodiment.

The present invention can be used to an apparatus for and a method of sharing I/O equipment between a plurality of the CPUs, and in particular to an apparatus for and method of sharing a plurality of the CPUs and a plurality of I/O equipment through a network.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. An I/O equipment sharing system comprising:
    a plurality of CPUs;
    a plurality of I/O equipments;
    a plurality of upstream PCI Express-bridges coupled to the plurality of CPUs;
    a plurality of downstream PCI Express-bridges coupled to the plurality of I/O equipment and coupled to the plurality of upstream PCI Express-bridges through a network; and
    an apparatus including an I/O equipment information database,
    wherein:
    each of the plurality of upstream PCI Express-bridges includes a first identifier-setting unit for setting an identifier and a first filtering unit for carrying out filtering by the set identifier;
    each of the plurality of downstream PCI Express-bridges includes a second identifier-setting unit for setting an identifier and a second filtering unit for carrying out filtering by the set identifier;
    the upstream PCI Express-bridge communicates with the downstream PCI Express-bridge by a frame to which the same identifier is added;
    the apparatus collates first I/O equipment information with second I/O equipment information, the first I/O equipment information being delivered from the plurality of downstream PCI Express-bridges and recorded to the I/O equipment information database, and the second equipment information being delivered from the plurality of upstream PCI Express-bridges and recorded to the I/O equipment information database; and
    when the I/O equipment specified by the first I/O equipment information is included in the I/O equipment specified by the second I/O equipment information, the apparatus sends a frame including the identifier of the upstream PCI Express-bridge to the downstream PCI Express-bridge coupled to the I/O equipment specified by the first I/O equipment information.

2. An I/O equipment sharing system according to claim 1, wherein the first identifier setting unit creates the identifier from the value allocated to the upstream PCI Express-bridge, detects the overlap with the identifier of other upstream PCI Express-bridge, and when the identifiers overlap, allocates again an unused identifier which is apart from the allocated values by numerical values created from the allocated values, detects the overlap of the identifiers again, and allocates an identifier until the overlap thereof disappears.

3. An I/O equipment sharing system according to claim 1, comprising an apparatus for carrying out a competition control when the identifier compete between the plurality of upstream PCI Express-bridges or when a plurality of CPUs make affiliation request to a piece of I/O equipment.

4. An I/O equipment sharing system according to claim 1, comprising an apparatus having a function for managing the using region of the I/O equipment to each user when I/O equipment whose data or connection information is held even if a power supply is shut off is connected.

5. An I/O equipment sharing system according to claim 1, wherein the network is Ethernet and the identifier is a VLAN ID.

6. An I/O equipment sharing system according to claim 1, wherein a plurality of route complexes are disposed between the plurality of CPUs and the plurality of upstream PCI Express-bridges.

7. An information processing apparatus sharing system comprising:
a plurality of upstream information processing apparatuses;
a plurality of downstream information processing apparatuses;
a plurality of upstream bridges coupled to the plurality of upstream information processing apparatuses;
a plurality of downstream bridges coupled to the plurality of downstream information processing apparatuses and coupled to the plurality of upstream bridges through a network; and
an apparatus including a database for a downstream information processing apparatus,
wherein:
each of the plurality of upstream bridges includes a first identifier-setting unit for setting an identifier and a first filtering unit for carrying out filtering by the set identifier;
each of the plurality of downstream bridges includes a second identifier-setting unit for setting an identifier and a second filtering unit for carrying out filtering by the set identifier;
the upstream bridge communicates with the downstream bridge by a frame to which the same identifier is added;
the apparatus collates first downstream information processing apparatus information with second downstream information processing apparatus information, the first downstream information processing apparatus information being delivered from the plurality of downstream bridges and recorded to the database, and the second downstream information processing apparatus information being delivered from the plurality of upstream bridges and recorded to the database, and
when the downstream information processing apparatus specified by the first downstream information processing apparatus information is included in the downstream information processing apparatus specified by the second downstream information processing apparatus information, the apparatus sends a frame including the identifier of the upstream bridge to the downstream bridge coupled to the downstream information processing apparatus specified by the first downstream information processing apparatus information.

8. An I/O equipment sharing method of sharing a plurality of I/O equipment between a plurality of CPUs in an I/O equipment sharing system which comprises a plurality of CPUs, a plurality of I/O equipment, a plurality of upstream PCI Express-bridges coupled to the plurality of CPUs, and a plurality of downstream PCI Express-bridges coupled to the plurality of I/O equipment and coupled to the plurality of upstream PCI Express-bridges through a network, the method comprising the steps of:
carrying out a communication between the upstream and downstream PCI Express-bridges by a frame to which the same identifier is added; and
carrying out filtering by the upstream PCI Express-bridge and the plurality of downstream PCI Express-bridge using the same identifier,
wherein:
the I/O equipment sharing system comprises an apparatus including an I/O equipment information database;
the apparatus collates first I/O equipment information delivered from the plurality of downstream PCI Express-bridges and recorded to the I/O equipment information database with second I/O equipment information delivered from the plurality of upstream PCI Express-bridges and recorded to the I/O equipment information database; and
when the I/O equipment specified by the first I/O equipment information is included in the I/O equipment specified by the second I/O equipment information, the apparatus sends a frame including the identifier of the upstream PCI Express-bridge to the downstream PCI Express-bridge coupled to the I/O equipment specified by the first I/O equipment information.

9. An I/O equipment sharing method according to claim 8, further comprising the steps of:
creating the identifier from the values allocated to the upstream PCI Express-bridge by the first identifier setting unit; and
detecting the overlap of the identifiers between the plurality of upstream PCI Express-bridges, and when the identifiers overlap, allocating again unused identifier which is apart from the allocated value by numerical value created from the value allocated to the upstream PCI Express-bridge, detecting the overlap of the identifiers again, and allocating an identifier until the overlap disappears.

10. An I/O equipment sharing method according to claim 8, wherein the I/O equipment sharing system comprises an apparatus for carrying out a competition control when the identifiers compete between the plurality of upstream PCI Express-bridges or when a plurality of CPUs make affiliation request to a piece of I/O equipment.

11. An I/O equipment sharing method according to claim 8, wherein the I/O equipment sharing system comprises an apparatus having a function for managing the using region of the I/O equipment to each user when I/O equipment whose data or connection information is held even if a power supply is shut off is connected.

12. An I/O equipment sharing method according to claim 8, wherein the network is Ethernet and the identifier is a VLAN ID.

13. An I/O equipment sharing method according to claim 8, wherein a plurality of route complexes are disposed between the plurality of CPUs and the plurality of upstream PCI Express-bridges.

* * * * *